(12) United States Patent
Jochum

(10) Patent No.: US 11,615,904 B2
(45) Date of Patent: Mar. 28, 2023

(54) DUAL MODE ELECTROPERMANENT MAGNET ARRAY

(71) Applicant: Altius Space Machines Inc., Broomfield, CO (US)

(72) Inventor: Andreas Jochum, Lafayette, CO (US)

(*) Notice: Subject to any disclaimer, the term of this patent is extended or adjusted under 35 U.S.C. 154(b) by 22 days.

(21) Appl. No.: 17/212,830

(22) Filed: Mar. 25, 2021

(65) Prior Publication Data
US 2021/0210267 A1 Jul. 8, 2021

Related U.S. Application Data

(63) Continuation of application No. 16/876,096, filed on May 17, 2020, now Pat. No. 10,984,936.

(60) Provisional application No. 62/849,204, filed on May 17, 2019.

(51) Int. Cl.
| | |
|---|---|
| H01F 7/02 | (2006.01) |
| H01F 7/20 | (2006.01) |
| H01F 7/06 | (2006.01) |
| H04R 9/02 | (2006.01) |
| H04R 9/04 | (2006.01) |
| B23Q 3/15 | (2006.01) |
| H01F 27/28 | (2006.01) |
| H01F 7/04 | (2006.01) |

(52) U.S. Cl.
CPC .............. *H01F 7/02* (2013.01); *H01F 7/064* (2013.01); *H01F 7/20* (2013.01); *B23Q 3/15* (2013.01); *H01F 7/04* (2013.01); *H01F 7/06* (2013.01); *H01F 27/28* (2013.01); *H04R 9/025* (2013.01); *H04R 9/046* (2013.01)

(58) Field of Classification Search
CPC .......... B23Q 3/15; H04R 9/025; H04R 9/046; H04R 2400/00; H04R 2307/021; H04R 2400/11; H04R 7/16; H04R 9/045; F03B 13/10; H01F 7/04; H01F 27/28; H01F 7/02; H01F 7/20; H01F 7/06; H01F 7/064; H01F 7/122; H01F 7/00; B66C 1/04
USPC ................................. 361/139, 143, 144, 160
See application file for complete search history.

(56) References Cited

U.S. PATENT DOCUMENTS

| | | | |
|---|---|---|---|
| 5,285,154 | A | 2/1994 | Burreson |
| 5,705,924 | A | 1/1998 | Jeffers |
| 5,986,450 | A | 11/1999 | Haigh et al. |
| 7,301,334 | B2 | 11/2007 | Shen et al. |
| 7,846,310 | B2 | 12/2010 | Gillard et al. |
| 8,120,351 | B2 | 2/2012 | Rettig et al. |
| 8,400,243 | B2 | 3/2013 | Okada et al. |

(Continued)

*Primary Examiner* — Danny Nguyen
(74) *Attorney, Agent, or Firm* — Thomas J. Lavan

(57) ABSTRACT

An electropermanent magnet array is provided. The electropermanent magnet array includes one or more of a plurality of electropermanent magnets, arranged in a parallel fashion, a plurality of switching circuits, each switching circuit coupled to a different electropermanent magnet of the plurality of electropermanent magnets, and a control circuit, coupled to the plurality of switching circuits. The control circuit is configured to receive commands to control the plurality of switching circuits to demagnetize the plurality of electropermanent magnets, magnetize the plurality of electropermanent magnets to produce a first magnetic field with a strength and an attraction distance and magnetize the plurality of electropermanent magnets to produce a second magnetic field with a lower strength and greater attraction distance than the first magnetic field.

21 Claims, 34 Drawing Sheets

(56) References Cited

U.S. PATENT DOCUMENTS

| | | |
|---|---|---|
| 8,629,572 B1 | 1/2014 | Phillips |
| 10,012,518 B2 | 7/2018 | David et al. |
| 2010/0283340 A1 | 11/2010 | Fradella |
| 2012/0327548 A1* | 12/2012 | Lin ..................... A61M 37/00 361/159 |
| 2014/0049347 A1 | 2/2014 | Barton et al. |
| 2015/0062770 A1 | 3/2015 | Robertson |
| 2016/0121203 A1 | 5/2016 | Gomez et al. |
| 2017/0000309 A1 | 1/2017 | Gillard et al. |

* cited by examiner

*Fig. 1A  Hard Magnetic Core*
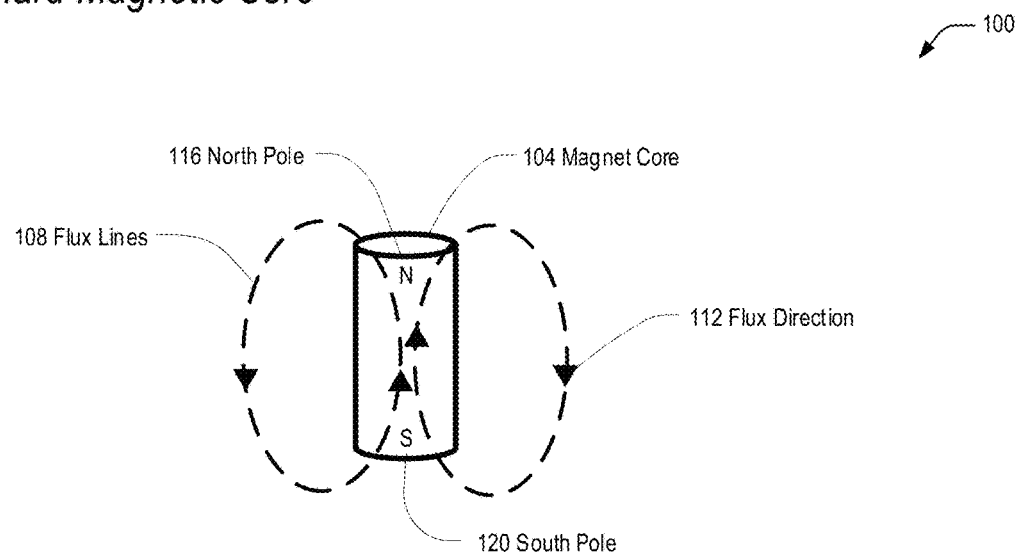
*Fig. 1B  Energized Coil Winding*
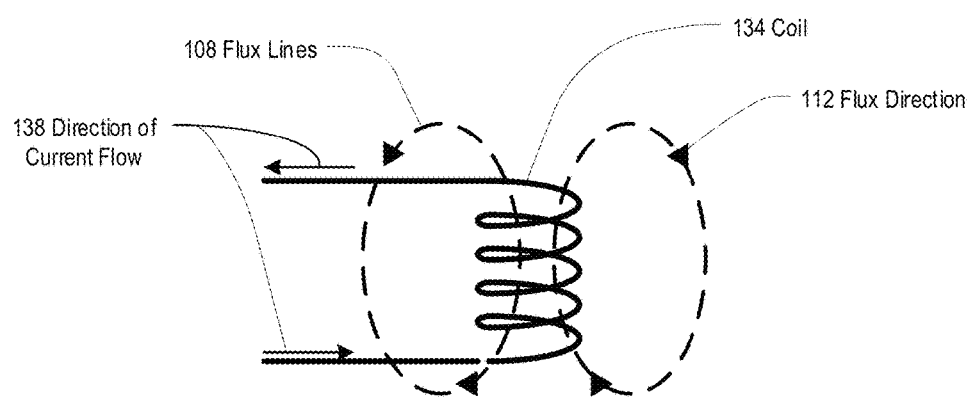

*Fig. 1C   Electropermanent Magnet Charged by Single Polarity Current Pulse Through Coil*
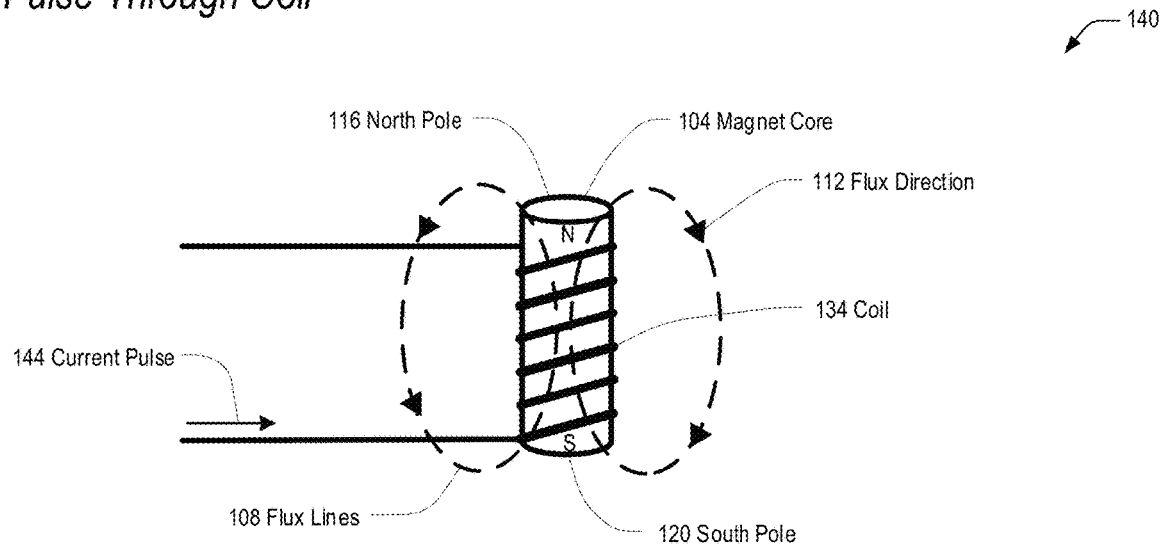
*Fig. 1D   Electropermanent Magnet Demagnetized by Alternating Polarity Current Pulses Through Coil*
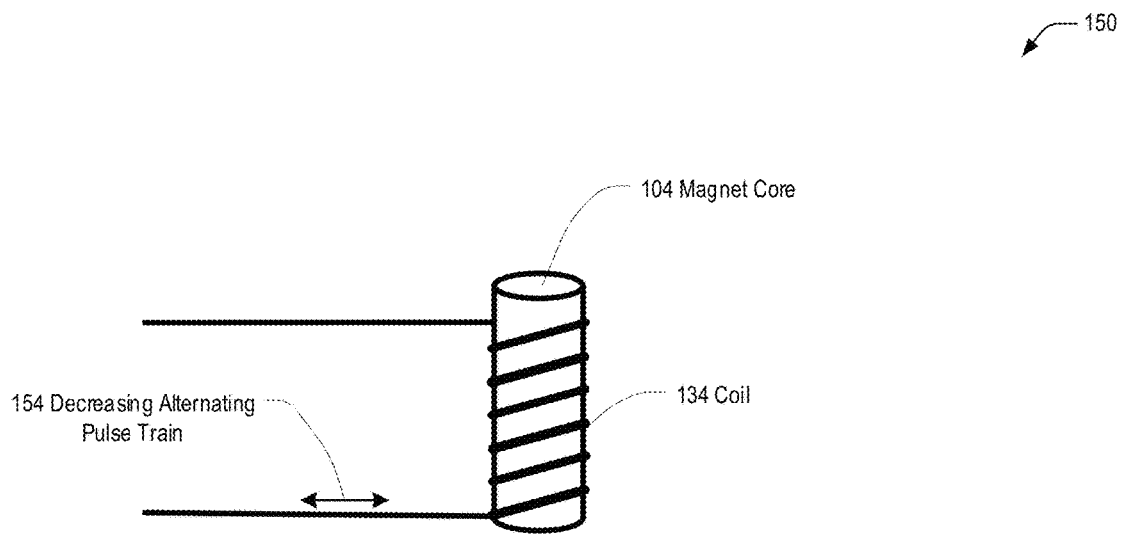

*Fig. 1E  Neutralized Permanent Magnet Flux*
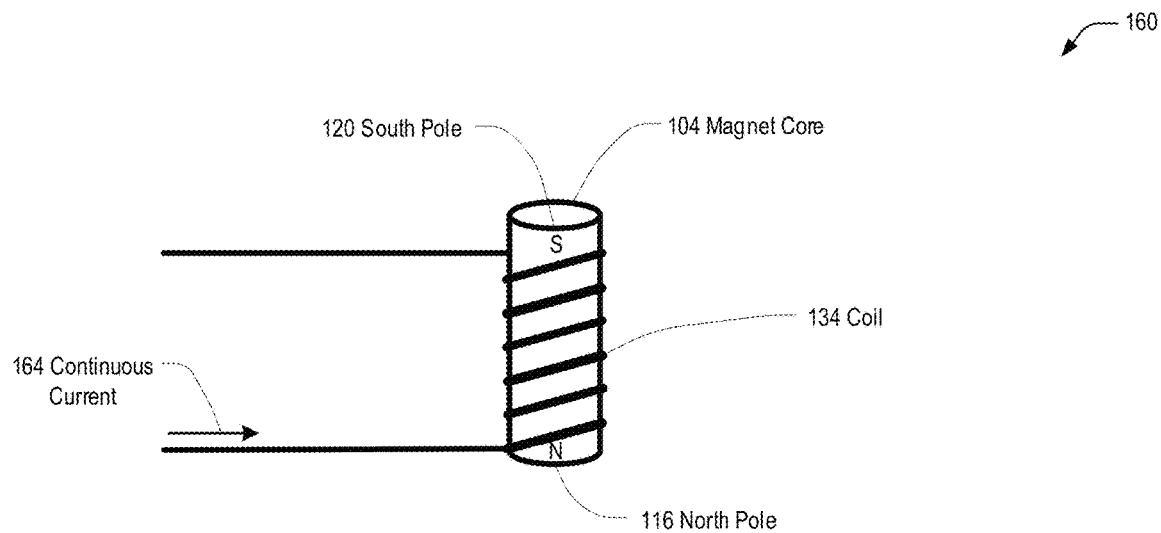
*Fig. 1F  Reduction in Net Magnetic Flux*
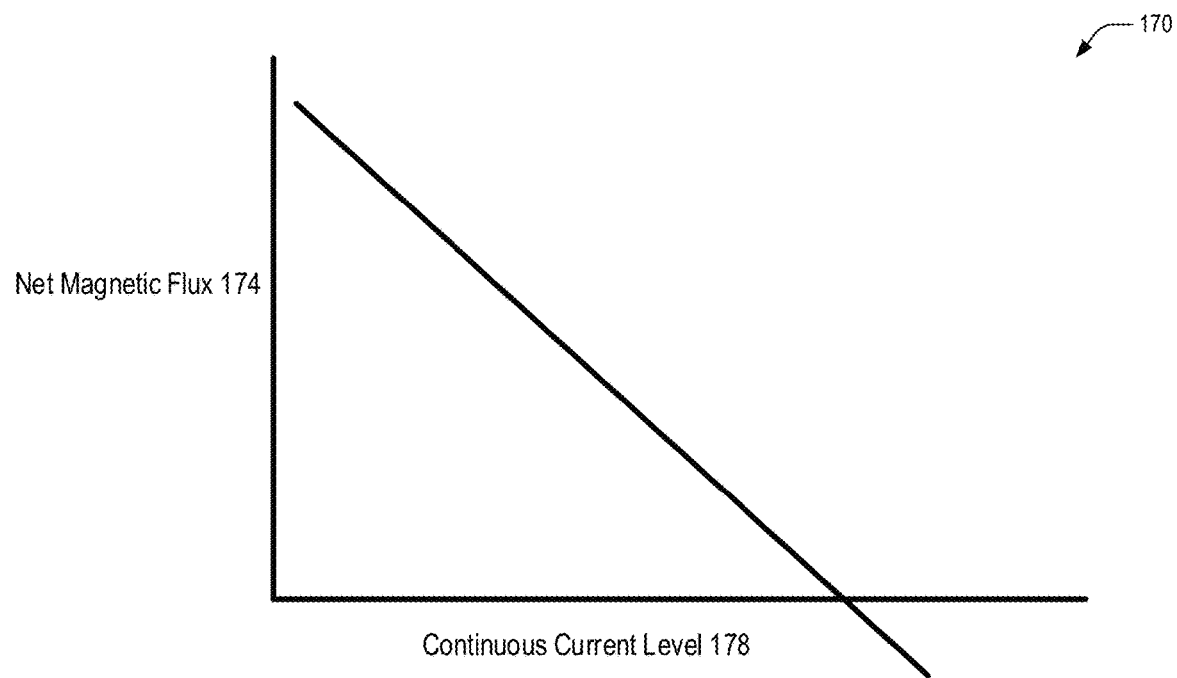

Fig. 1G  Electropermanent Magnet Demagnetized
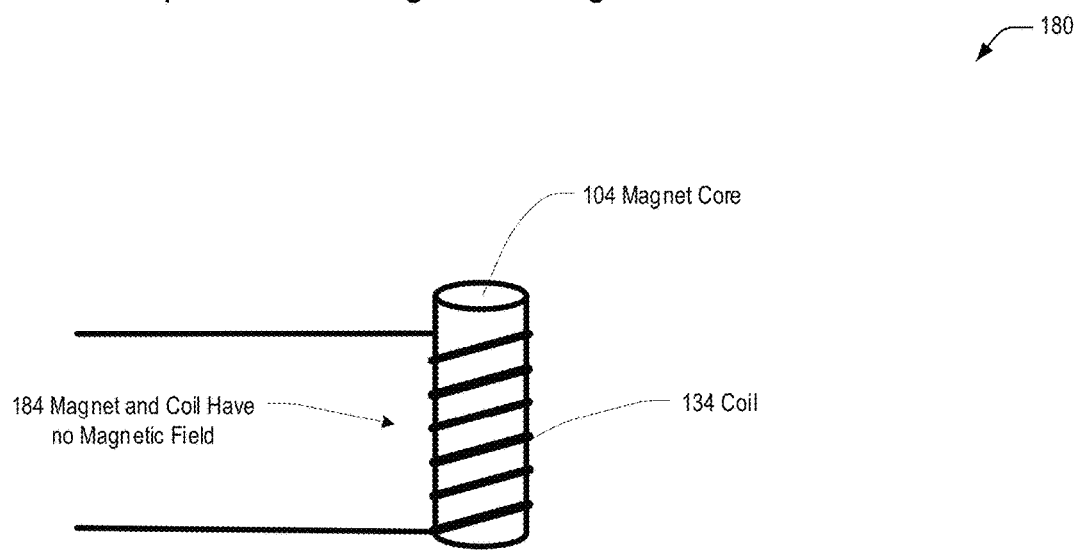

Fig. 2A  Simple Electromagnet
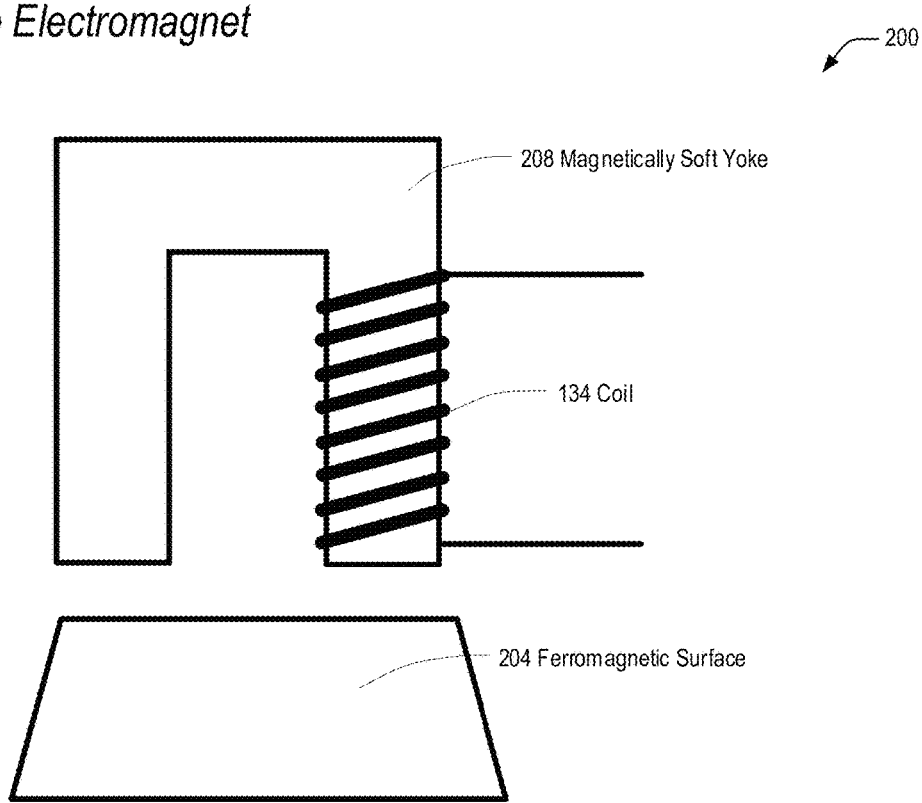
Fig. 2B  Simple Energized Electromagnet
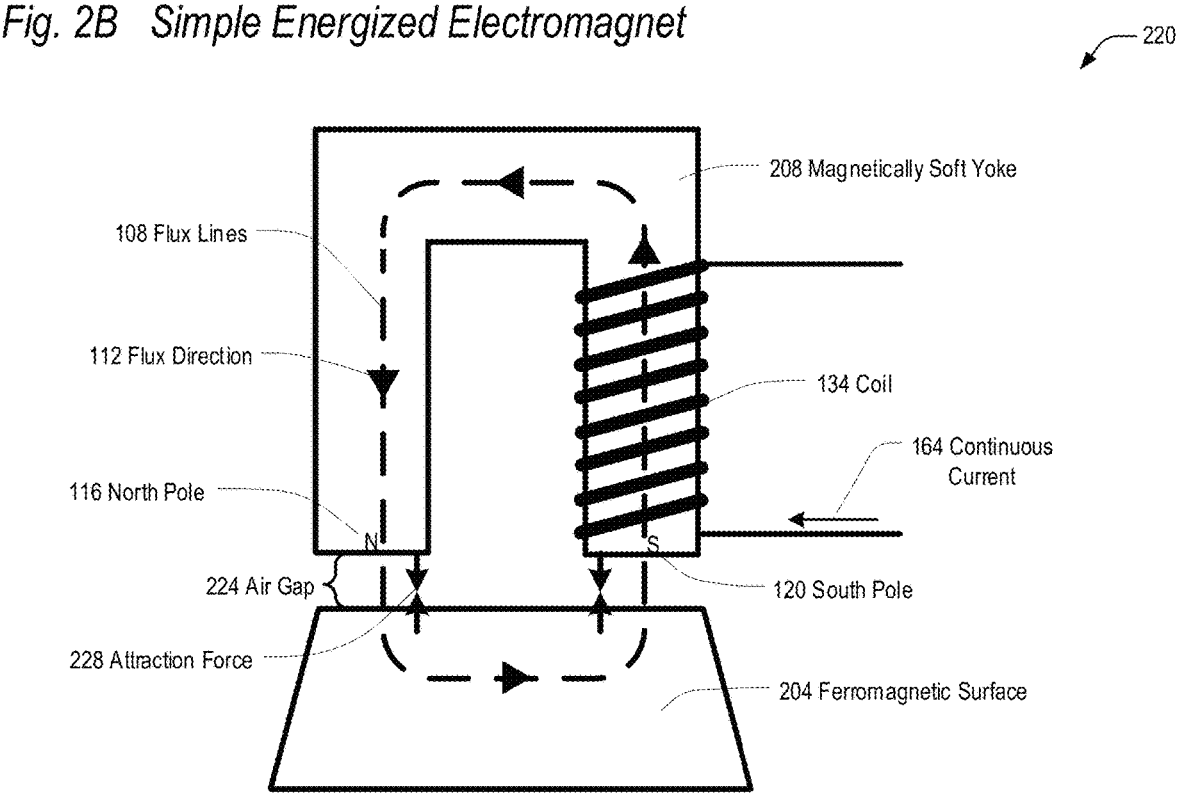

*Fig. 2C  Biased Electromagnet With Zero Current*
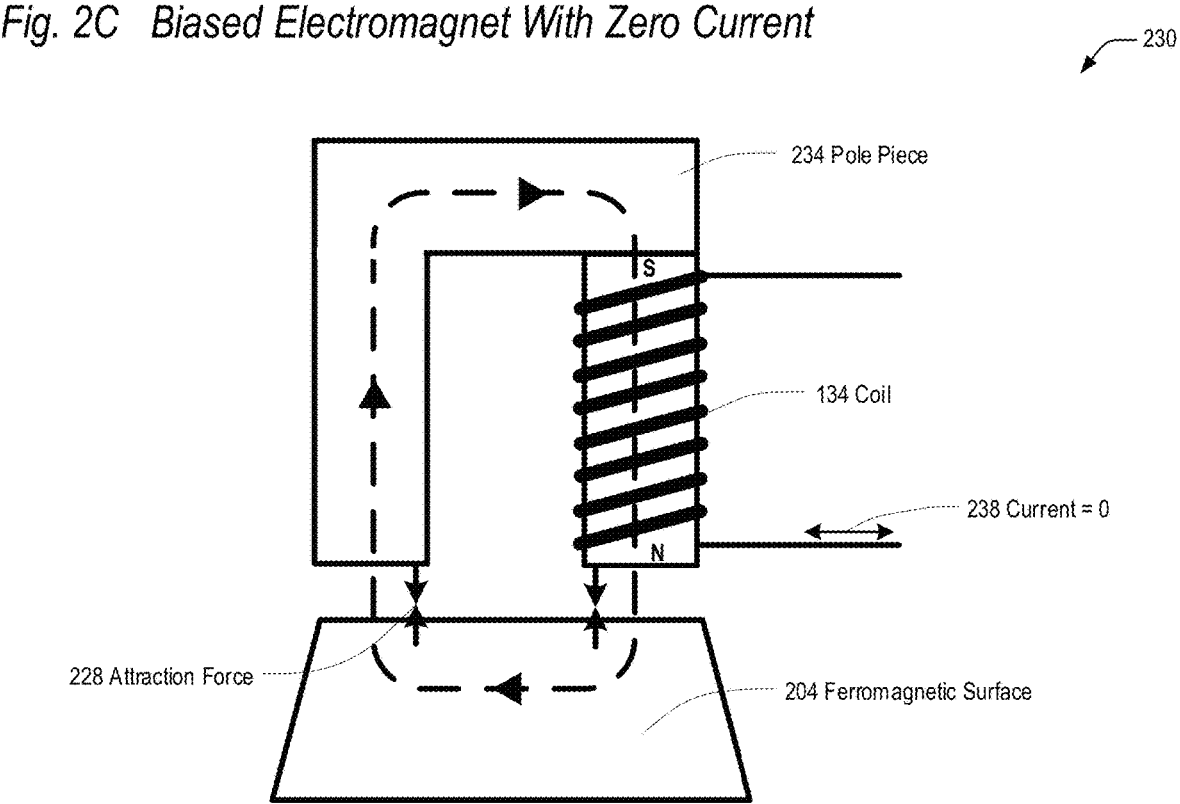
*Fig. 2D  Biased Electromagnet With Flux Canceled*
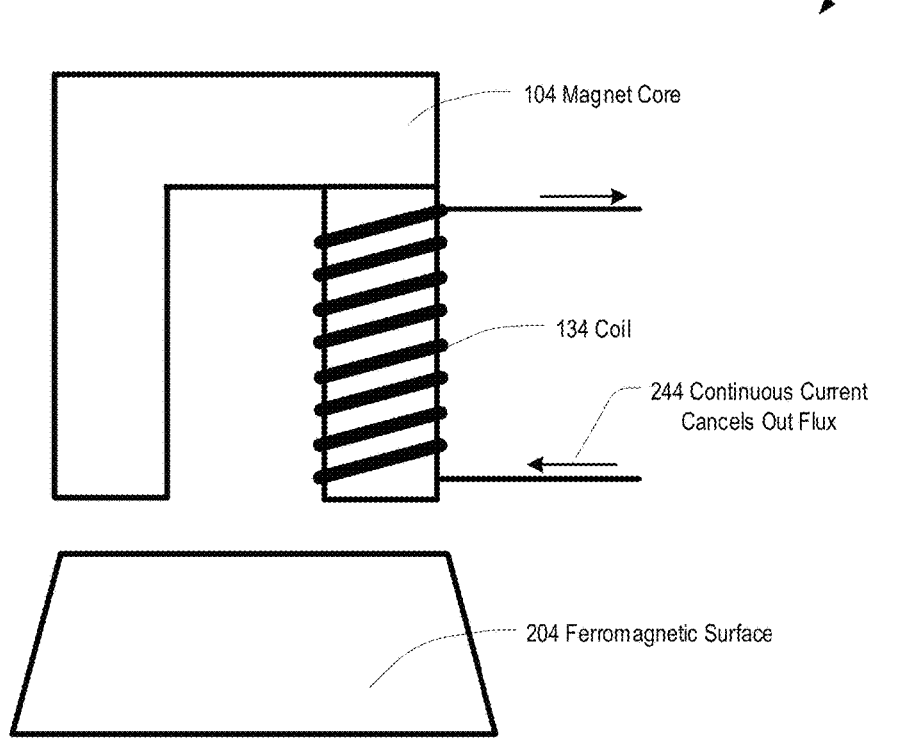

Fig. 2E  Hard and Semi-Hard Magnets With Aligned Poles
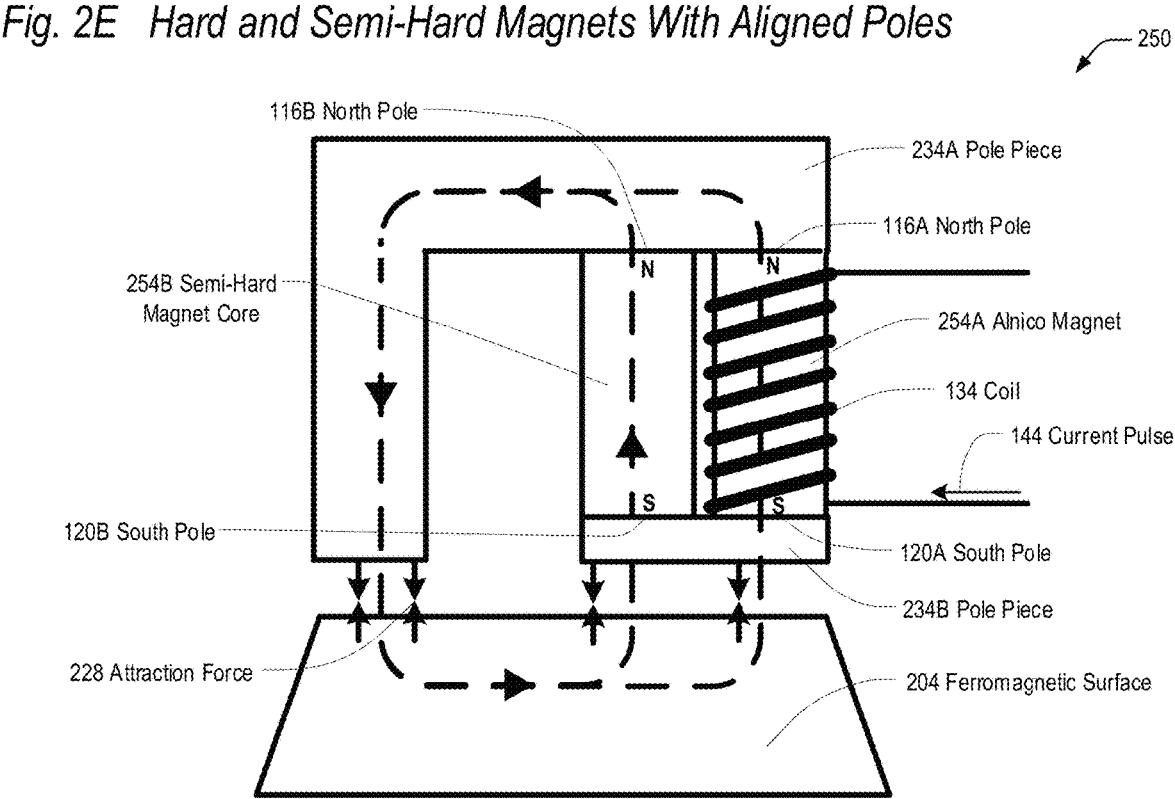
Fig. 2F  Hard and Semi-Hard Magnets With Poles in Opposition
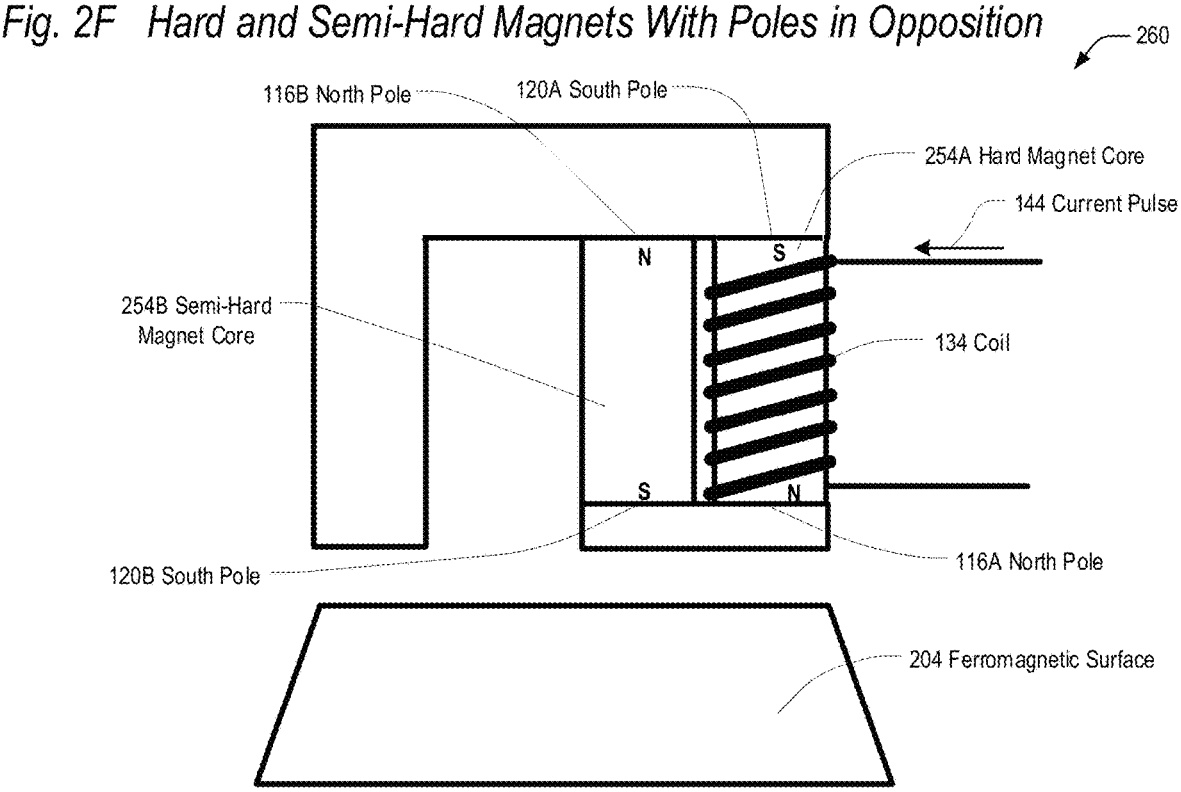

*Fig. 2G   Electropermanent Magnet Charged by Current Pulse*
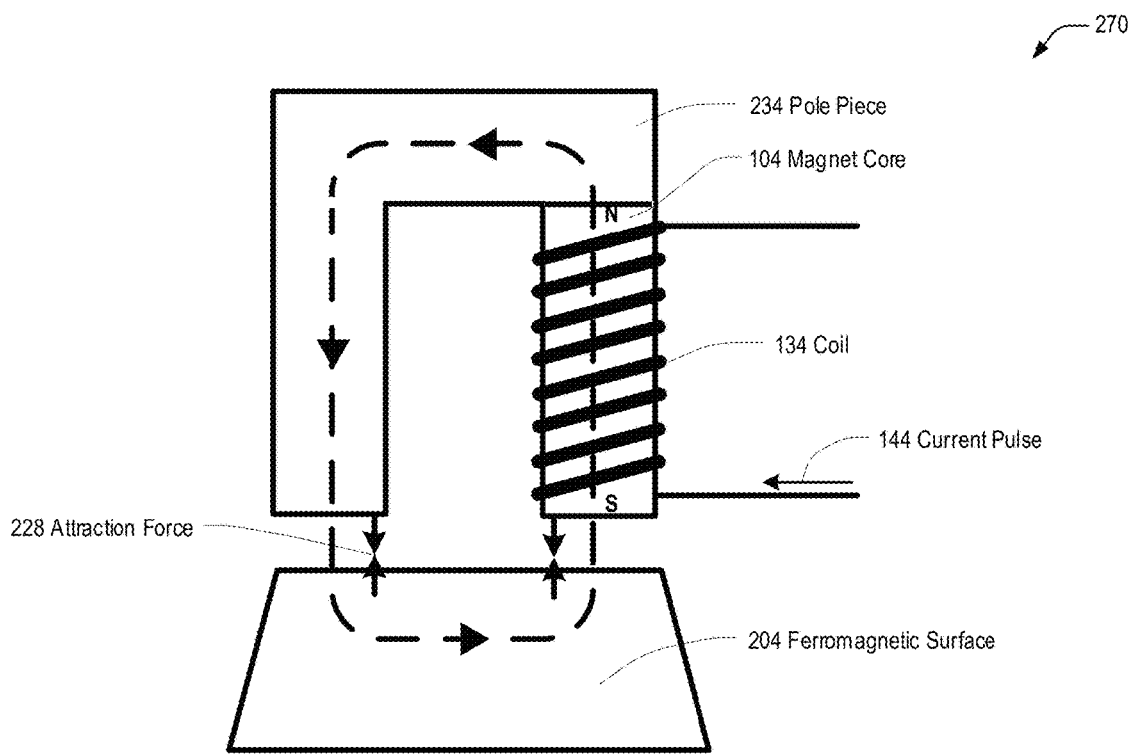
*Fig. 2H   Electropermanent Magnet Demagnetized by Alternating Pulses*
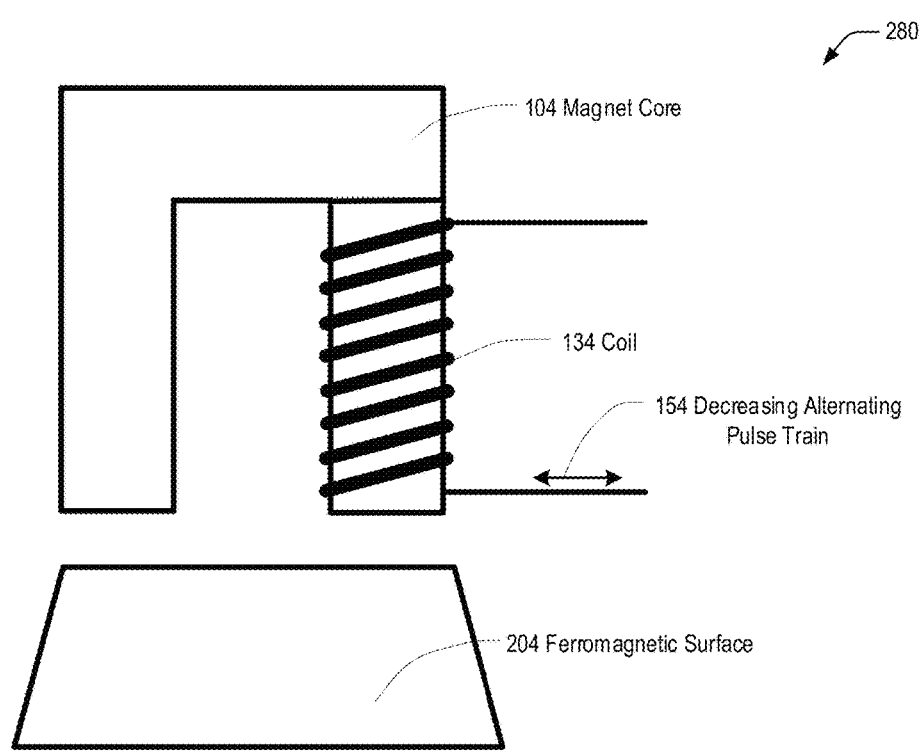

*Fig. 3A  Side-By-Side Electropermanent Magnet Array With Alternating Polarity For Short Range Attraction*
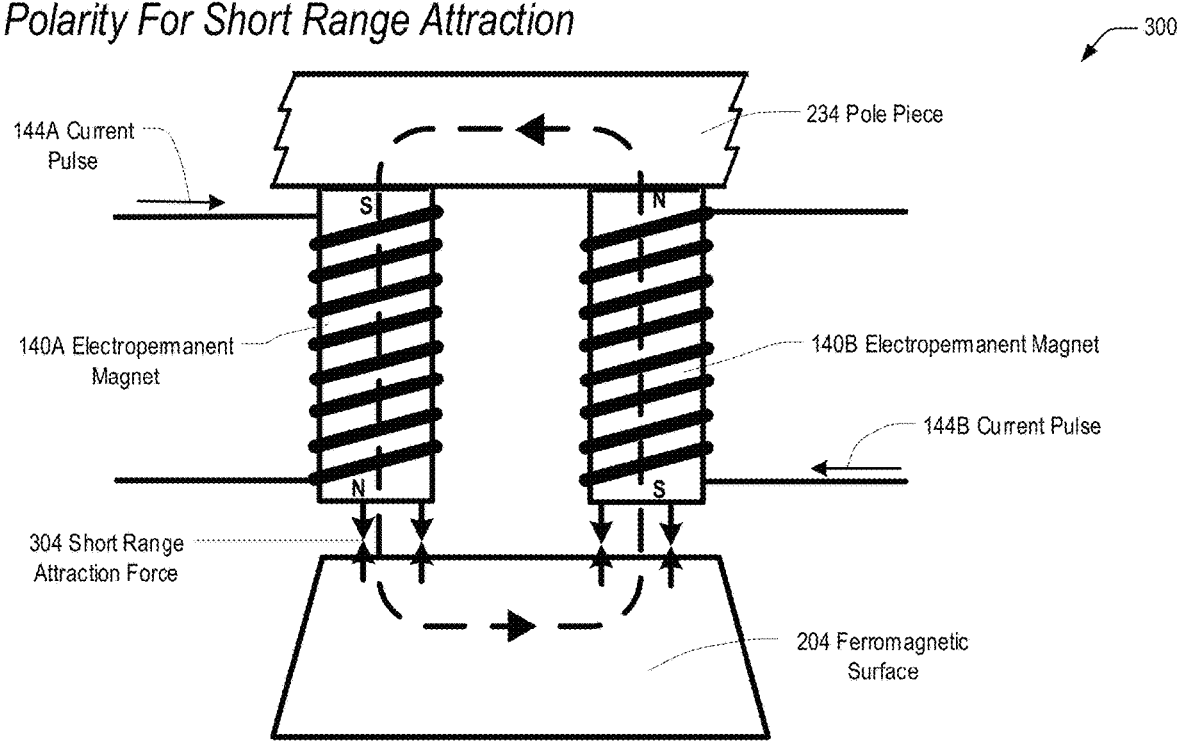
*Fig. 3B  Side-By-Side Electropermanent Magnet Array With Matching Polarity For Longer Range Attraction*
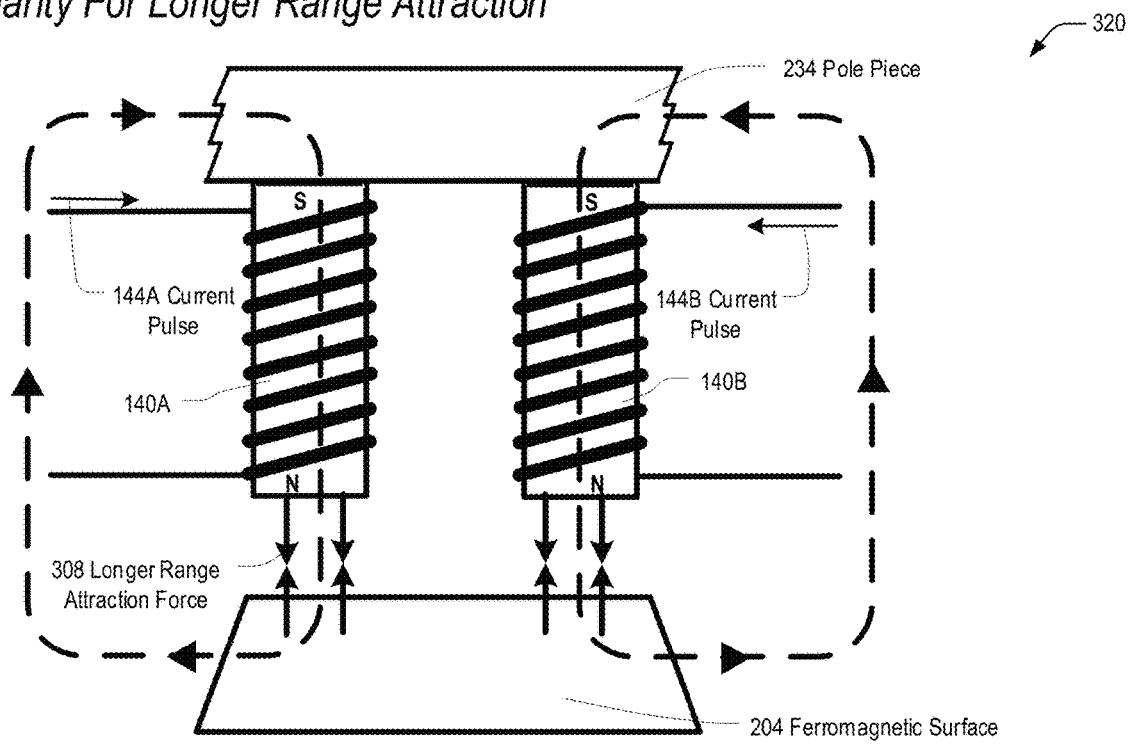

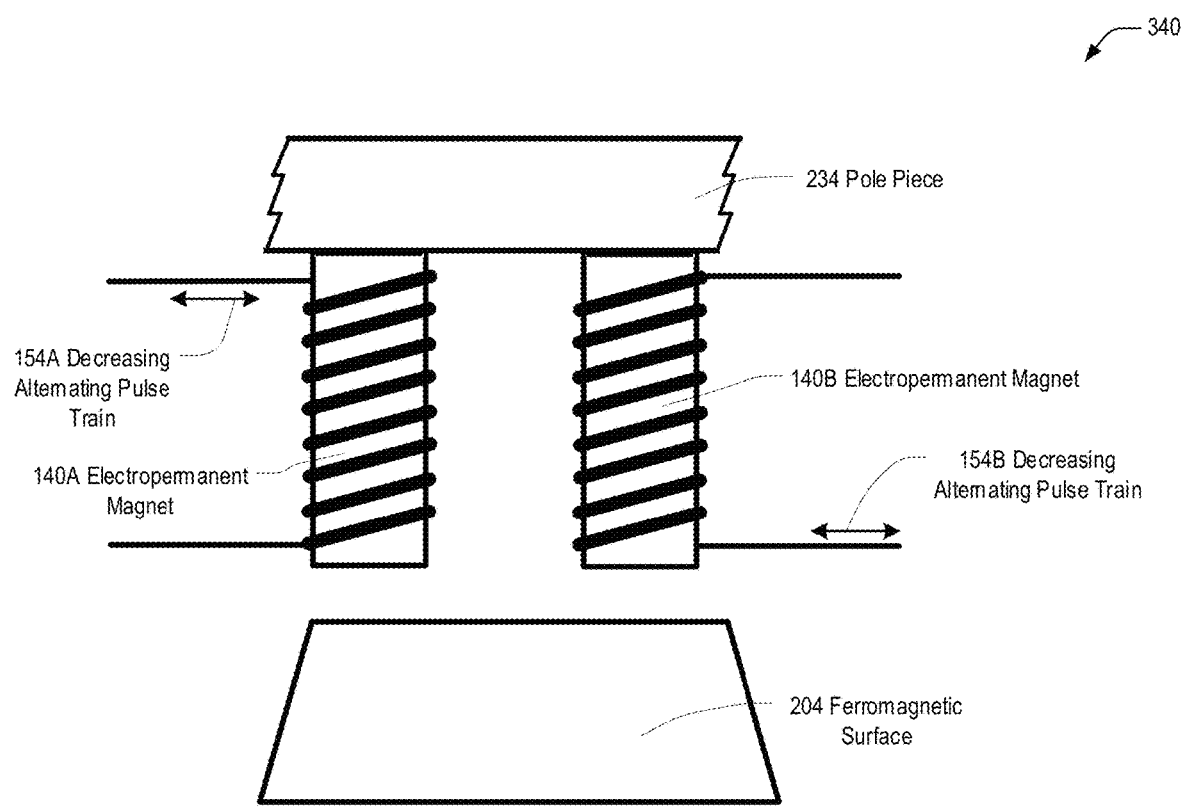
Fig. 3C  Demagnetized Side-By-Side Electropermanent Magnet Array

*Fig. 3D   Magnetic Flux Diagram For Short Range Attraction*
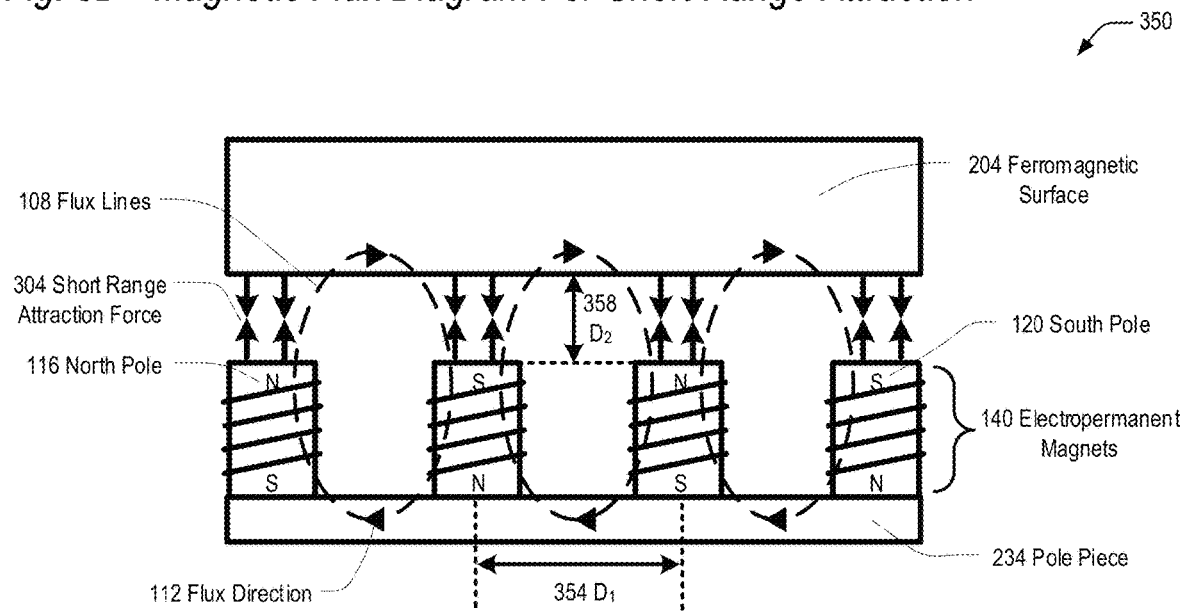
*Fig. 3E   Magnetic Flux Diagram For Longer Range Attraction*
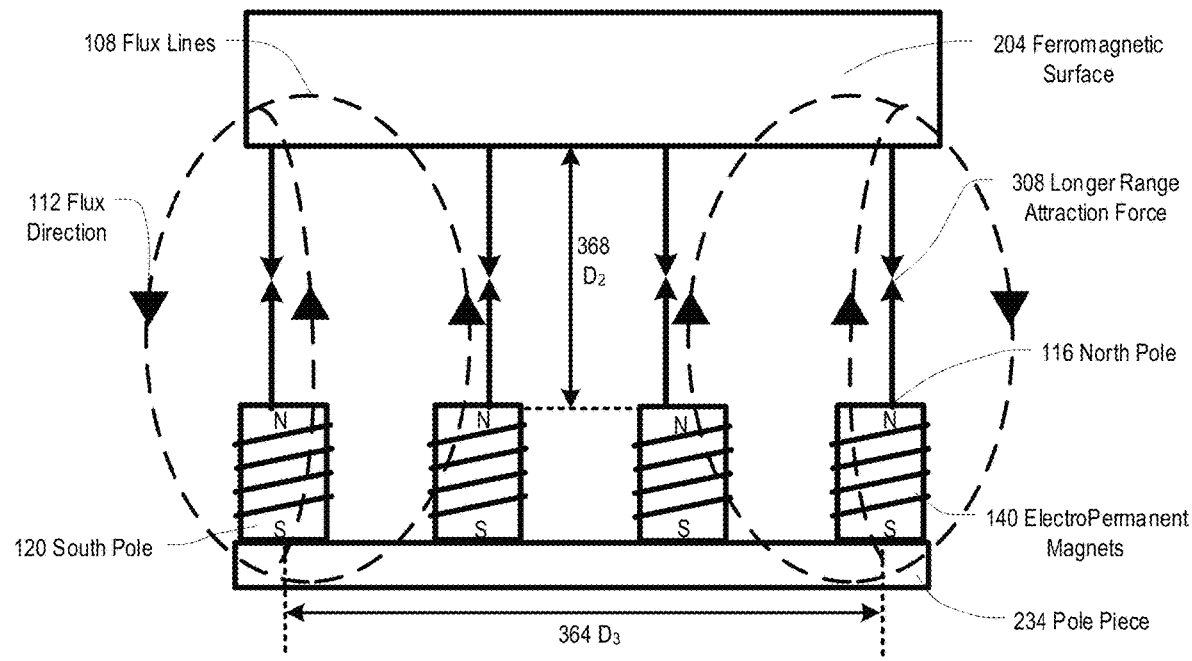

*Fig. 4A  End-On-End Electropermanent Magnet Array for Short Range Attraction*
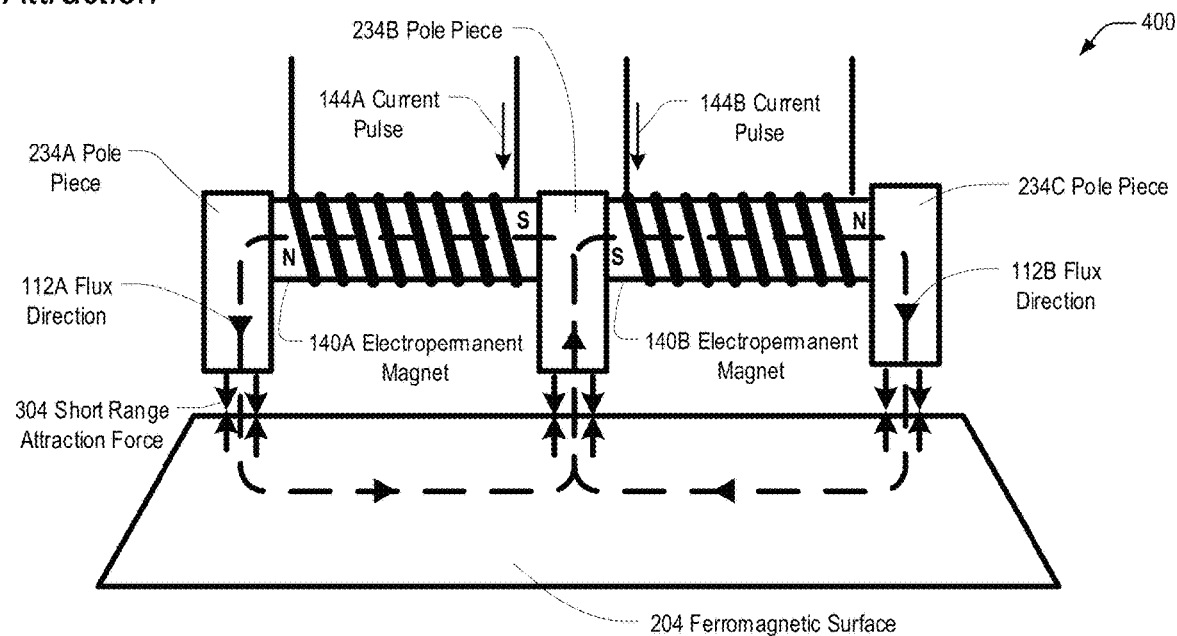
*Fig. 4B  End-On-End Electropermanent Magnet Array for Longer Range Attraction*
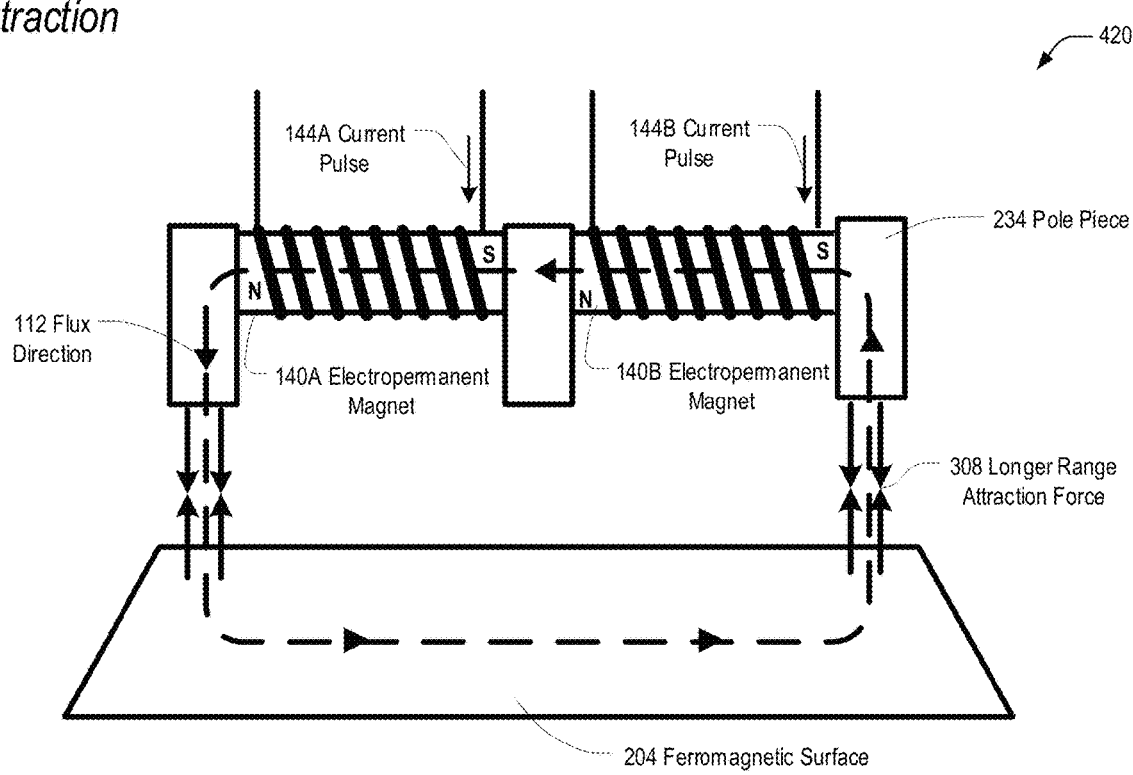

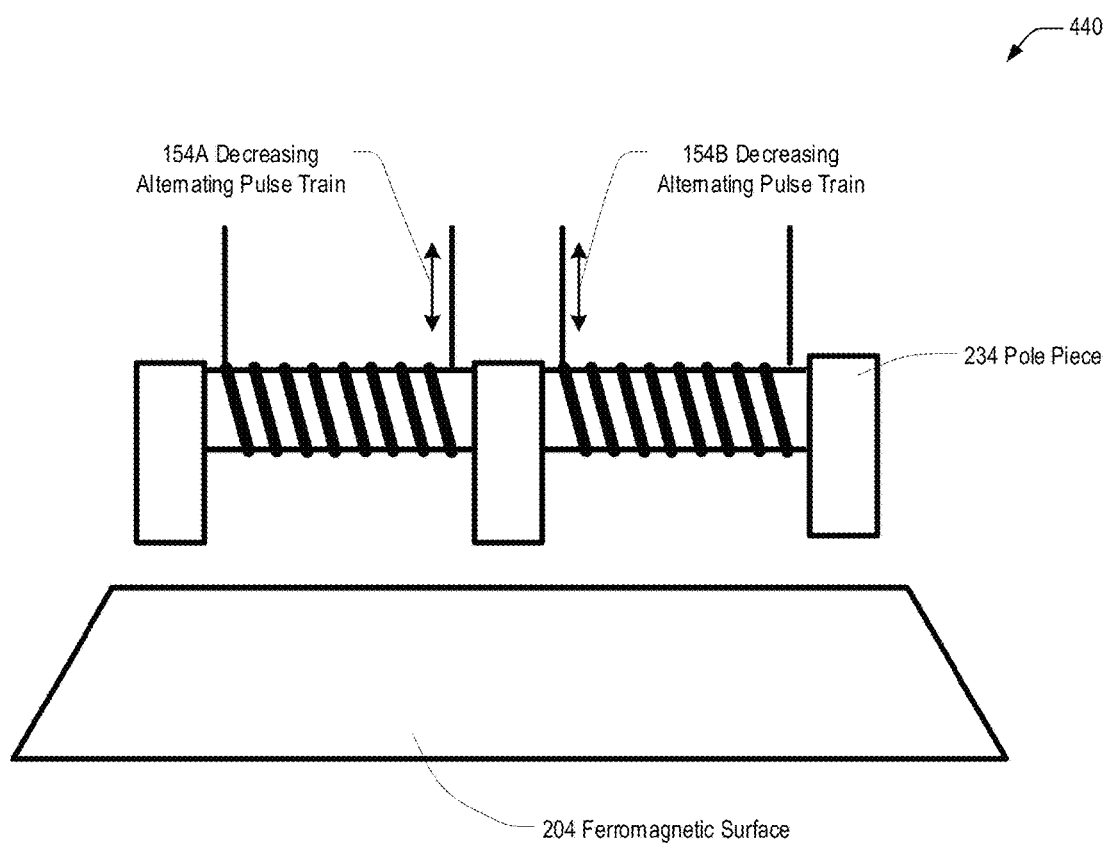
Fig. 4C  Demagnetized End-on-End Electropermanent Magnet Array

*Fig. 4D  Magnetic Flux Diagram For Short Range Attraction*
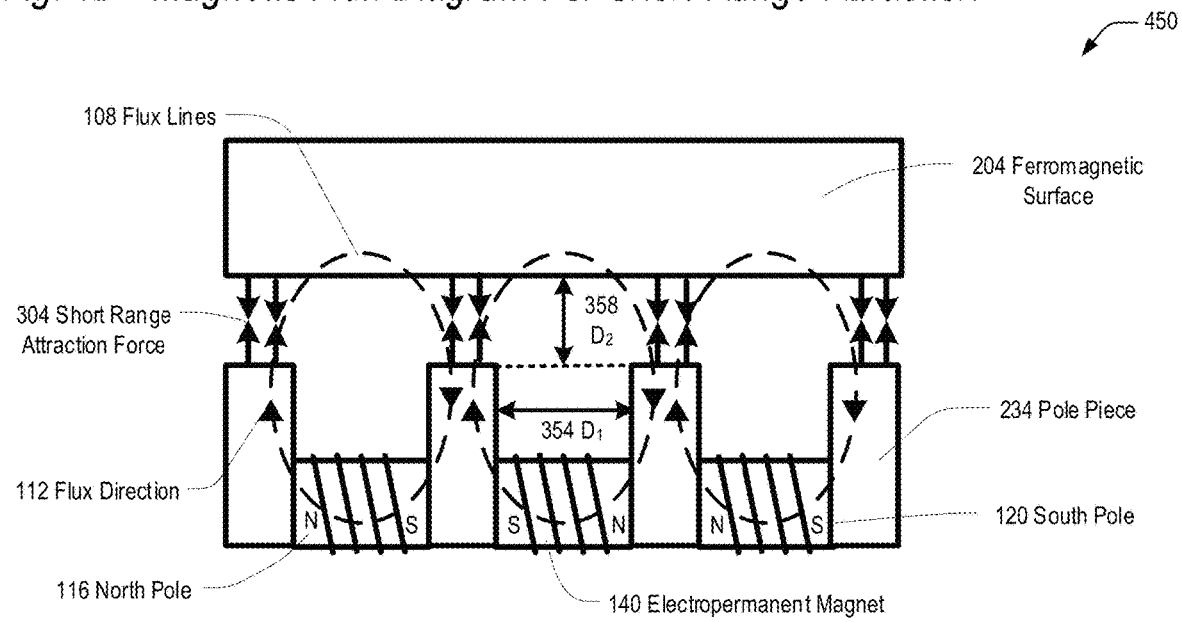
*Fig. 4E  Magnetic Flux Diagram For Longer Range Attraction*
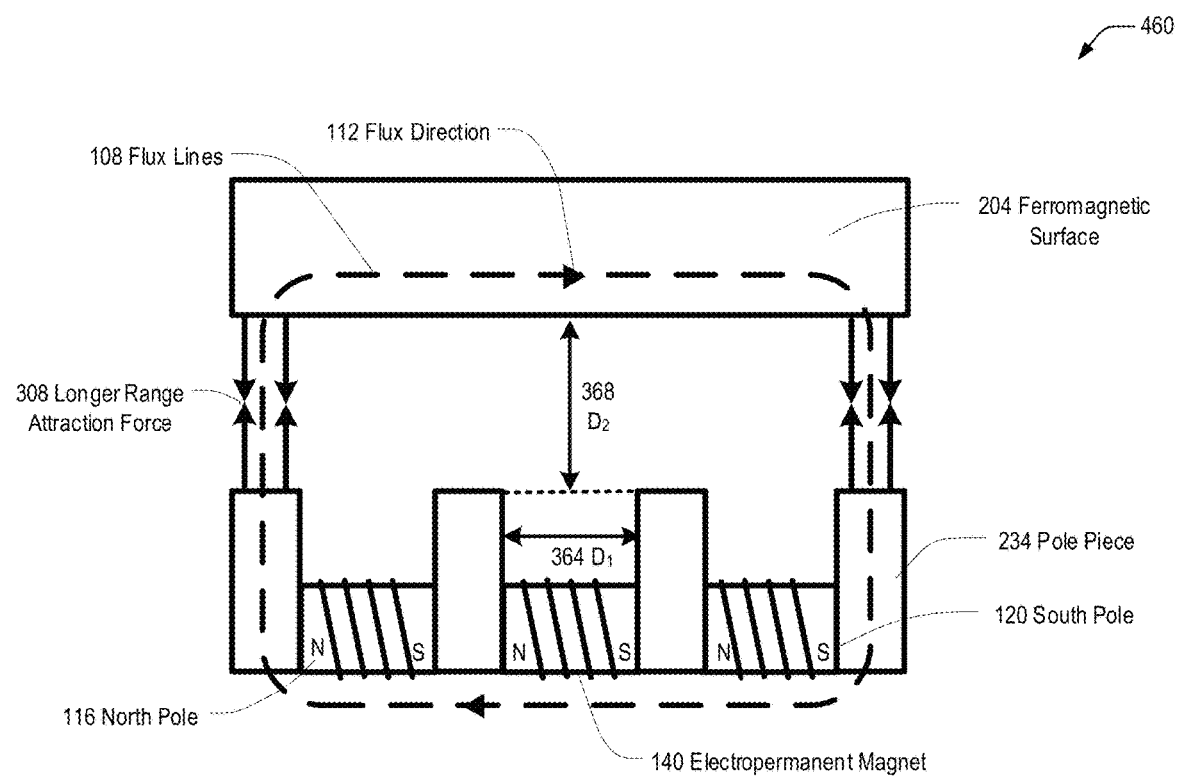

*Fig. 5A   Current Pulse Driver Block Diagram*
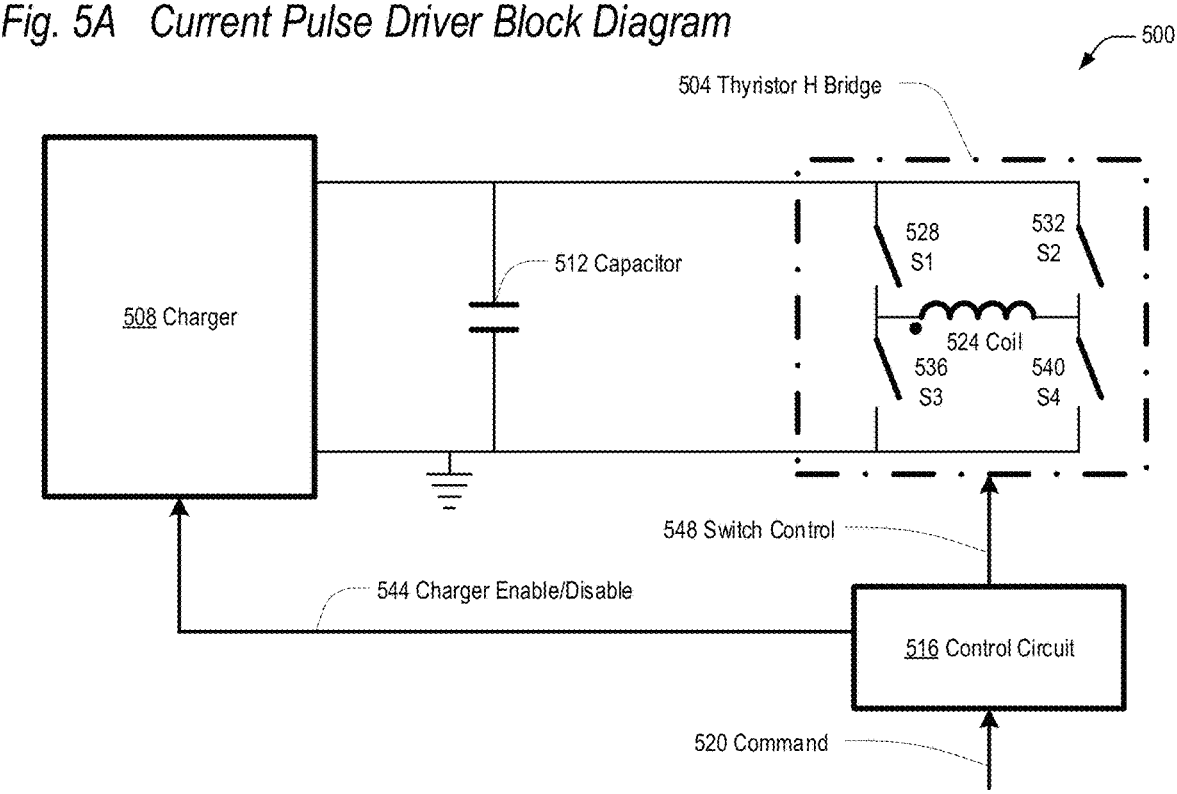
*Fig. 5B   Current Pulse Driver Charging Phase*
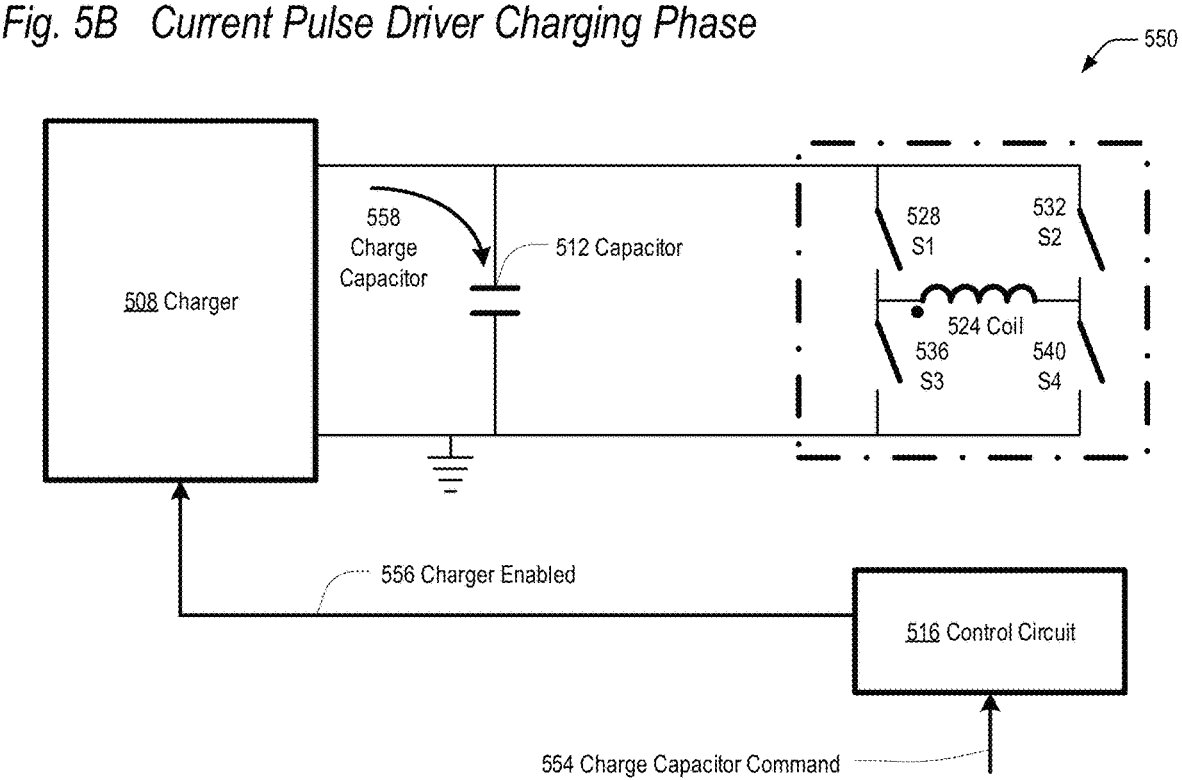

*Fig. 5C   Discharging Capacitor in Forward Direction Through Coil*
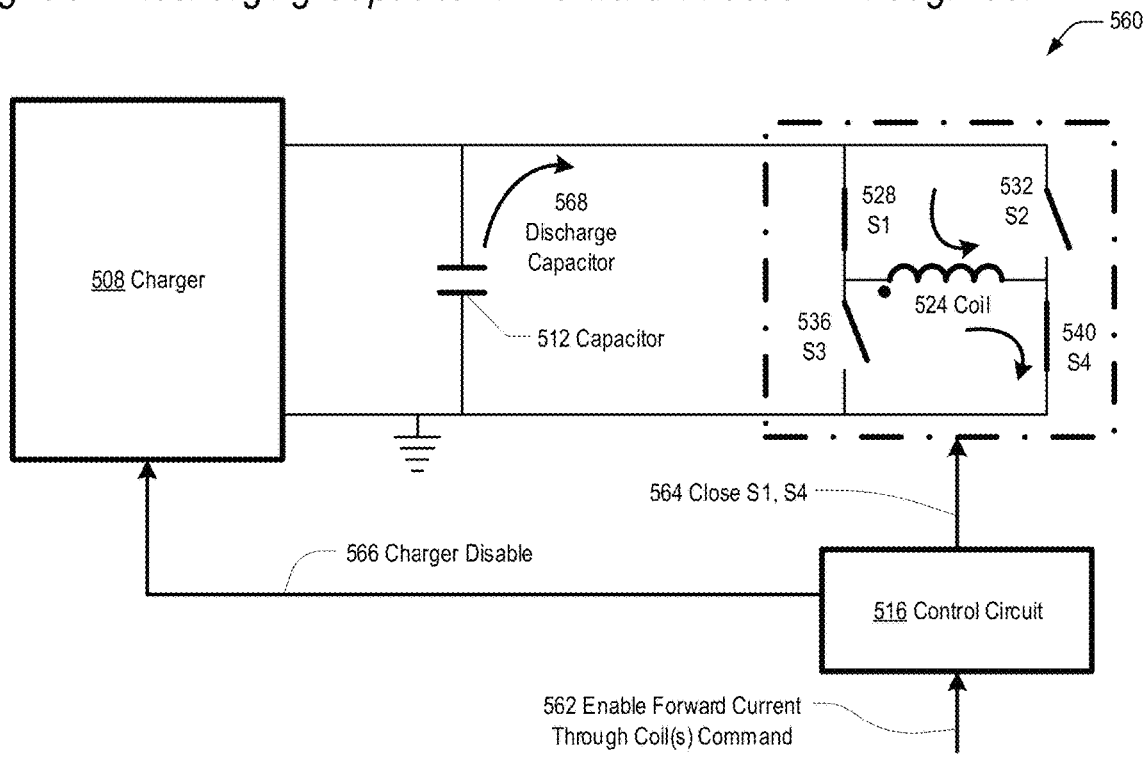
*Fig. 5D   Discharging Capacitor in Reverse Direction Through Coil*
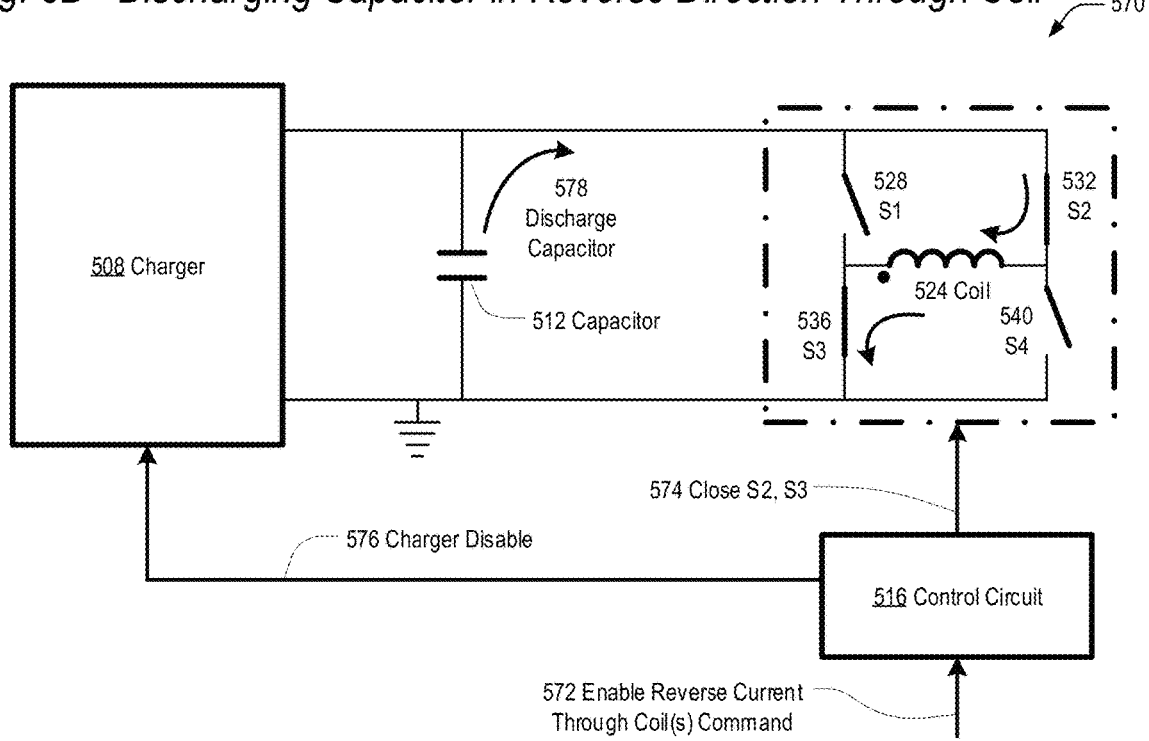

*Fig. 5E Current Pulse Driver With Multiple Coils*
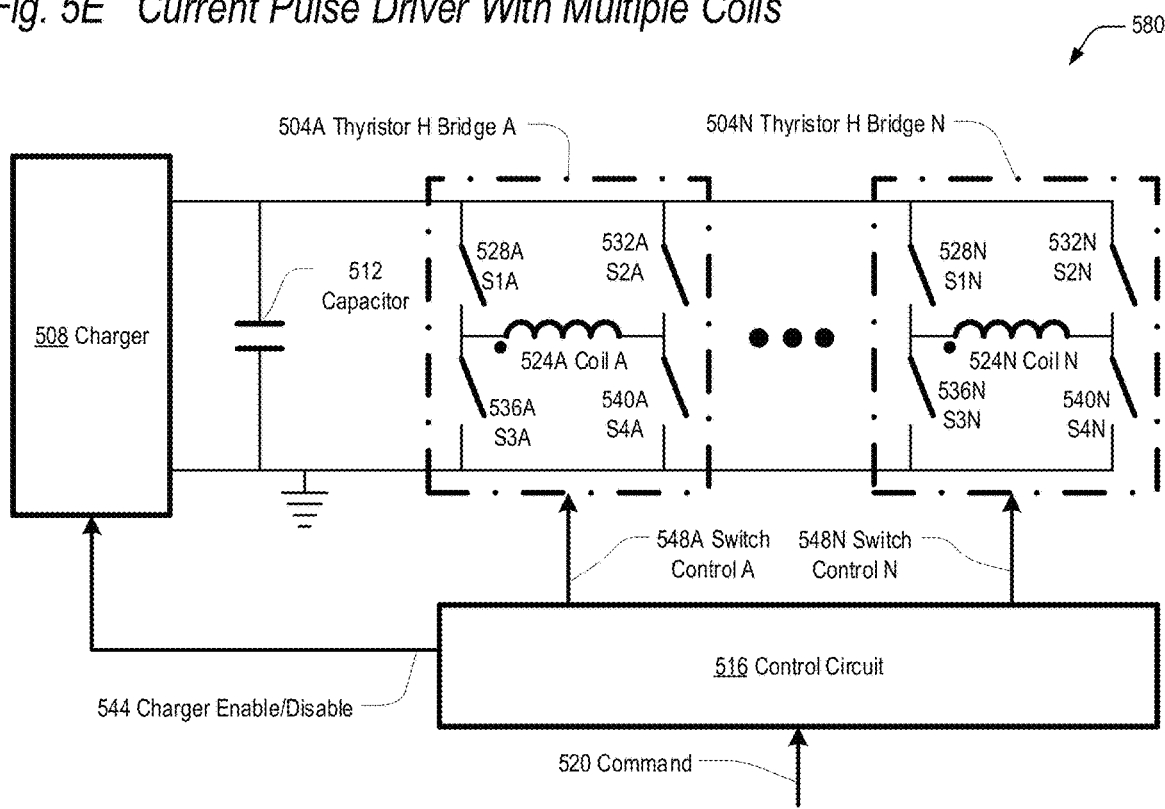
*Fig. 5F Current Pulse Driver With Multiple Coils*
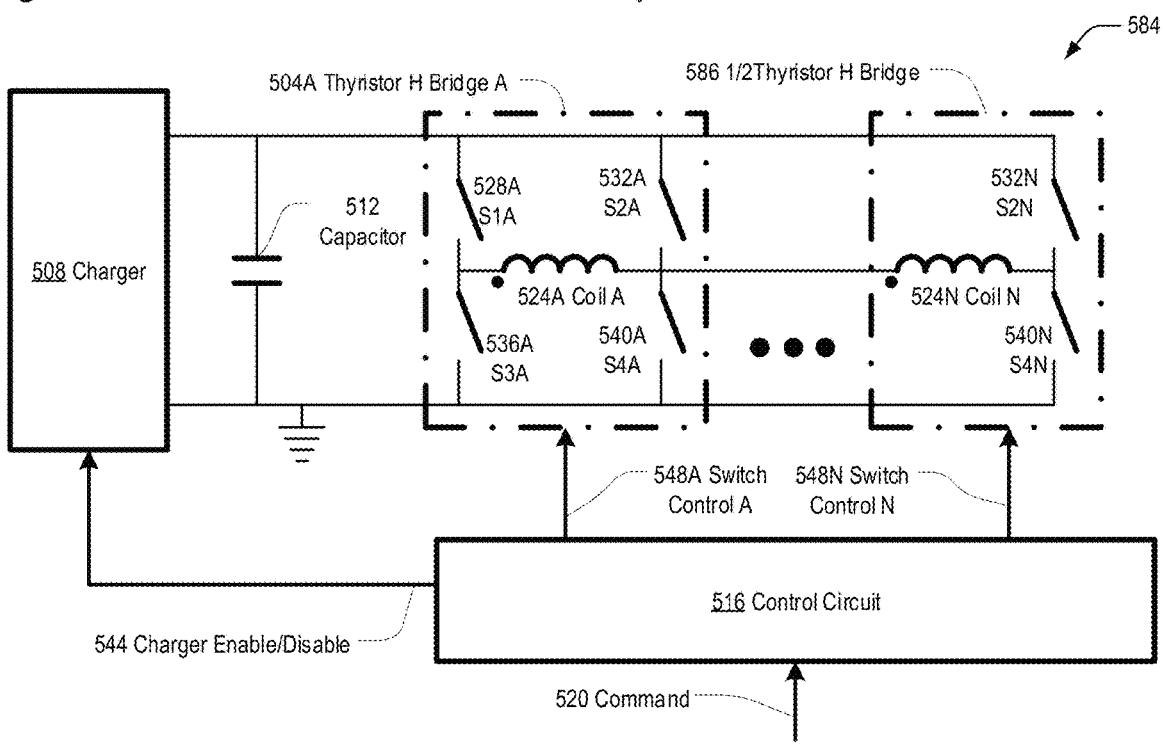

Fig. 6A  Magnetization Diagram Using Repeated Current Pulses
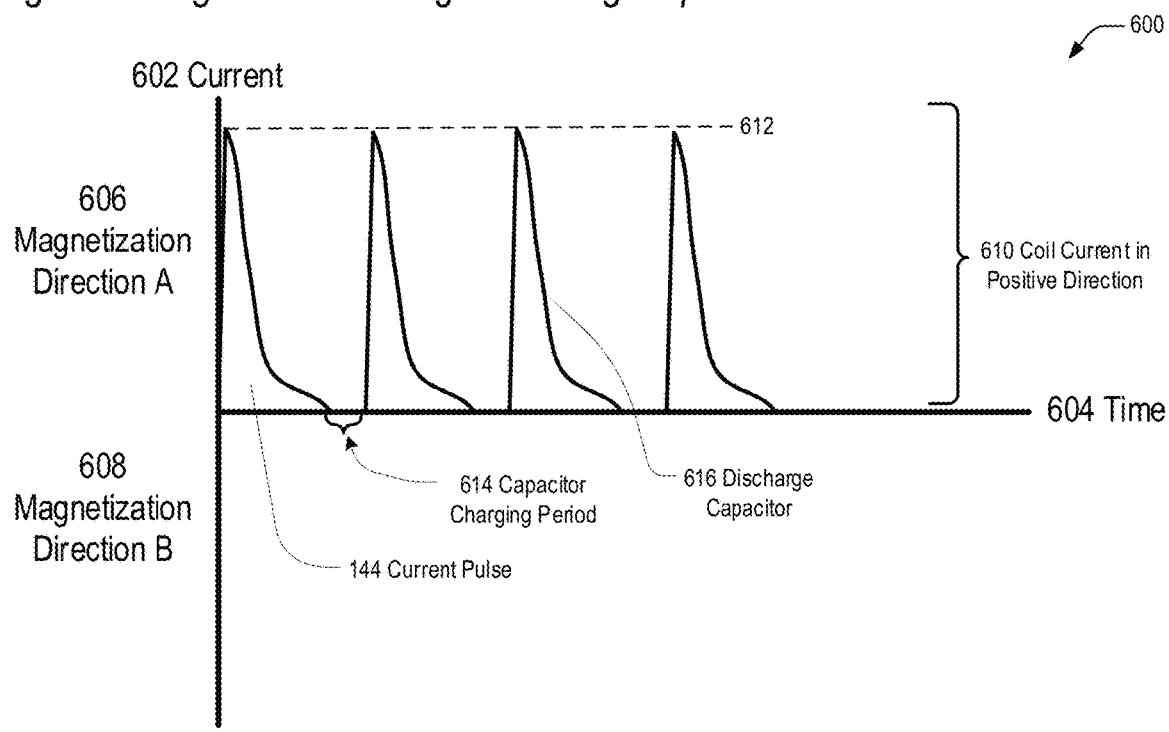
Fig. 6B  Demagnetization Diagram Using Alternating Single Current Pulses
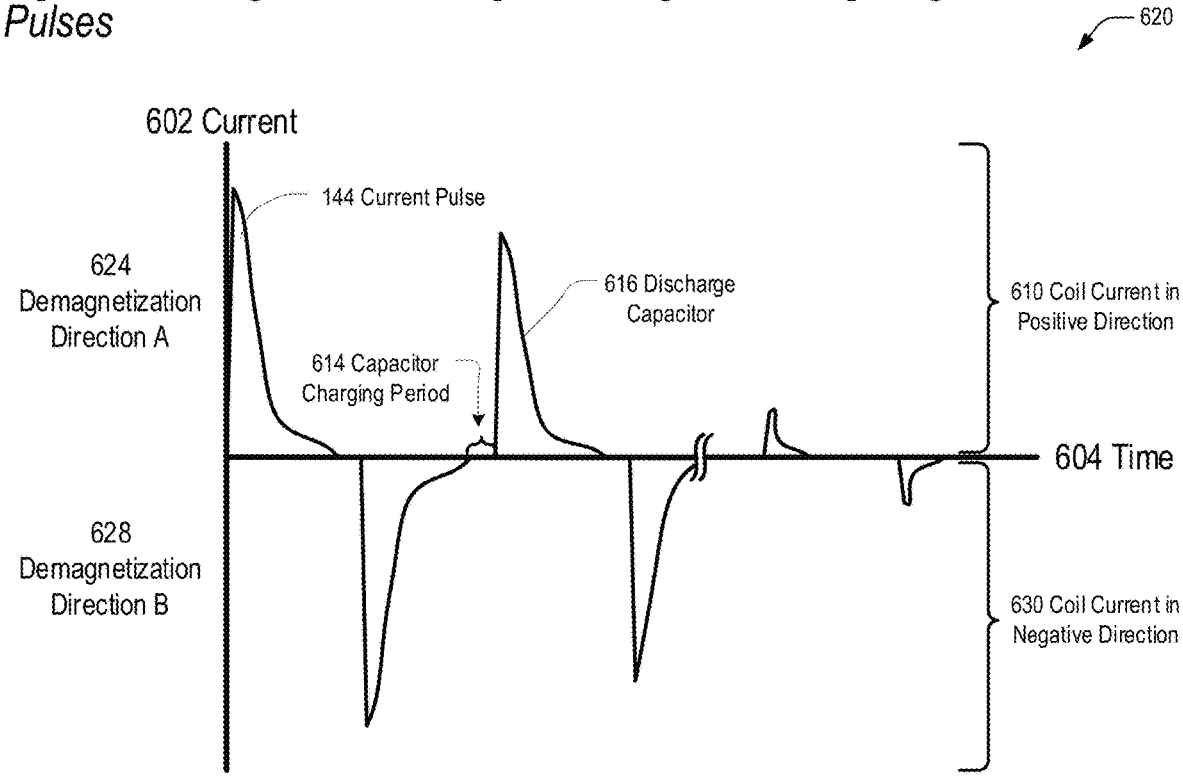

*Fig. 6C Example Magnetization Timing*
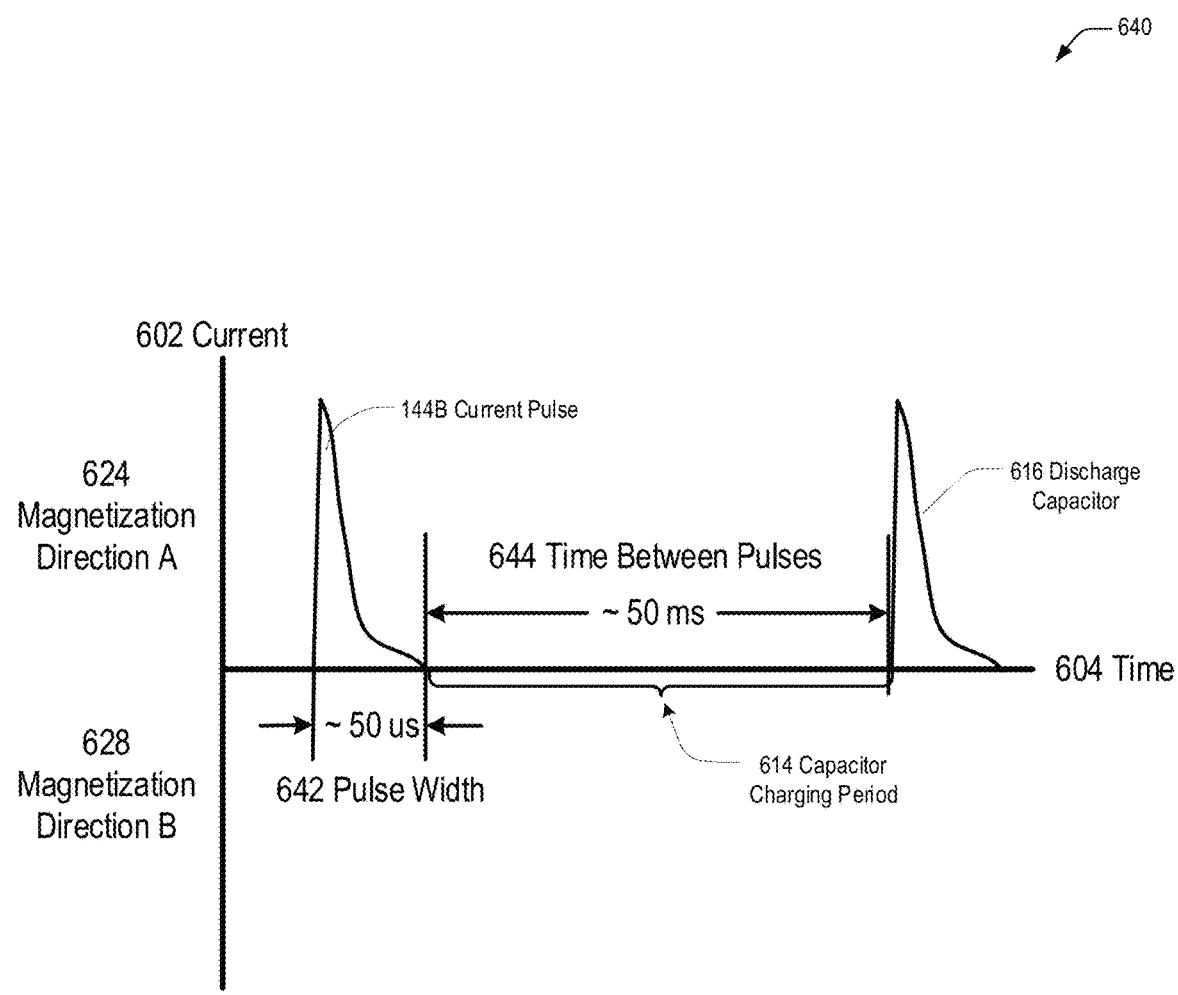

*Fig. 6D   Magnetization Diagram for Hard Magnetic Material*
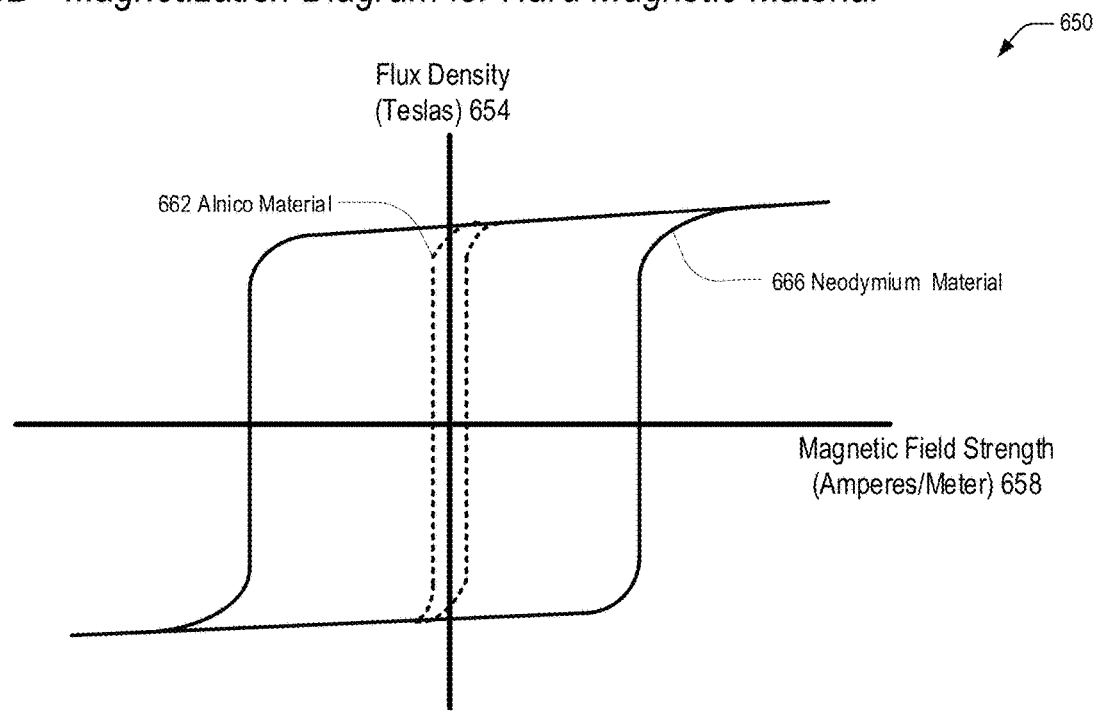
*Fig. 6E   Magnetization Diagram for Soft Magnetic Material*
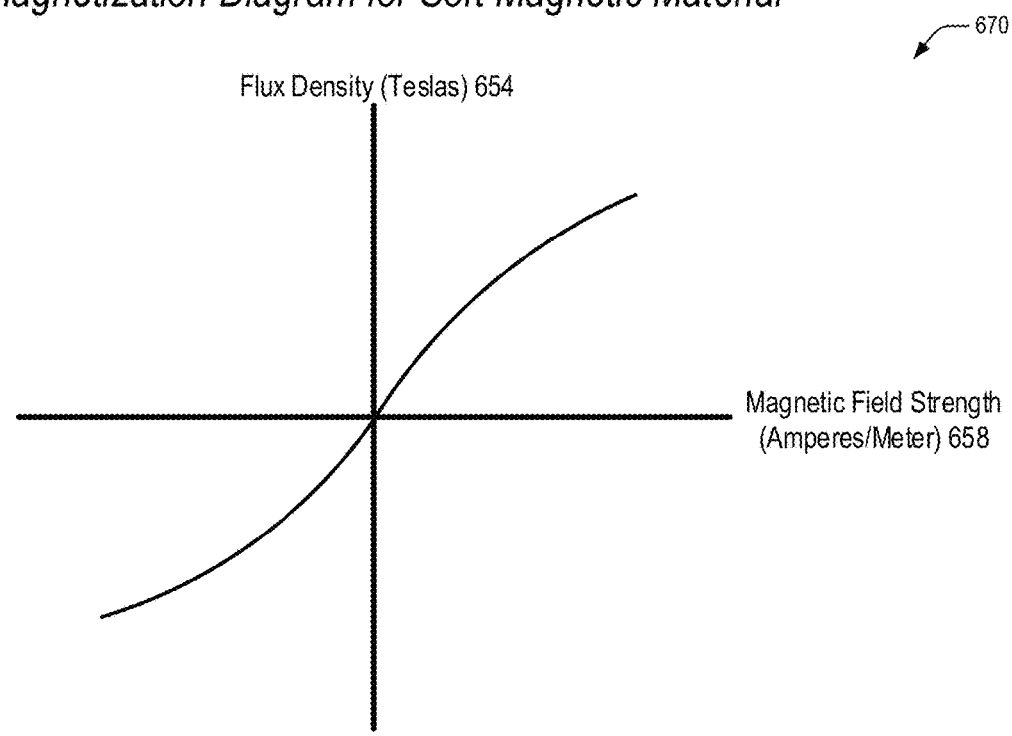

Fig. 7A  Electropermanent Magnet Array With Serpentine Layered Coil
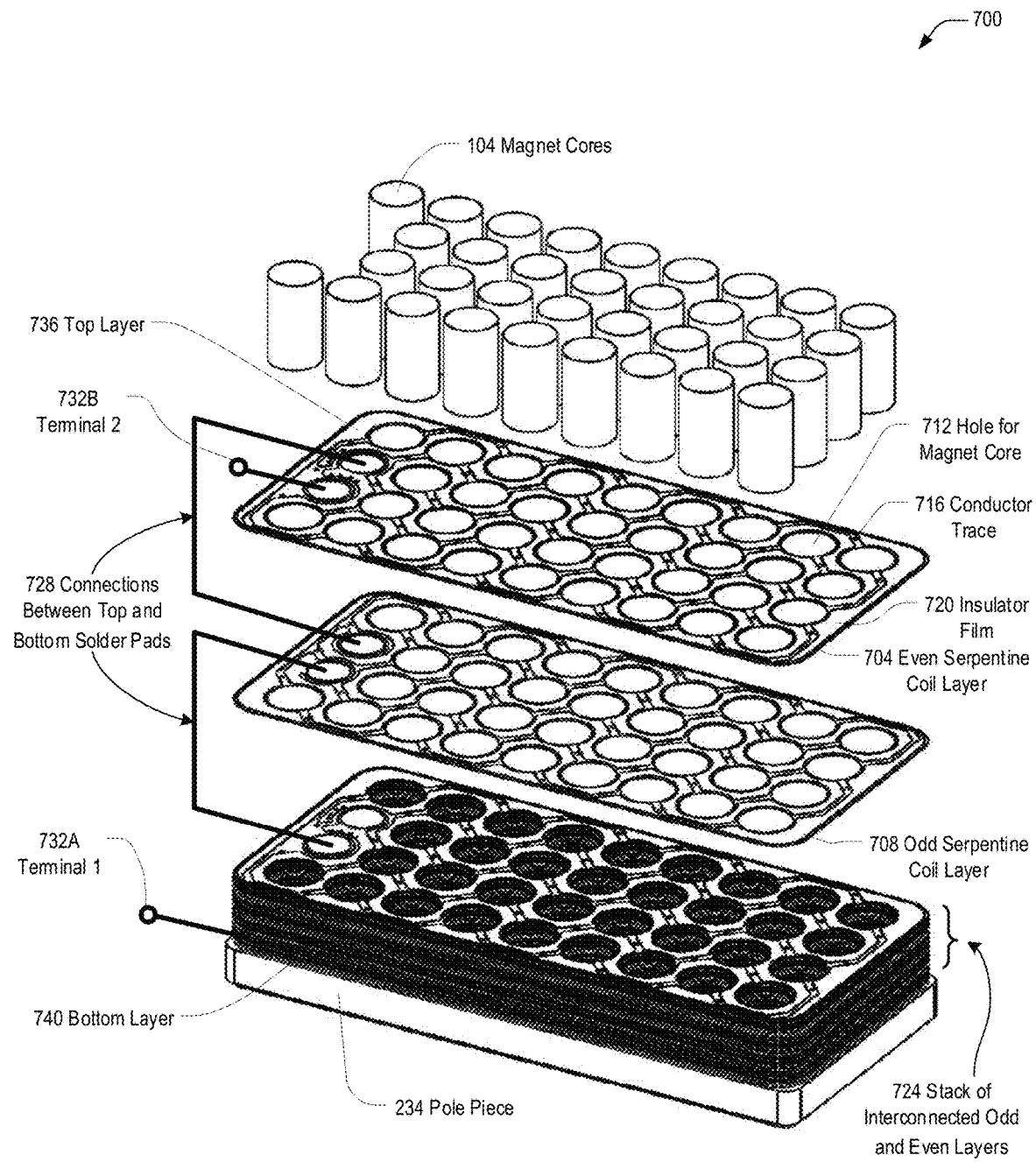

*Fig. 7B  Even Serpentine Coil Layer Detail*
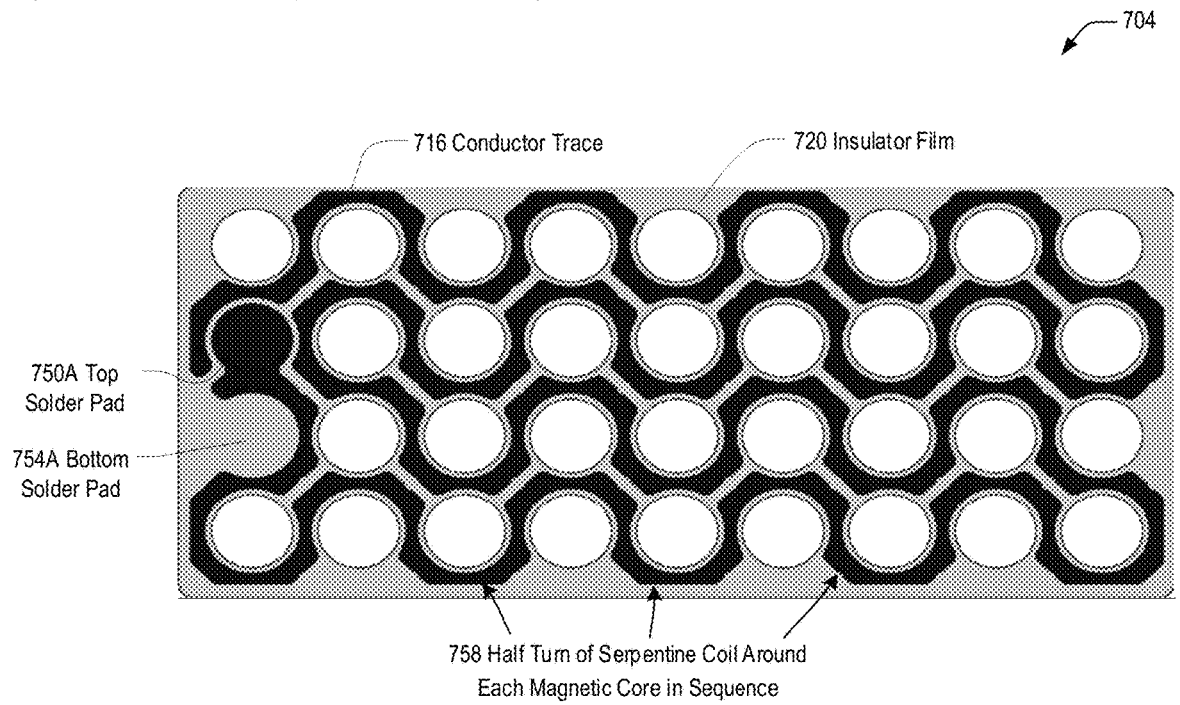
*Fig. 7C  Odd Serpentine Coil Layer Detail*
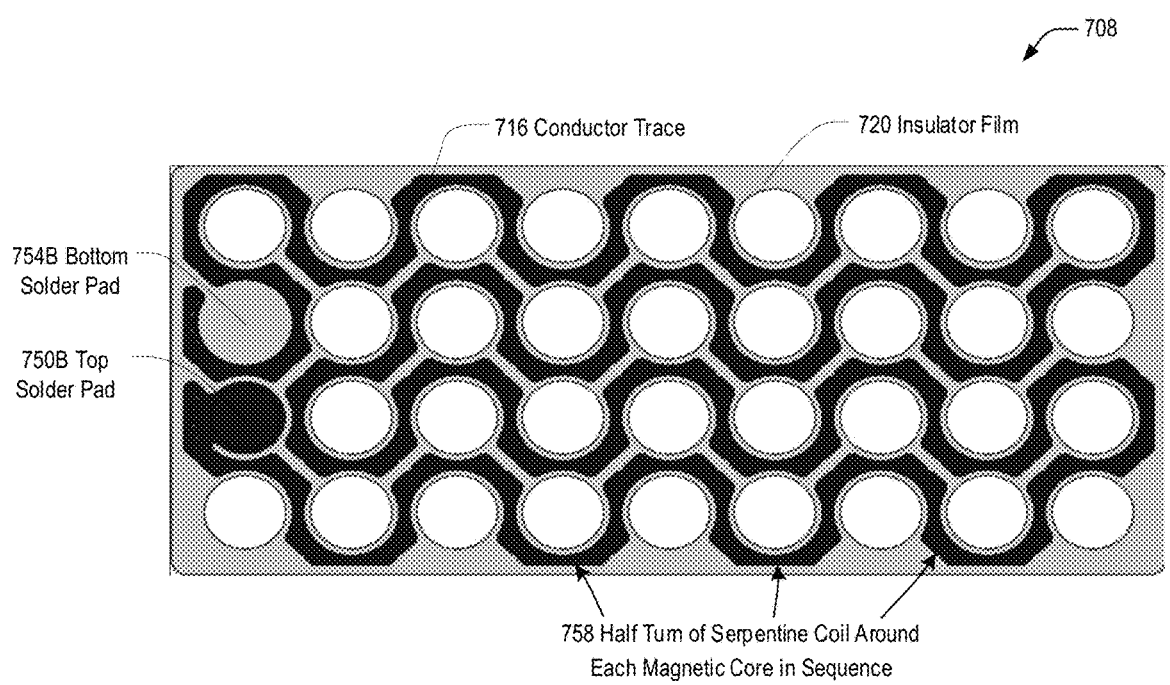

*Fig. 7D   Spiral Coil Layer Interconnection Detail*
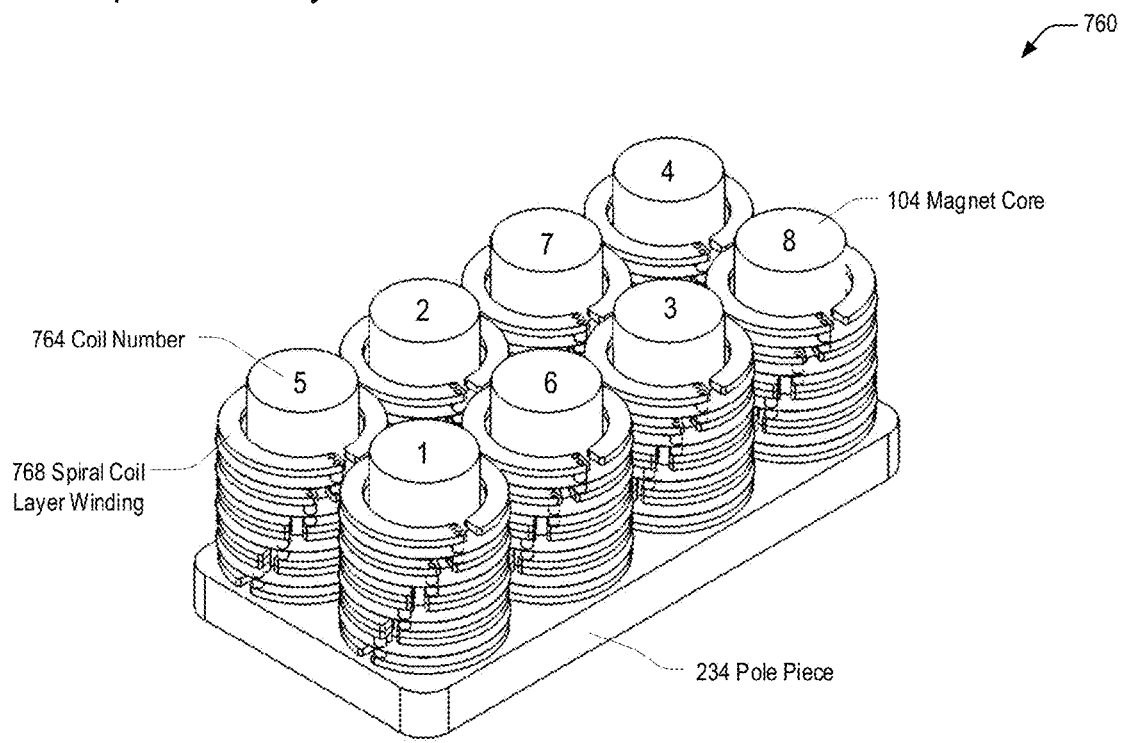
*Fig. 7E   Spiral Coil Layer Detail*
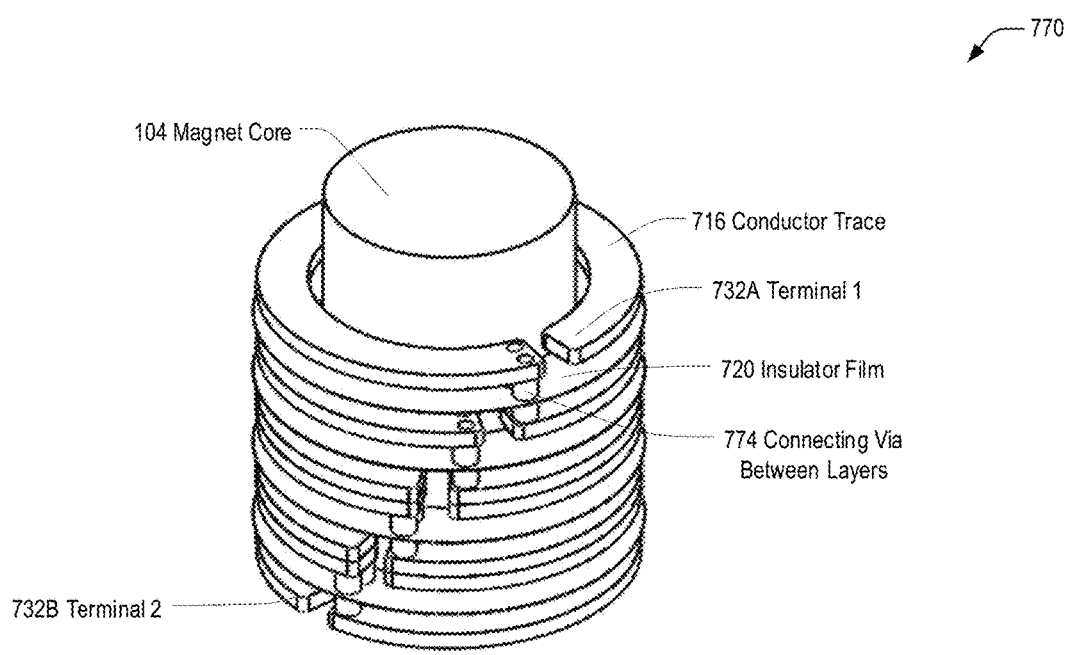

*Fig. 7F Electropermanent Magnet Array for High Force/Short Range Attraction*
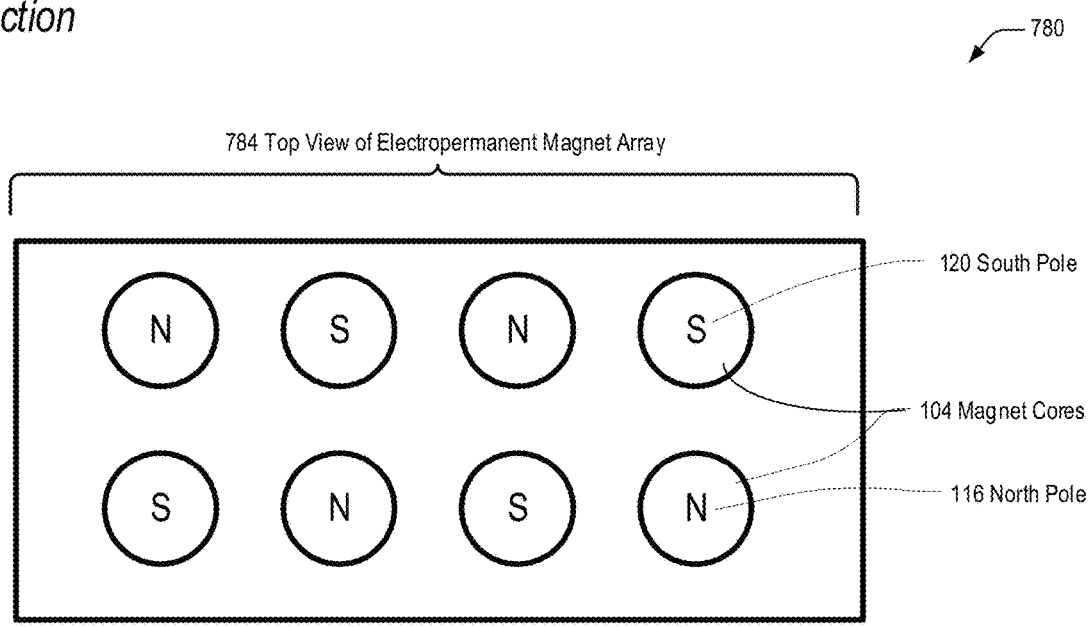
*Fig. 7G Electropermanent Magnet Array for Lower Force/Longer Range Attraction*
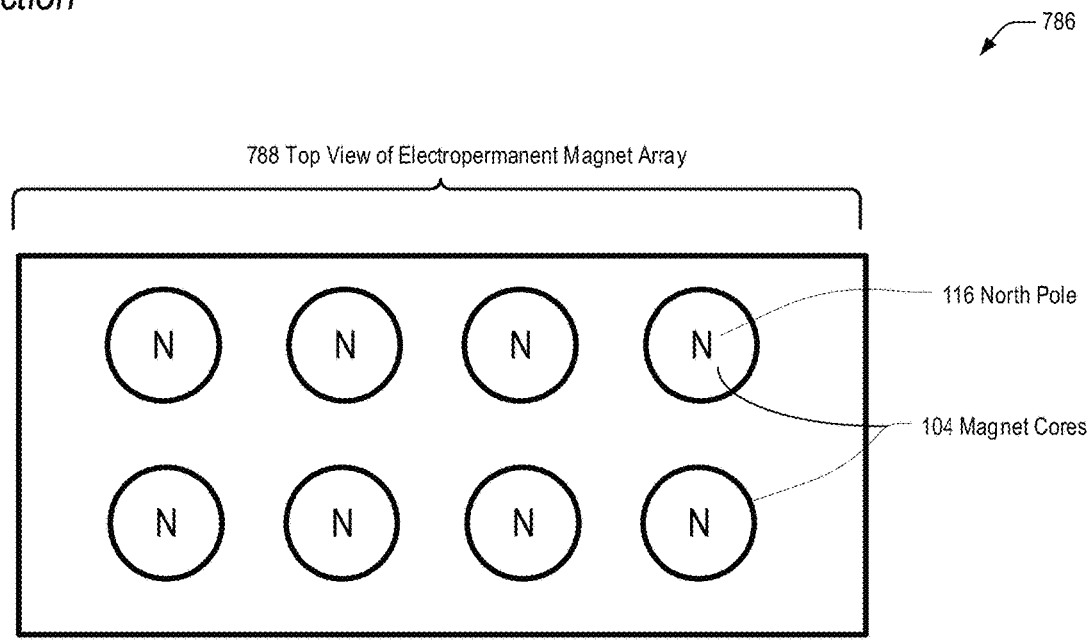

Fig. 7H  Demagnetized Electropermanent Magnet Array
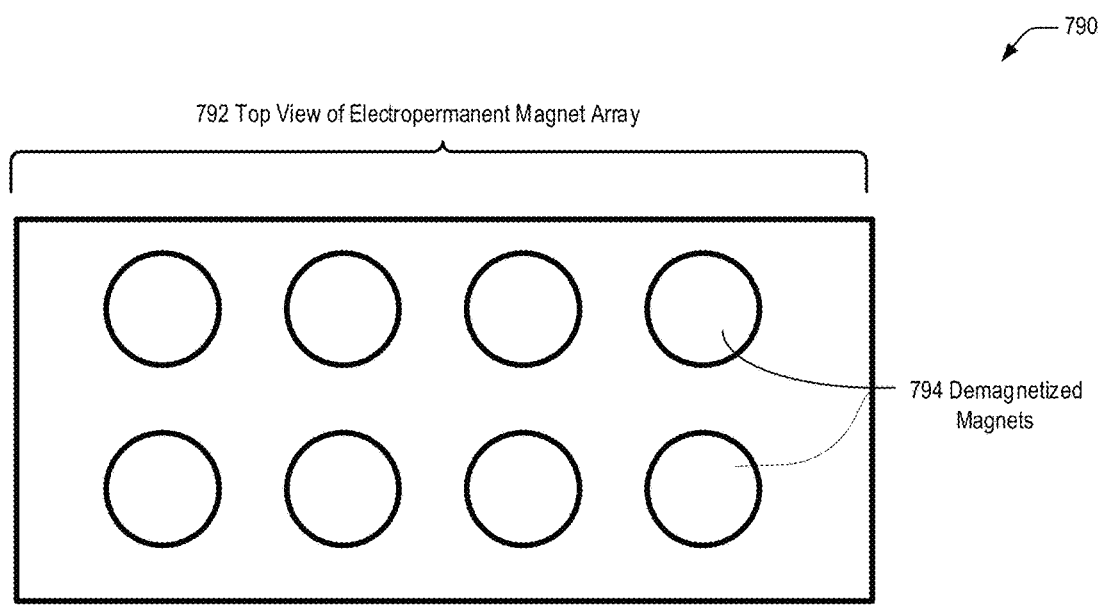

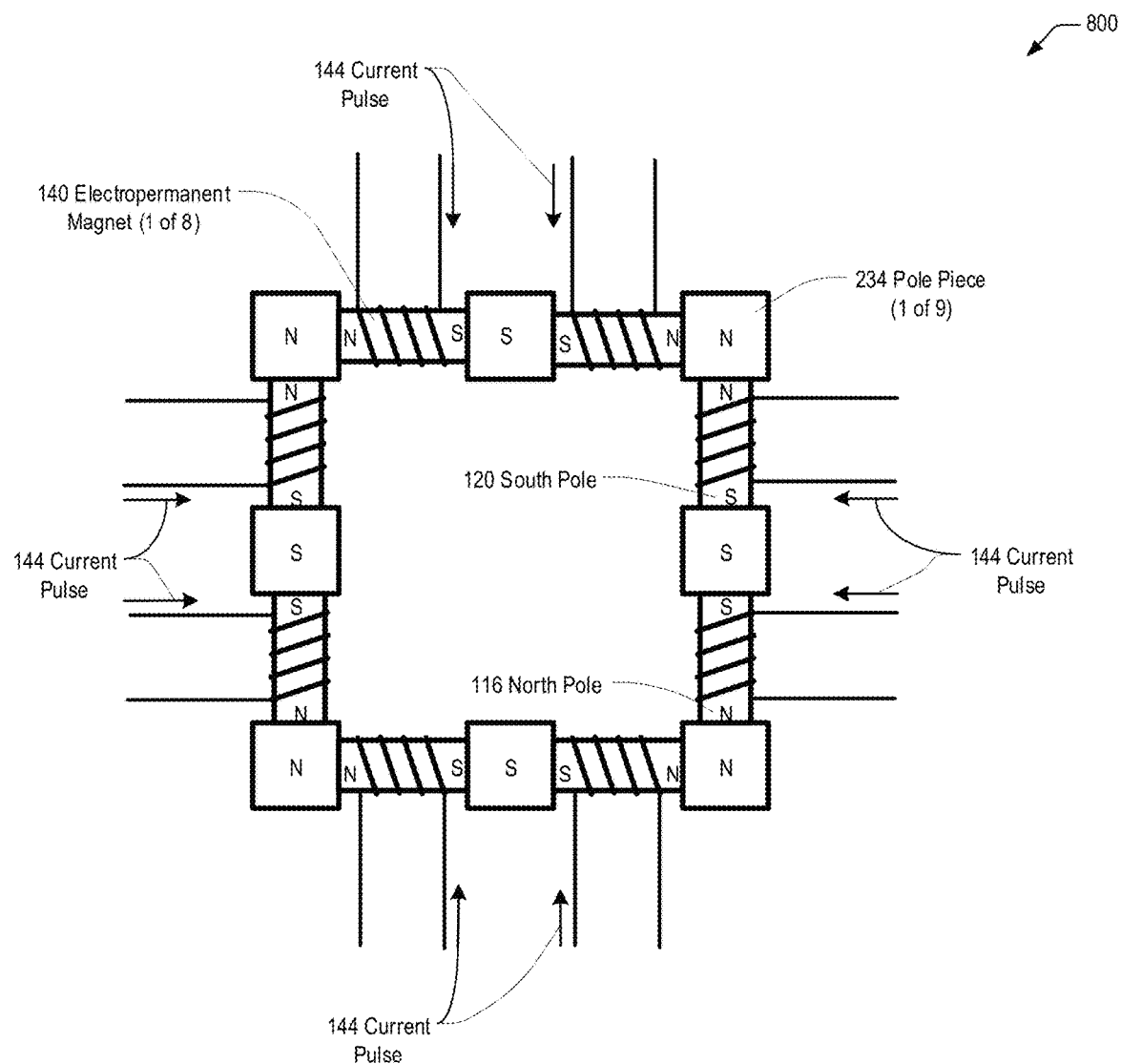
*Fig. 8A   End-on-End 2-Dimensional Electropermanent Magnet Array Polarized for Short Range Attraction*

Fig. 8B  Side View of End-On-End Electropermanent Magnet Array and Magnetic Flux Lines
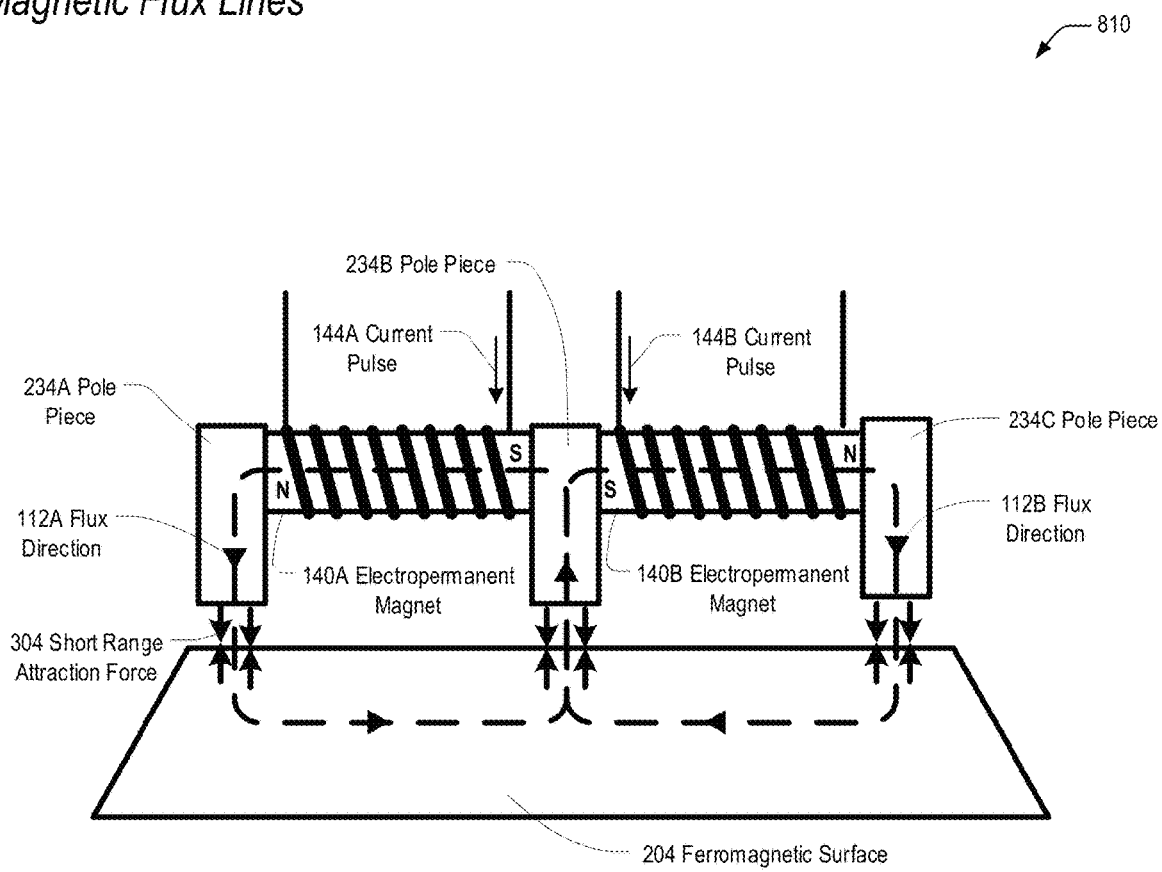

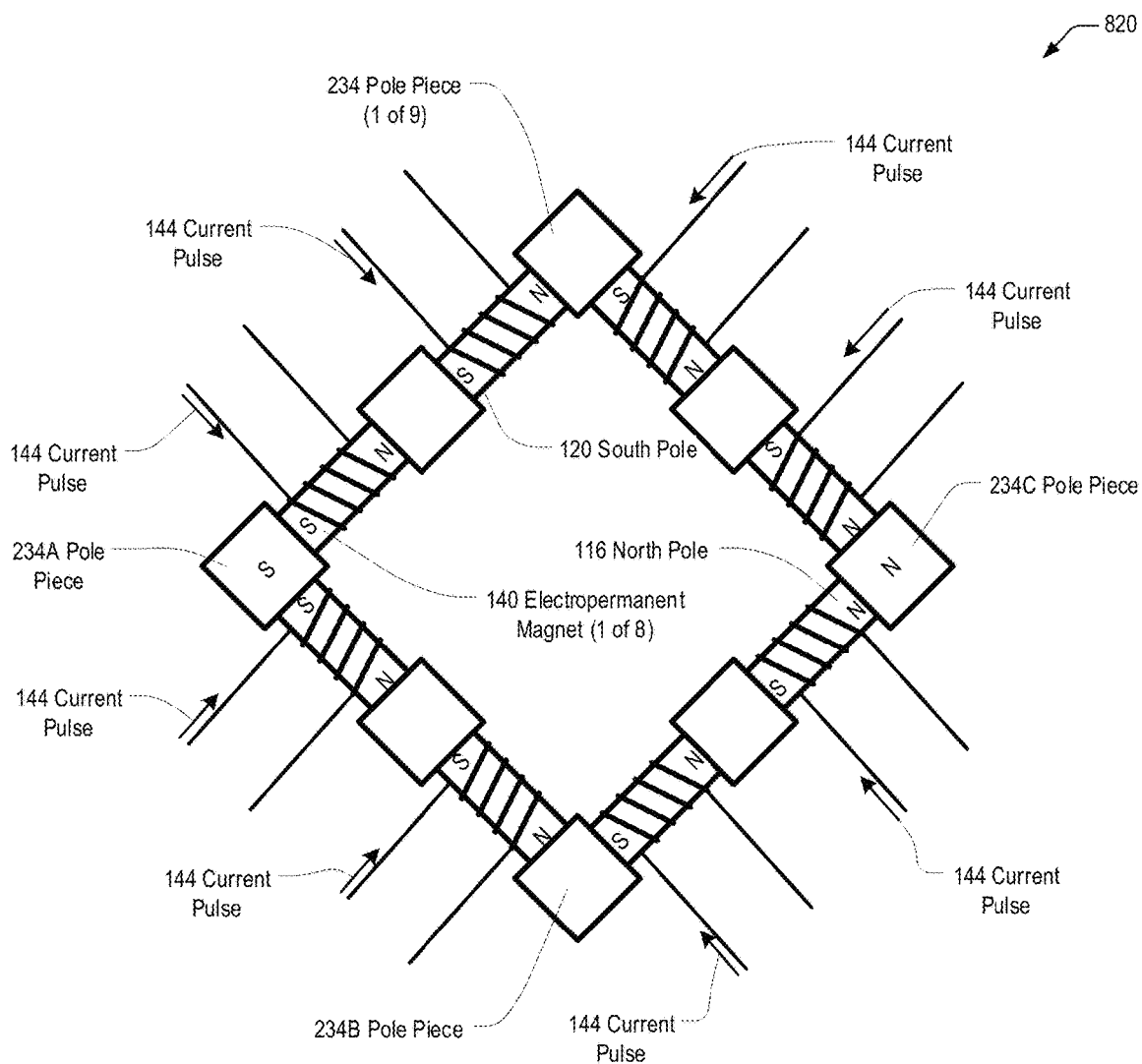
*Fig. 8C   End-on-End 2-Dimensional Electropermanent Magnet Array Polarized for Longer Range Attraction*

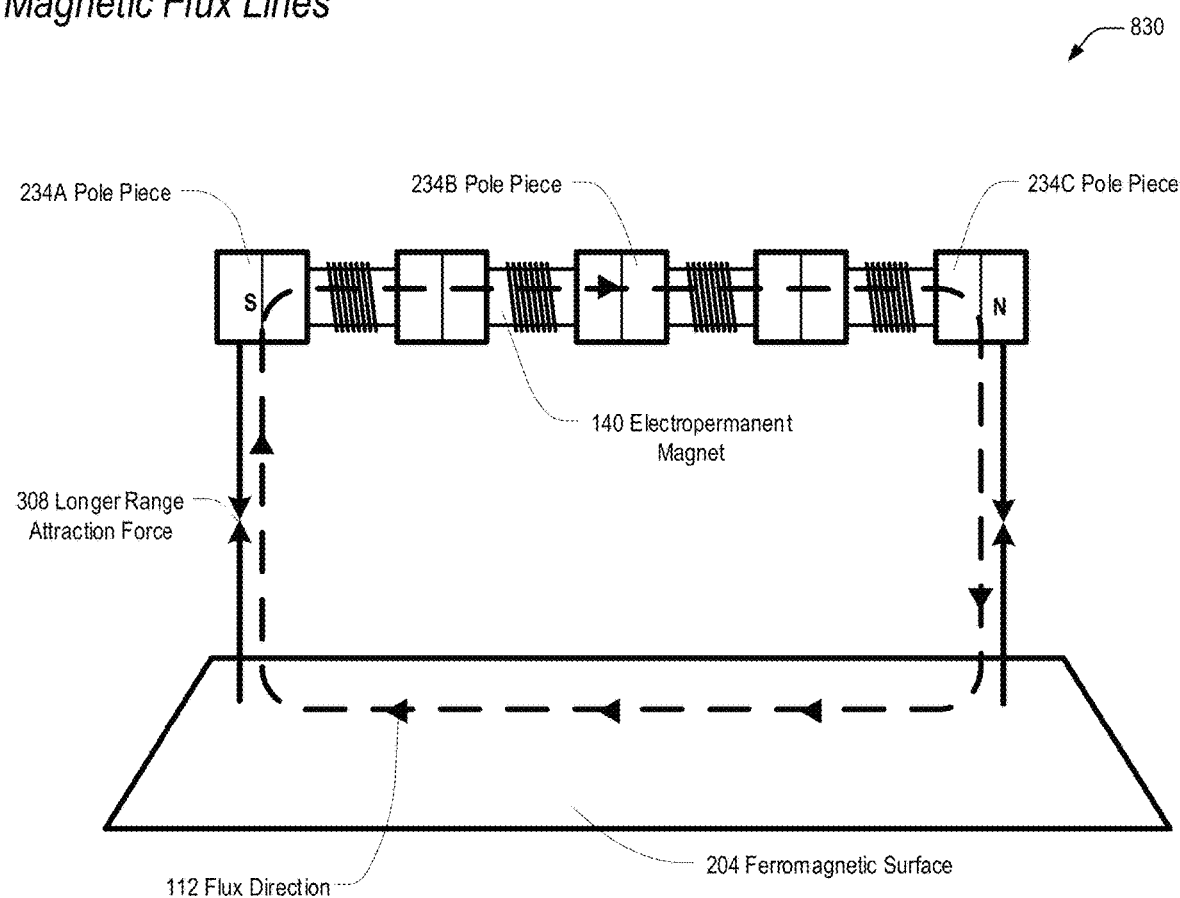
Fig. 8D  Side View of End-On-End Electropermanent Magnet Array and Magnetic Flux Lines

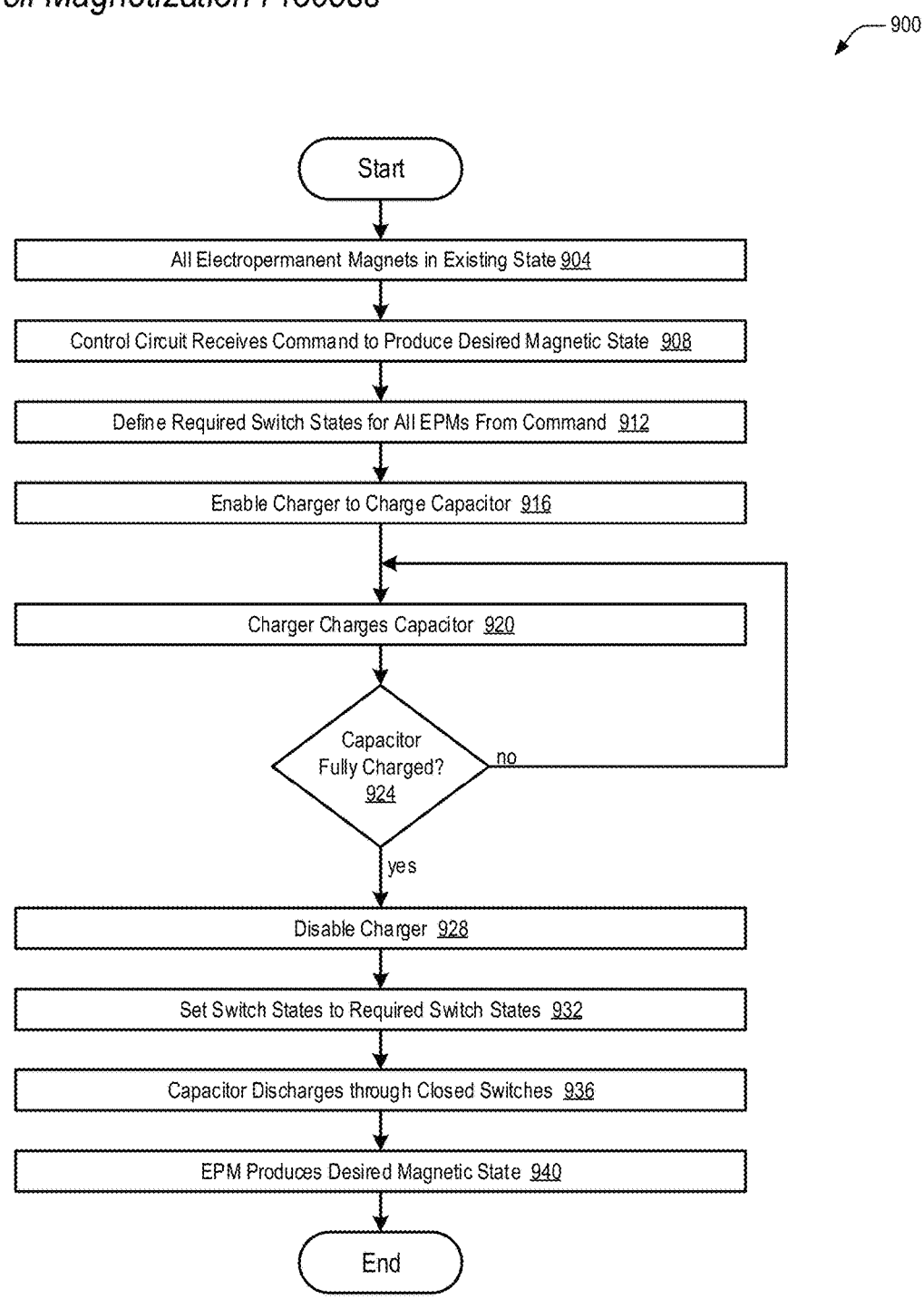
Fig. 9A Coil Magnetization Process

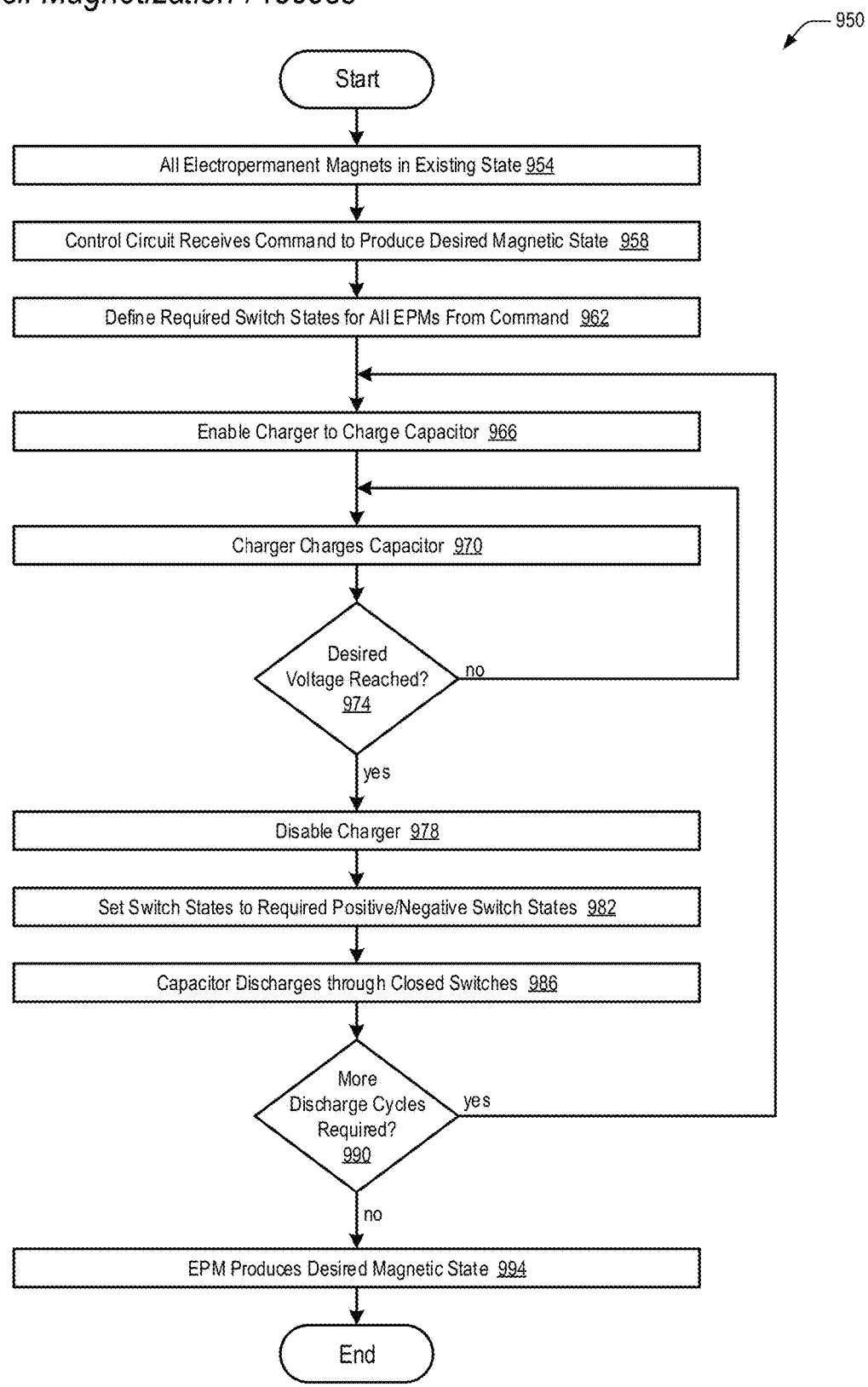
Fig. 9B Coil Magnetization Process

*Fig. 10 Coil Demagnetization Process*
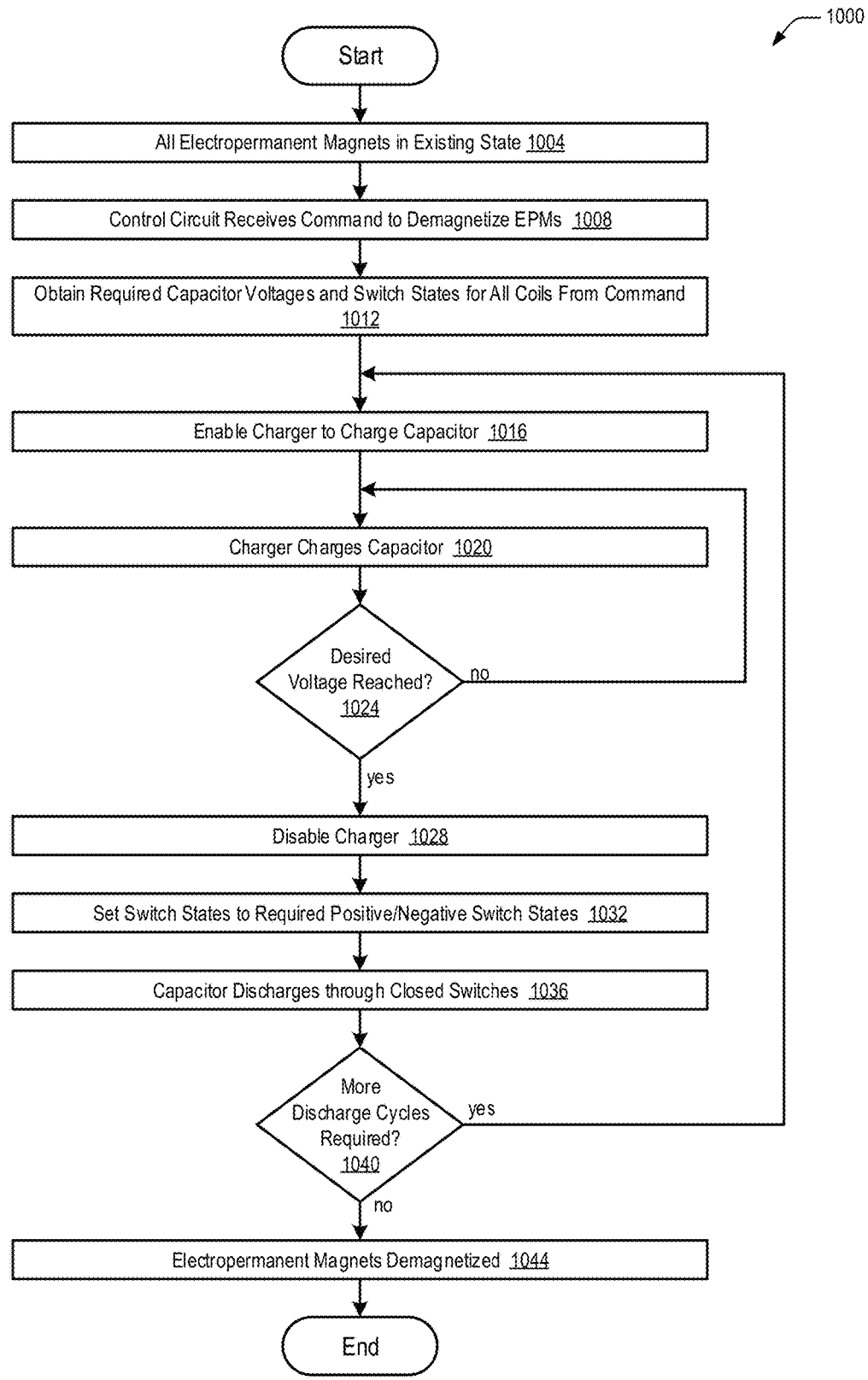

*Fig. 11A  Side View of Magnetometer Installation For Side-by-Side Array*
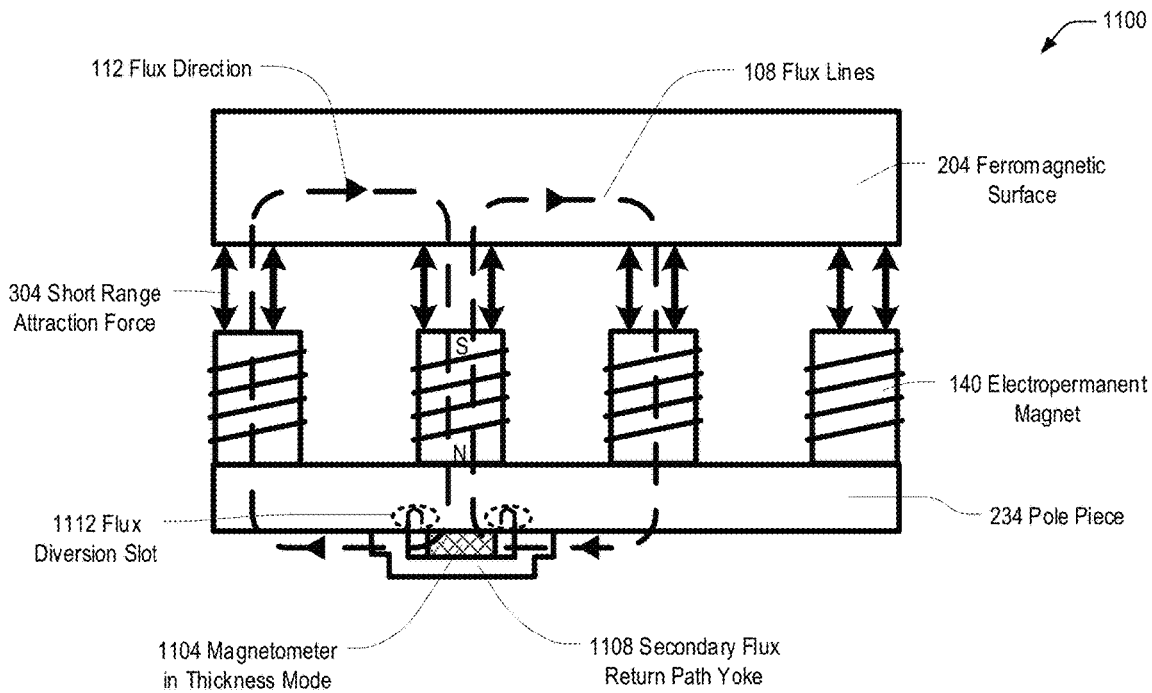
*Fig. 11B  Bottom View of Magnetometer Installation*
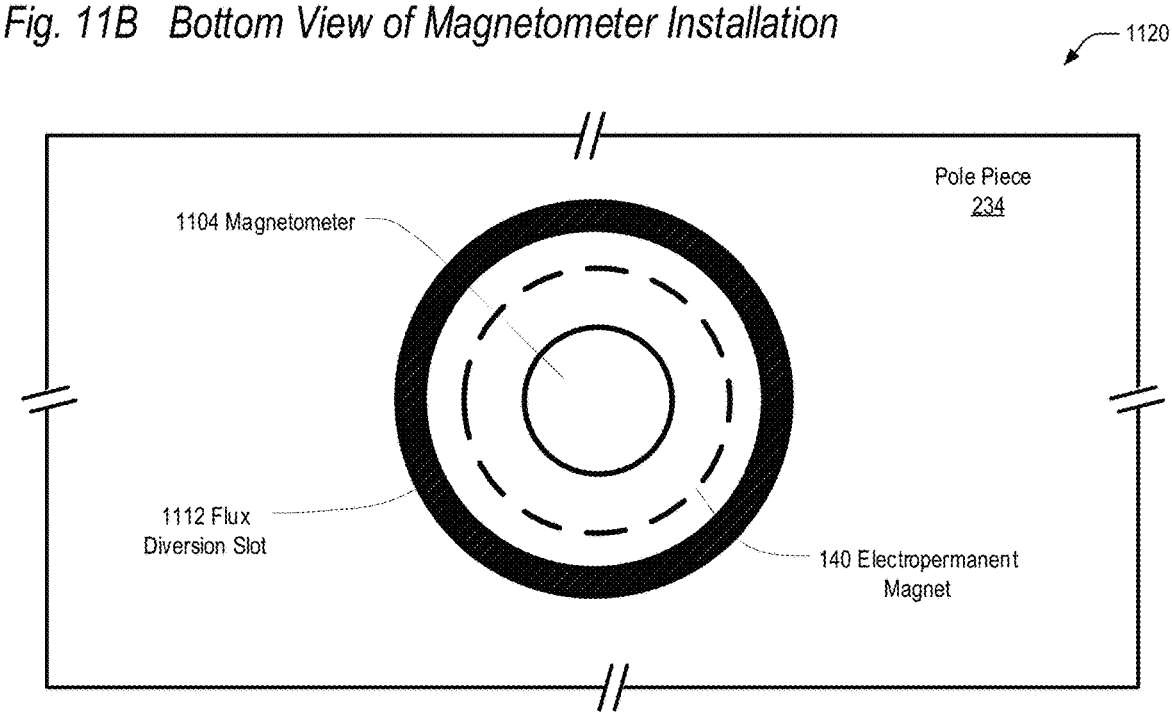

*Fig. 11C  Side view of Thickness Mode Flux Sensor for End-on-End Array*
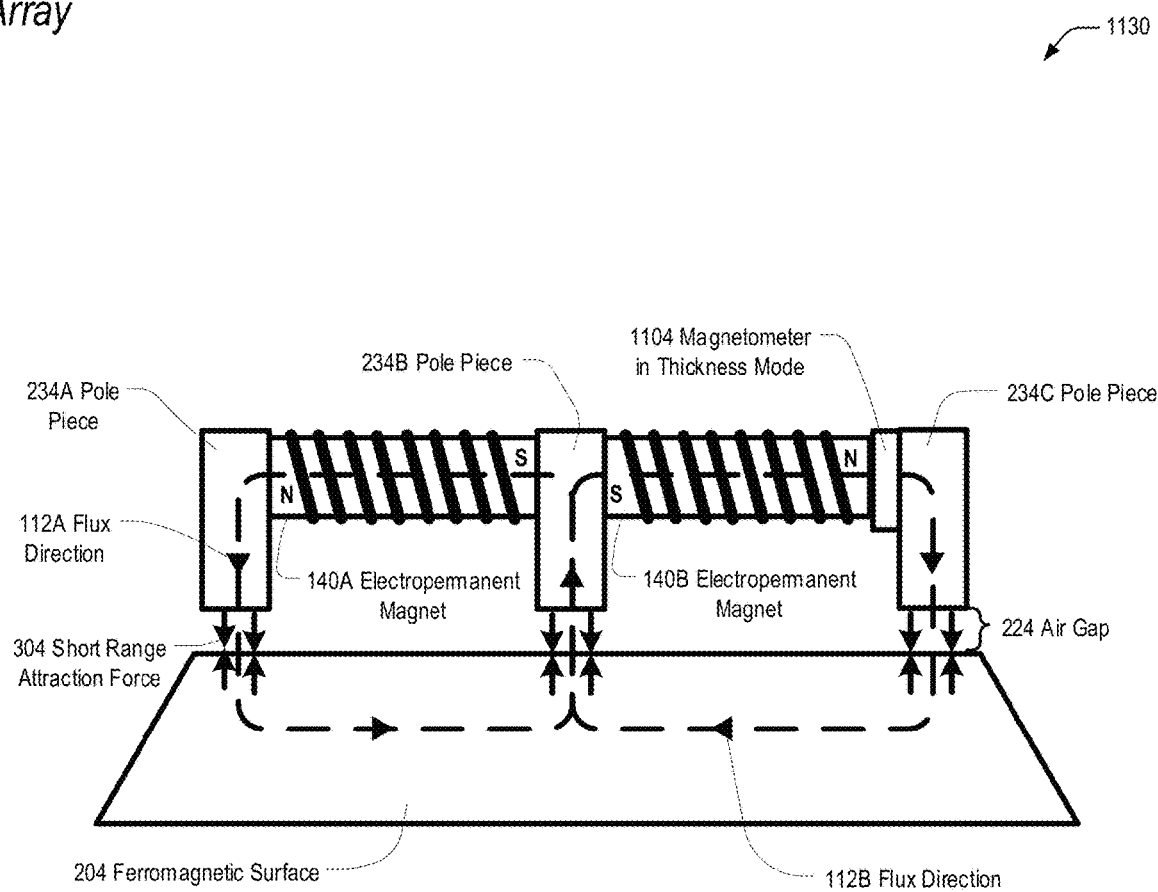

DUAL MODE ELECTROPERMANENT MAGNET ARRAY

CROSS REFERENCE TO RELATED APPLICATIONS

This application is a continuation of application Ser. No. 16/876,096, filed May 17, 2020, which claims priority from Provisional U.S. application 62/849,204, filed May 17, 2019, entitled ELECTROPERMANENT MAGNET, which are hereby incorporated by reference for all purposes.

FIELD

The present application is directed to apparatuses and methods related to electropermanent magnets. In particular, the present application is directed to apparatuses and methods for attracting ferrous targets with programmable electropermanent magnet arrays.

BACKGROUND

A magnet is a material or object that produces a magnetic field. This magnetic field is invisible but is responsible for the most notable property of a magnet: a force that pulls on other ferromagnetic materials, such as iron. A permanent magnet is an object made from a magnetically hard material that is magnetized and creates its own persistent magnetic field. Materials that can be magnetized, which are also the ones that are strongly attracted to a magnet, are called ferromagnetic. These include the elements iron, nickel and cobalt, some alloys of rare-earth metals, and some naturally occurring minerals such as lodestone. Although ferromagnetic materials are the only ones attracted to a magnet strongly enough to be commonly considered magnetic, all other substances respond weakly to a magnetic field, by one of several other types of magnetism.

Ferromagnetic materials can be divided into magnetically "soft" materials like annealed iron, which can be magnetized but do not tend to stay magnetized, and magnetically "hard" materials, which do. Permanent magnets are made from "hard" ferromagnetic materials such as alnico, an aluminum, nickel, and cobalt alloy, alloys of neodymium and other rare earth materials, and ferrite that are subjected to special processing in a strong magnetic field during manufacture to align their internal microcrystalline structure, making them very hard to demagnetize. To demagnetize a saturated magnet, a certain magnetic field must be applied, and this threshold depends on coercivity of the respective material. "Hard" materials have high coercivity, whereas "soft" materials have low coercivity. The overall strength of a magnet is measured by its BH product. The local strength of magnetism in a material is measured by its magnetization.

An electromagnet is made from a coil of wire that acts as a magnet when an electric current passes through it but stops being a magnet when the current stops. Often, the coil is wrapped around a core of "soft" ferromagnetic material such as mild steel, which greatly enhances the magnetic field produced by the coil.

SUMMARY

The present application is directed to solving disadvantages of the prior art. In accordance with embodiments of the present application, an electropermanent magnet array may be provided. The electropermanent magnet array includes one or more of a plurality of electropermanent magnets, arranged in a parallel fashion, a plurality of switching circuits, each switching circuit coupled to a different electropermanent magnet of the plurality of electropermanent magnets, and a control circuit, coupled to the plurality of switching circuits. The control circuit is configured to receive commands to control the plurality of switching circuits to demagnetize the plurality of electropermanent magnets, magnetize the plurality of electropermanent magnets to produce a first magnetic field with a strength and an attraction distance and magnetize the plurality of electropermanent magnets to produce a second magnetic field with a lower strength and greater attraction distance than the first magnetic field.

In accordance with another embodiment of the present application, a method may be provided. The method may include one or more of configuring, by a control circuit, a plurality of switching circuits coupled to a plurality of electropermanent magnets to electrically isolate an energy storage device coupled to the plurality of switching circuits from the plurality of electropermanent magnets, configuring, by the control circuit, a charging circuit coupled to the energy storage device to charge the energy storage device, and configuring, by the control circuit, the plurality of switching circuits for one of demagnetizing the plurality of electropermanent magnets, magnetizing the plurality of electropermanent magnets to produce a first magnetic field with a strength and an attraction distance, and magnetizing the plurality of electropermanent magnets to produce a second magnetic field with a lower strength and greater attraction distance than the first magnetic field.

BRIEF DESCRIPTION OF THE DRAWINGS

FIG. 1A is a diagram illustrating a hard magnetic core in accordance with the conventional art.

FIG. 1B is a diagram illustrating an energized coil winding in accordance with the conventional art.

FIG. 1C is a diagram illustrating an electropermanent magnet charged by a single polarity current pulse through a coil in accordance with the conventional art.

FIG. 1D is a diagram illustrating an electropermanent magnet demagnetized by alternating polarity current pulses through a coil in accordance with the conventional art.

FIG. 1E is a diagram illustrating magnetic flux neutralized by a current in a coil in accordance with the conventional art.

FIG. 1F is a diagram illustrating a reduction in net magnetic flux in accordance with the conventional art.

FIG. 1G is a diagram illustrating an electropermanent magnet demagnetized in accordance with the conventional art.

FIG. 2A is a diagram illustrating a simple electromagnet in accordance with the conventional art.

FIG. 2B is a diagram illustrating a simple energized electromagnet in accordance with the conventional art.

FIG. 2C is a diagram illustrating a biased electromagnet with zero current in accordance with the conventional art.

FIG. 2D is a diagram illustrating a biased electromagnet with flux canceled in accordance with the conventional art.

FIG. 2E is a diagram illustrating hard and semi-hard magnets with aligned poles in accordance with the conventional art.

FIG. 2F is a diagram illustrating hard and semi-hard magnets with poles in opposition in accordance with the conventional art.

FIG. 2G is a diagram illustrating an electropermanent magnet charged by a current pulse in accordance with the conventional art.

FIG. 2H is a diagram illustrating an electropermanent magnet demagnetized by alternating pulses in accordance with the conventional art.

FIG. 3A is a diagram illustrating a side-by-side electropermanent magnet array with alternating polarity for short range attraction in accordance with embodiments of the present application.

FIG. 3B is a diagram illustrating a side-by-side electropermanent magnet array with matching polarity for longer range attraction in accordance with embodiments of the present application.

FIG. 3C is a diagram illustrating a demagnetized side-by-side electropermanent magnet array in accordance with embodiments of the present application.

FIG. 3D is a magnetic flux diagram for short range attraction in accordance with embodiments of the present application.

FIG. 3E is a magnetic flux diagram for longer range attraction in accordance with embodiments of the present application.

FIG. 4A is a diagram illustrating an end-on-end electropermanent magnet array for short range attraction in accordance with embodiments of the present application.

FIG. 4B is a diagram illustrating an end-on-end electropermanent magnet array for longer range attraction in accordance with embodiments of the present application.

FIG. 4C is a diagram illustrating a demagnetized end-on-end electropermanent magnet array in accordance with embodiments of the present application.

FIG. 4D is a magnetic flux diagram for short range attraction in accordance with embodiments of the present application.

FIG. 4E is a magnetic flux diagram for longer range attraction in accordance with embodiments of the present application.

FIG. 5A is a block diagram of a current pulse driver in accordance with embodiments of the present application.

FIG. 5B is a block diagram illustrating a current pulse driver charging phase in accordance with embodiments of the present application.

FIG. 5C is a block diagram illustrating discharging a capacitor of an electropermanent magnet array in a forward direction through a coil in accordance with embodiments of the present application.

FIG. 5D is a block diagram illustrating discharging a capacitor of an electropermanent magnet array in a reverse direction through a coil in accordance with embodiments of the present application.

FIG. 5E is a first block diagram of an electropermanent magnet array current pulse driver with multiple coils in accordance with embodiments of the present application.

FIG. 5F is a second block diagram of an electropermanent magnet array current pulse driver with multiple coils in accordance with embodiments of the present application.

FIG. 6A is a magnetization diagram using repeated current pulses in accordance with embodiments of the present application.

FIG. 6B is a demagnetization diagram using alternating single current pulses in accordance with embodiments of the present application.

FIG. 6C is a diagram illustrating exemplary magnetization timing in accordance with embodiments of the present application.

FIG. 6D is a magnetization diagram illustrating both a hard magnetic material and a semi-hard magnetic material in accordance with embodiments of the present application.

FIG. 6E is a magnetization diagram for a soft magnetic material in accordance with embodiments of the present application.

FIG. 7A is a diagram illustrating an electropermanent magnet array with a serpentine layered coil in accordance with embodiments of the present application.

FIG. 7B is a diagram illustrating an even serpentine coil layer detail in accordance with embodiments of the present application.

FIG. 7C is a diagram illustrating an odd serpentine coil layer detail in accordance with embodiments of the present application.

FIG. 7D is a diagram illustrating spiral coil layer interconnection detail in accordance with embodiments of the present application.

FIG. 7E is a diagram illustrating spiral coil layer detail in accordance with embodiments of the present application.

FIG. 7F is a diagram illustrating a top view of an electropermanent magnet array for high force and short range attraction in accordance with embodiments of the present application.

FIG. 7G is a diagram illustrating a top view of an electropermanent magnet array for lower force and longer range attraction in accordance with embodiments of the present application.

FIG. 7H is a diagram illustrating a top view of a demagnetized electropermanent magnet array in accordance with embodiments of the present application.

FIG. 8A is a diagram illustrating an end-on-end 2-dimensional electropermanent magnet array polarized for short range attraction in accordance with embodiments of the present application.

FIG. 8B is a diagram illustrating a side view of an end-on-end electropermanent magnet array and magnetic flux lines in accordance with embodiments of the present application.

FIG. 8C is a diagram illustrating an end-on-end 2-dimensional electropermanent magnet array polarized for longer range attraction in accordance with embodiments of the present application.

FIG. 8D is a diagram illustrating a side view of an end-on-end electropermanent magnet array programmed for longer range attraction and magnetic flux lines in accordance with embodiments of the present application.

FIG. 9A is a flowchart illustrating a first coil magnetization process in accordance with embodiments of the present application.

FIG. 9B is a flowchart illustrating a second coil magnetization process in accordance with embodiments of the present application.

FIG. 10 is a flowchart illustrating a coil demagnetization process in accordance with embodiments of the present application.

FIG. 11A is a diagram illustrating a side view of magnetometer installation for a side-by-side array in accordance with embodiments of the present application.

FIG. 11B is a diagram illustrating a bottom view of magnetometer installation in accordance with embodiments of the present application.

FIG. 11C is a diagram illustrating a side view of a thickness mode flux sensor for an end-to-end array in accordance with embodiments of the present application.

DETAILED DESCRIPTION

This invention was made with Government support under contract AFRL SBIR FA9453-19-P-0554 awarded by the United States Air Force. The Government has certain rights in the invention. The electropermanent magnet array of the present application is described in detail below, and may be used in three discrete states:

Demagnetized—electropermanent magnet arrays may be turned off by demagnetizing the electropermanent magnets, which results in there being no magnetic poles at all. No north, no south, and there is no attraction or repulsion force at all.

Short Range, High Grip-Force—this configuration causes all magnetic flux field lines to take a short and concentrated path through the target ferromagnetic material to a neighboring pole of opposite polarity. Because almost all of the magnetic flux is forced through the target material, grip force may be maximized.

Longer Range, Lower Grip-Force—an array of like poles (e.g. North-North-North-etc) does not create a concentrated "short-circuit" for the magnetic field lines to follow, so they take a longer path out and around similar to a conventional bar magnet. Because the field lines are not concentrated in a region, the amount of flux that can flow through the target at long range is a fraction of the full magnetic flux, but it can reach much further than the short range configuration, and thus begin influencing a target at an extended distance.

There is a need for an electropermanent magnet that can switch between short distance and long distance attraction modes. Further, electropermanent magnet arrays have many advantages over the current state of the art, described as follows.

First, two or more electropermanent magnets may be combined in the volume of one pole piece and magnet combination. This 2× magnetic density advantage maintains as electropermanent magnet arrays grow in size. Electropermanent magnet arrays result in increased total magnetic attraction forces per unit of volume and weight, compared with electropermanent magnets alone. Attraction force between a polarized electropermanent magnet and a ferrous surface acts to pull the magnet and the ferrous surface together.

Second, an electropermanent magnet array may be electrically switched to shift between being optimized for short distance attraction and being optimized for long distance attraction by changing the polarity of one or more electropermanent magnets in an array. Polarization of an electropermanent magnet is defined by a north pole and a south pole, where magnetic flux proceeds from the south pole to the north pole.

Third, an electropermanent magnet array may be manufactured at arbitrary scales that may increase total attraction forces linearly.

Fourth, even as the disclosed electropermanent magnet array expands in one or two dimensions, the array assembly does not require additional thickness in a direction of attraction forces—thus saving weight and size over inferior methods like those shown in the following FIGS. 2A through 2G that must scale in three dimensions simultaneously.

Fifth, electropermanent magnet arrays continue to exhibit the same beneficial characteristics of individual electropermanent magnets: a) They may be polarized in either of two magnetic configurations. b) They may be completely demagnetized, allowing attracted ferrous masses to separate from the electropermanent magnet array and freely move. c) The polarization states of the electropermanent magnet may be maintained with no additional electrical current needed beyond the initial polarizing pulse or demagnetization pulses.

Other advantages and differentiation will be presented in the following Figures and accompanying description.

Referring now to FIG. 1A, a diagram illustrating a hard magnetic core 100, in accordance with the conventional art is shown. FIG. 1A illustrates a perspective depiction of a cylindrical magnet core 104 that are made from magnetically hard materials, including alnico and rare earth combinations including neodymium or samarium cobalt. A magnet is a magnetically hard magnet core polarized with a magnetic charge. Magnet cores 108 may not necessarily be cylindrical in shape, although for consistency in the present application are generally illustrated as cylindrical cores. For example, magnetic cores 104 may also be many possible prismatic shapes as well. Magnet cores 104 have magnetic characteristics as illustrated in FIG. 6D.

Magnet cores 104 that are magnetized have a north pole 116 and a south pole 120, and have an associated magnetic field. Magnetic fields may be visualized using flux lines 108, also called field lines. Flux lines 108 denote paths of magnetic flux. The magnetic flux is a net number of flux or field lines 108 passing through a surface; that is, the number passing through in one direction minus a number passing through in an opposite direction. In the associated. Figures, only one flux line 108 is shown for each magnetic field, for clarity purposes. It should be understood that any number of flux lines 108 may be actually present, and that a single flux line 108 may represent any number of flux lines 108.

All flux lines 108 associated with a magnetized magnet core 104 (as compared to a demagnetized magnet core 104—which has no flux lines 108) have a common flux direction 112. At the magnet core 104 itself, the flux direction 112 proceeds from the south pole 120 to the north pole 116. Away from the magnet core 104, the same flux line 108 proceeds in an opposite direction such that flux direction 112 for the same flux line 108 is consistent (i.e. illustrated in either a clockwise or a counterclockwise direction).

Referring now to FIG. 1B, a diagram illustrating an energized coil winding 130, in accordance with the conventional art is shown. FIG. 1B illustrates an electric coil 134 formed from a wire (e.g. copper wire), formed from partial magnetic loops (FIGS. 7A-7C), or formed from conductive traces on stacked circuit boards or layers with interconnected traces (FIGS. 7D and 7E). The coil 134 is further illustrated in the process of conducting a current in the direction of the arrow 138. According to the right-hand-rule known to those skilled in the art, the illustrated current generates magnetic flux field lines 108 in the direction 112 shown. It should be understood that in further Figures that when an arrow shows a current direction into a coil 134 there is an equal current exiting the other lead of the coil 134 even if it is not shown in the Figures.

Referring now to FIG. 1C, a diagram illustrating an electropermanent magnet charged by a single polarity current pulse through a coil 140, in accordance with the conventional art is shown. FIG. 1C illustrates a magnetically hard core 104 inserted into an electric coil 134 that is energized with a strong electrical discharge pulse 144 and a resultant magnetic polarization of the magnetic core 104. Further, the resulting polarization and flux lines 108 remain after the electrical pulses 144 complete; resulting in a charged electropermanent magnet 140.

Referring now to FIG. 1D, a diagram illustrating an electropermanent magnet demagnetized by alternating polarity current pulses through a coil 150, in accordance with the conventional art is shown. FIG. 1D illustrates an electropermanent magnet receiving a demagnetizing alternating current pulse train 154 and thereby demagnetizing the magnetic polarity of the core 104 and resulting in no useful flux lines.

Referring now to FIG. 1E, a diagram illustrating magnetic flux neutralized by a current in a coil 160, in accordance with the conventional art is shown. FIG. 1E illustrates a permanent magnet core 104 placed inside a coil 134 carrying a continuous current 164 that creates a coil-induced magnetic flux in direct opposition to the permanent magnet's polarity but not strong enough to reverse the magnet's polarity. The resulting permanent magnet 160 will attract ferrous materials when the current is zero. However continuous current 164 must be applied to counteract the magnet's field as shown in FIG. 1F, finally reducing the net magnetic flux of the combination until it is sufficiently near zero to release ferrous objects.

Referring now to FIG. 1F, a diagram illustrating a reduction in net magnetic flux 170, in accordance with the conventional art is shown. FIG. 1F shows how the magnetic flux 174 of the permanent magnet 160 can be gradually neutralized by increasing coil current 178 until the net magnetic flux 174 of the magnet and coil combination 160 is zero.

Referring now to FIG. 1G, a diagram illustrating an electropermanent magnet demagnetized 180, in accordance with embodiments of the present application is shown. FIG. 1G illustrates a magnet core 104 and coil 134, in a demagnetized 180 state. The magnet and coil thus have no magnetic field 184, and no flux lines 108 are shown. In this state, the demagnetized electropermanent magnet 180—exerts no magnetic force to other objects.

Referring now to FIG. 2A, a diagram illustrating a simple electromagnet 200, in accordance with the conventional art is shown. FIGS. 2A-2H illustrates conventional art electropermanent magnet configurations that are used in practice for the purpose of attracting ferrous objects. However, these configurations are all inferior in performance to the embodiments disclosed herein. FIG. 2A illustrates a magnetically soft yoke 208 with one end inserted into a coil 134. This configuration includes a common electromagnet. As shown, with no current flowing, this electromagnet generates no magnetic flux and thereby is shown with no attraction forces to the ferrous mass or ferromagnetic surface 204. Ferrous masses or ferromagnetic surfaces 204 are made from iron alloys that are attracted to magnets.

Referring now to FIG. 2B, a diagram illustrating a simple energized electromagnet 220, in accordance with the conventional art is shown. FIG. 2B illustrates current 164 passing through the magnetically soft yoke 208 and the ferromagnetic surface 204, which is attracted in the direction that would reduce the two air gaps 224 (one shown, for clarity) that the flux lines 108 must cross. The magnetic attraction strength increases as the air gaps are reduced, and is maximized when the electromagnet 220 is in direct contact with the ferromagnetic surface 204. While used in products and industries, the electromagnet 220 must remain powered with constantly flowing current 164 in order to maintain its magnetic attraction to the ferromagnetic surface 204.

Referring now to FIG. 2C, a diagram illustrating a biased electromagnet with zero current 230, in accordance with the conventional art is shown. FIG. 2C illustrates a magnetically charged electropermanent magnet 230 paired with a soft iron pole piece 234. The ferromagnetic surface 204 is attracted, even when the current is zero 238. A pole piece or yoke is a magnetically soft ferrous material having magnetic characteristics as illustrated and described with reference to FIG. 6E, that is attached to one or more electropermanent magnet poles to provide a low magnetic resistance path for flux to flow in a magnetic circuit.

Referring now to FIG. 2D, a diagram illustrating a biased electromagnet with flux canceled 240, in accordance with the conventional art is shown. FIG. 2D illustrates an electropermanent magnet 240 with coil current 244 flowing in a direction producing opposite flux direction to the permanent magnet. At a specific level of current 244 as illustrated in FIG. 1F, the opposing magnetic flux of the coil 134 neutralizes the magnet's flux, resulting in no magnetic attraction.

Referring now to FIG. 2E, a diagram illustrating hard and semi-hard magnets with aligned poles 250, in accordance with the conventional art is shown. FIG. 2E illustrates an electropermanent magnet configuration 250 that requires magnets of two different material types attached by pole pieces at both ends 234A, 234B. Inside the coil 134 is an alnico magnet 254A that is less magnetically hard than a neodymium alloy magnet on the left 254B, which may be of rare-earth construction. The magnetic characteristics of the two magnet types are illustrated in FIG. 6D. When a pulse of current occurs in the direction 144 shown in FIG. 2E, both magnets 254A, 254B adopt polarities that match and the combined magnetic flux passing through the ferromagnetic surface 204 is correspondingly strong.

Referring now to FIG. 2F, a diagram illustrating hard and semi-hard magnets with poles in opposition 260, in accordance with the conventional art is shown. FIG. 2F illustrates the same electropermanent magnet assembly as shown in FIG. 2E, but a current pulse 144 is initiated in the opposite direction. This causes the electropermanent polarity to flip, effectively shorting out the flux from the magnetically hard neodymium magnet 254B on the left. With no magnetic flux left to cross the air gap 224, there is no attractive force with the ferromagnetic surface 204.

Referring now to FIG. 2G, a diagram illustrating an electropermanent magnet charged by a current pulse 270, in accordance with the conventional art is shown. FIG. 2G illustrates a magnetically charged electropermanent magnet and pole piece 234, shown attracting the ferromagnetic surface 204. This is seen as the state of the art existing just prior to the applicant's inventive steps beginning in FIG. 3.

Referring now to FIG. 2H, a diagram illustrating an electropermanent magnet demagnetized by alternating pulses 280, in accordance with the conventional art is shown. FIG. 2H illustrates the same assembly as shown in FIG. 2G, but with alternating demagnetization pulses 154 applied to the electropermanent coil 134—thus eliminating the attraction to the ferromagnetic surface 204. The disadvantage of FIGS. 2G and 2H is the necessity of having a long pole piece 234 to communicate the magnetic flux efficiently to, and through, the ferromagnetic surface 204. The disadvantage of having a long pole piece 234 is that to a small degree its resistance to magnetic flux, and to a greater degree the leakage of magnetic flux to the opposite electropermanent magnet pole which results in lower levels of flux moving through a ferromagnetic surface 204 and thereby lower levels of magnetic attraction to the surface 204. Long pole pieces 234 in sum disadvantageously decrease the magnetic attraction strength and increase the weight of electropermanent magnet designs.

Referring now to FIG. 3A, a diagram illustrating a side-by-side electropermanent magnet array with alternating polarity for short range attraction 300, in accordance with embodiments of the present application is shown. FIGS. 3A-3E illustrates one form of the preferred embodiment of the present application. FIG. 3A illustrates two side-by-side electropermanent magnets 140A, 140B that are joined through a common pole piece 234 into a two member electropermanent magnet array 300. Since, as compared to FIG. 2G, two electropermanent magnets 140A, 140B are employed then the density of the magnetic flux lines and attractive force to a ferromagnetic surface 204 is approximately two times larger than the magnet in FIG. 2G. This alternating magnetic pole configuration is optimized for short range attraction forces. The magnet core to pole piece 234 attachment in all electropermanent arrays may be accomplished through the combined or separate attachment mechanisms of magnetic attraction, solder adhesion, and glue adhesion.

Each of the electropermanent magnets includes a magnetically hard material section and an electrical conductor, spirally coiled around the hard material section. The electrical conductor includes one of a wire and a plurality of stacked layers. Each layer includes one of a plurality of planar full loops of conductive traces around each hard material section and bonded to an insulator film and a plurality of planar and serpentine half loops of conductive traces around each hard material section and bonded to the insulator film.

Referring now to FIG. 3B, a diagram illustrating a side-by-side electropermanent magnet array with matching polarity for longer range attraction 320, in accordance with embodiments of the present application. FIG. 3B illustrates the same side-by-side electropermanent magnets as in FIG. 3A, but now the electropermanent magnets 140A, 140B are polarized in the same north-south direction by the current pulses 144A, 144B shown. In this magnetic configuration, the magnetic flux lines from the electropermanent magnet array range out further, providing better attraction performance at long ranges than the alternating polarity electropermanent magnet array 300 configuration shown in FIG. 3A. In contrast, at short distances, when the array is polarized as in FIG. 3B, it has lower attraction force than the configuration of FIG. 3A because the magnetic flux lines must pass through a larger total air gap 244 around the body of the electropermanent magnets 140A, 140B that reduces short range magnetic flux and attraction force. Accordingly there is a need for an electropermanent magnet that can switch between short distance and long distance attraction modes.

Referring now to FIG. 3C, a diagram illustrating a demagnetized side-by-side electropermanent magnet array 340, in accordance with embodiments of the present application is shown. FIG. 3C illustrates both electropermanent magnets 140A, 140B demagnetized by alternating demagnetization currents 154A, 154B and thereby rendering the electropermanent magnet array 340 with no flux lines engaging with the ferromagnetic surface 204 and thereby not attracting the ferromagnetic surface 204.

Referring now to FIG. 3D, a magnetic flux diagram for short range attraction 350, in accordance with embodiments of the present application is shown. FIG. 3D illustrates a one dimensional, four electropermanent magnet array having alternating north 116 and south 120 poles optimized for short range, high force attraction.

Short range attraction is defined herein as occurring at air gap 224 distances from in contact to a maximum separation distance. The nominal attraction distance $D_2$ 358 for an alternately polarized magnet is equal to $D_1$ 354, the distance between magnet centers. The maximum separation distance for short range attraction is a distance $D_2$ 358 where $D_2$ 358 is less than or equal to a distance $D_1$ 354 between the electropermanent magnet's 140 central axis. In one embodiment, short range attraction may be from in contact to approximately 0.4 centimeters. In the illustrated configuration, the electropermanent magnet array 350 exerts a short range attraction force 304 to a ferromagnetic surface 204. In order to achieve the short range object attraction configuration, each electropermanent magnet 140 is oppositely charged relative to closest neighbor electropermanent magnet 140. This is also shown in FIG. 7F for an example electropermanent magnet array 2×4 magnet configuration. Every $1^{st}$, $3^{rd}$, $5^{th}$, etc magnet core 104 in a first row and every $2^{nd}$, $4^{th}$, $6^{th}$, etc magnet core 104 in a second row is charged with a north pole 116 facing the ferrous target surface 204. Every $2^{nd}$, $4^{th}$, $6^{th}$ etc magnet 104 in the first row and every $1^{st}$, $3^{rd}$, $5^{th}$, etc magnet core 104 in the second row is charged with a south pole 120 facing the ferromagnetic surface 204. This alternating pattern of magnet core 104 polarity provides the greatest number of flux lines 108, although with correspondingly short return paths—hence limiting attraction range to the ferromagnetic surface 204. Flux direction 112 is from the south pole 120 to the north pole 116, and since adjacent magnet cores 104 are oppositely polarized, the flux return paths are very short.

Referring now to FIG. 3E, a magnetic flux diagram for longer range attraction 360, in accordance with embodiments of the present application is shown. FIG. 3E illustrates a one-dimensional, four electropermanent magnet array where each side-by-side electropermanent magnet 140 has the same polarization direction, forming an array optimized for longer range attraction.

Longer range attraction is defined herein as generally from the short range attraction distance to a maximum separation distance. The nominal attraction distance $D_2$ 368 for the long attraction range configuration is $D_3$ 364 equal to the dimension across the electropermanent magnet array 360. The maximum separation distance for longer range attraction is the distance $D_2$ 368, where $D_2$ 368 is less than or equal to a distance $D_3$ 364 equal to the dimension across the electropermanent magnet array 360. In one embodiment, longer range attraction may be from approximately 0.4 centimeters up to approximately 4 centimeters. In the illustrated configuration, the electropermanent magnet array 360 exerts a longer range attraction force 308 to a ferromagnetic surface 204. In order to achieve the longer range object attraction configuration, each magnet 104 is identically charged to immediate neighbor magnets 104. This is also shown in FIG. 7G for an example 2×4 electropermanent magnet array 300 configuration. Every magnet core 104 in the first and second rows is charged with a north pole 116 facing the ferromagnetic surface 204. This identical pattern of magnet core 104 charges provides the longest flux lines 108 from multiple magnet cores 104, with correspondingly long return paths. Flux direction 112 is from the south pole 120 to the north pole 116, and since adjacent magnet cores 104 are identically polarized, the flux return paths are longer than for the short range attraction configuration of FIGS. 3A and 3D.

Referring now to FIG. 4A, a diagram illustrating an end-on-end electropermanent magnet array for short range attraction 400, in accordance with embodiments of the present application is shown. FIGS. 4A-4E illustrates another form of the preferred embodiment of the present application. Two or more electropermanent magnets 140 are attached end-on-end with pole pieces 234 interspersing the electropermanent magnets 140 and also capping the ends of each array.

FIG. 4A illustrates an end-on-end electropermanent magnet array. With the magnet polarity alternating as shown, the electropermanent magnet array 400 is optimized for high attraction force at short ranges.

Referring now to FIG. 4B, a diagram illustrating an end-on-end electropermanent magnet array for longer range attraction 420, in accordance with embodiments of the present application is shown. FIG. 4B has the same end-on-end arrangement illustrated in FIG. 4A, but the electropermanent magnet polarities align in the same direction. In this arrangement, the longer flux path length of the electropermanent magnet array is optimized for longer range attractions.

Referring now to FIG. 4C, a diagram illustrating a demagnetized end-on-end electropermanent magnet array 440, in accordance with embodiments of the present application is shown. FIG. 4C is an end-on-end arrangement of an electropermanent magnet in a demagnetized state, with no attraction to the ferromagnetic surface 204.

Referring now to FIG. 4D, a magnetic flux diagram for short range attraction 450, in accordance with embodiments of the present application is shown. FIG. 4D illustrates a four-member electropermanent magnet array with alternating north and south poles optimized for short range attraction 304. The embodiment shown in FIG. 4D has the same goal of optimized short range attraction as the embodiment shown in FIGS. 3A and 3D, but achieves this with a different electropermanent magnet 140 and pole piece 234 configuration.

Referring now to FIG. 4E, a magnetic flux diagram for longer range attraction 460, in accordance with embodiments of the present application is shown. FIG. 4E illustrates a four-member electropermanent magnet array with stacked-in-series magnet polarities, as shown. This arrangement is optimized for longer range attraction 308.

Referring now to FIG. 5A, a block diagram of a current pulse driver 500, in accordance with embodiments of the present application is shown. FIG. 5A illustrates H-bridge current pulse driver circuitry where on command, a current pulse is sent either forward or backward through a coil 524 of an electropermanent magnet The H-bridge configuration of semiconductor switches is a preferred configuration for the purpose of driving a current in either direction through a load by selection of the switches that are open or closed. Although it is understood that electropermanent magnets 140 include a magnetic core 104 and a coil 134, the magnet core 104 is not shown for clarity in order to better illustrate current pulse generation circuitry rather than magnetic fields and polarities.

The current pulse driver 500 may include a charger 508, an energy storage device (shown as capacitor 512), a control circuit 516, and one or more switches (shown as thyristor H bridges 504). A greater number of thyristor H bridges 504 may include more coils 524 (each coil 524 may be associated with one electropermanent magnet 140). In other embodiments, thyristor H bridges 504 may not be used and instead hardware switches or actuators, MOSFETS, or IGBTs may be used to provide the switching functions. Although only one coil 524 is illustrated in FIGS. 5A-5F, it should be understood that electropermanent magnet arrays of the present application require at least two electropermanent magnets, and hence at least two coils 524. A single coil 524 is simply shown for clarity of components required for charging and discharging purposes in FIGS. 5A-5D, with FIGS. 5E and 5F representing a more accurate illustration of electropermanent magnet arrays.

In one embodiment, each of the plurality of electropermanent magnets may include a magnetically hard material section 104 and an electrical conductor 134, spirally coiled around the hard material section 104 and coupled to one 504 of the plurality of switching circuits.

The charger 508 may be a power supply that functions to charge the capacitor 512 as directed by a charger enable/disable signal 544 from the control circuit 516. In a preferred embodiment, the charger 508 may be a switching DC power supply such as a buck-boost power supply. In other embodiments, the charger 508 may be a different form of power supply, including linear power supplies or different types of switching power supplies.

The capacitor 512 may be charged to a predetermined voltage by the charger 508, and the way it is discharged through the plurality of switches or thyristor H bridges 504 may determine the polarity for each electropermanent magnet 140 (or lack of polarity in the case of demagnetized electropermanent magnets 140, as shown in FIGS. 3C and 4C). In a preferred embodiment, the capacitor 512 may be a 50 uF capacitor. Each thyristor H bridge 504 may include one coil 524/(and magnet core 104) and four switches 528, 532, 536, 540. The switches are opened/closed in pairs in order to control whether current is flowing through the coil 524, and the direction of current travel—which affects electropermanent magnet 140 polarity. Switches 528/540 may be opened/closed at the same time, and switches 532/536 may be opened/closed at the same time. The switch operations are described in more detail with respect to FIGS. 5B-5F. In one embodiment, the capacitor 512 is an energy storage device, coupled to the plurality of switching circuits, and configured to provide current pulses 144 through the plurality of switching circuits to one of magnetize or demagnetize the plurality of electropermanent magnets.

The control circuit 516 receives a command 520, and in response controls the charger enable/disable 544 to the charger 508 and switch control 548 to each of the switches 528, 532, 536, 540. The command 520 may be a command from a computer, a computer application, a graphical user application (GUI) associated with a computer and selected by a user, or a hardware switch output from a control activated by a user. The command 520 may specify several actions taken by the current pulse driver 500, including enable short range attraction, enable longer range attraction, and demagnetize the electropermanent magnets 140. Other commands 520 may be utilized, including but not limited to specifying a voltage level the charger 508 should charge the capacitor 512 to, specifying the behavior of a specific thyristor H bridge 504, or designating the open or closed position for a specific switch 528, 532, 536, 540. The control circuit 516 may be implemented as any form of known control function, including processor(s)/memories, microcontroller(s), field-programmable gate array(s) (FPGAs), programmable logic, state machine(s), pure hardware, or any combination of hardware/software/application(s).

The control circuit 516 may be configured to receive one of one or more first commands 520 to demagnetize the plurality of electropermanent magnets, one or more second commands to magnetize the plurality of electropermanent magnets to produce a first magnetic field, or one or more third commands to magnetize the plurality of electropermanent magnets to produce a second magnetic field.

In one embodiment, the control circuit 516 may be configured to control the plurality of switching circuits to demagnetize the plurality of electropermanent magnets. This may include the control circuit 516 configures each switching circuit 504 to allow a plurality of alternating direction current flows with a sequentially decreasing amplitude through a coupled electropermanent magnet.

In one embodiment, the control circuit 516 may be configured to control the plurality of switching circuits to magnetize the plurality of electropermanent magnets to produce the first magnetic field. This may include the control circuit 516 configures a current flow through each switching circuit 504 that corresponds to each electropermanent magnet in an opposite direction as nearest neighbor switching circuits and electropermanent magnets of the plurality of electropermanent magnets.

In one embodiment, the control circuit 516 may be configured to control the plurality of switching circuits to magnetize the plurality of electropermanent magnets to produce the second magnetic field. This may include the control circuit 516 configures a current flow in a common direction through the plurality of switching circuits.

Stated alternately, an H-bridge current pulse driver may include an electropermanent coil, an energy storage device, configured to provide current pulses, an H-bridge driver circuit, coupled to the electropermanent coil and the energy storage device, and a control circuit, coupled to the switching elements. The H-bridge driver circuit includes switching elements including insulated gate thyristors, configured to receive current pulses from the energy storage device and selectively drive the current pulses in a first direction or a second direction opposite the first direction to the electropermanent coil. The control circuit is configured to select the first and second directions. A gate drive voltage of each switching element is optically isolated between the control circuit and the switching elements.

In one embodiment, sn electropermanent magnet array may include a plurality of electropermanent magnets, arranged in a parallel fashion, a plurality of switching circuits, each switching circuit 504 coupled to a different electropermanent magnet 524 of the plurality of electropermanent magnets, and a control circuit 516, coupled to the plurality of switching circuits, configured to receive commands 520 to control the plurality of switching circuits to demagnetize the plurality of electropermanent magnets, magnetize the plurality of electropermanent magnets to produce a first magnetic field with a strength and an attraction distance, and magnetize the plurality of electropermanent magnets to produce a second magnetic field with a lower strength and greater attraction distance than the first magnetic field.

Referring now to FIG. 5B, a block diagram illustrating a current pulse driver charging phase for an electropermanent magnet 550, in accordance with embodiments of the present application is shown. FIG. 5B illustrates an H-bridge current pulse driver circuit in a charging phase of the electrical storage capacitor 512.

The charging phase 550 may be used in association with changing an operating mode of the current pulse driver 500 (for example, from short range attraction to longer range attraction or from longer range attraction to short range attraction), or as one of the many charging steps required for a demagnetization process (FIG. 10).

For the charging phase 550, the control circuit 516 receives a command 520 that specifies the new operating mode, or a charge capacitor command 554. In one embodiment, the charge capacitor command 554 may specify a voltage level to charge the capacitor 512 to. The control circuit 516 then enables the charger 556, and the charger 508 charges the capacitor 558. In one embodiment, the charger enabled signal 556 may be timed by the control circuit 516 in order to charge the capacitor 558 to the desired voltage. In another embodiment, the charger 508 may charge the capacitor 558 to charge to the desired voltage in response to receiving a charger enabled 556 indication of any duration. In this phase, all switches 528, 532, 536, 540 of all thyristor H bridges 504 are in the open state since closed switches may prevent the capacitor 512 from charging. In one embodiment, the control circuit 516 may be configured to enable the charging circuit 508 to charge 558 the energy storage device 512 in response to the control circuit 516 configures the plurality of switching circuits to electrically isolate the energy storage device 512 from the plurality of electropermanent magnets.

Referring now to FIG. 5C, a block diagram illustrating discharging a capacitor of an electropermanent magnet in a forward direction through a coil 560, in accordance with embodiments of the present application is shown. FIG. 5C illustrates the energy storage capacitor 512 discharging a current pulse through switch 1 and switch 4 in the coil's 524 forward direction. The discharging phases of FIGS. 5C and 5D illustrate the phases where the electropermanent magnets 140 are actually polarized in order to program the electropermanent magnet array 300 for short-range attraction, longer-range attraction, or demagnetization. The phase shown in FIG. 5C is performed after the phase shown in FIG. 5B.

The discharge sequence to program a magnetic state into an electropermanent magnet array has the following key characteristics. It should be readily apparent to those of skill in the art that magnitude of the listed values will vary depending on design-specific conditions and component selection:

Individual discharges of the capacitor are a very fast process (25 microseconds to 100 microseconds discharge time)

The capacitor discharges with very high currents (250+ Amperes)

It discharges the capacitor from a very high voltage (250+ Volts)

Electropermanent magnet array 300 may utilize one or more thyristor H-bridges 504 to control the direction of current flow to program an electropermanent magnet 140 into a given state. Depending on which switches 528, 532, 536, and 540 are set open and which are set closed, current will flow through the electropermanent magnet coil windings 524 in one of two directions, thus programming the corresponding electropermanent magnet 140 (not shown for clarity) into one of two magnetic states (N-S or S-N). Thyristors 504 may be selected for their very high power and energy handling characteristics, compared to MOSFETs or IGBTs. Once a thyristor 504 has been fired/triggered, it will continue to allow current to flow through until the flow drops to near zero, this means that the entire capacitor 512 must discharge for any given command to reprogram the electropermanent magnets 140. MOSFETs are not capable of handling large amounts of power, so many more of them would likely be needed to accomplish the task. However, MOSFETs are advantageously more efficient and more controllable than thyristors 504 (e.g. the discharge of the capacitor 512 could be modulated in order to provide fine current control). This is not a large advantage for an electropermanent magnet array 300 attraction device where all one is attempting to do is program a single magnetic state into a given electropermanent magnet 140, but theoretically could be more useful if electropermanent magnet array technology was incorporated into some form of electric motor—which may be optimized for high torque per unit power and operate at modest rotational or linear speeds, yet not require being constantly energized to maintain zero speed torque.

The control circuit 516 receives an enable forward current through coil(s) command 562. In one embodiment, the command 562 may specify which of the switches 528, 532, 536, 540 to open and/or close. In another embodiment, the control circuit 516 may determine switch states 528, 532, 536, 540 after receiving the enable forward current through coil(s) command 562. In response to receiving the enable forward current through coil(s) command 562, the control circuit 516 may first provide a charger disable 566 to the charger 508, which stops the charger 508 from continuing to charge the capacitor 512. In one embodiment, the charger disable 566 results in the charger 508 being decoupled from an input AC or DC power source (not shown), possibly including one or more batteries.

After disabling the capacitor 512 charging, the control circuit 516 directs the thyristor H bridge 504 to close switches S1 and S4 564 (and keep switches S2 532 and S3 536 open). The same switch activations/deactivations are provided to any other thyristor H bridges 504 that may be present in electropermanent magnet array 300. Closing S1 528 and S4 540 causes the capacitor 512 to discharge through both switches S1 528, S4 540, resulting in a forward current through coil 524 and a change in magnetization of the corresponding electropermanent magnet 140. In one embodiment, the control circuit 516 may configure the plurality of switching circuits to allow the energy storage device 512 to provide current pulses 144 to the plurality of electropermanent magnets in response to the charging circuit 508 charges the energy storage device 512.

Referring now to FIG. 5D, a block diagram illustrating discharging a capacitor of an electropermanent magnet in a reverse direction through a coil 570, in accordance with embodiments of the present application is shown. FIG. 5D illustrates the energy storage capacitor 512 discharging a current pulse 578 through switch 2 and switch 3 in the coil's 524 reverse direction. The discharging phases of FIGS. 5C and 5D provide the phases where the electropermanent magnets 140 are actually polarized in order to program the electropermanent magnet array 300 for close-range attraction, longer-range attraction, or demagnetization. The phase shown in FIG. 5D is performed after the phase shown in FIG. 5B (charge capacitor 512).

The control circuit 516 receives an enable reverse current through coil(s) command 572. In one embodiment, the command 572 specifies which of the switches 528, 532, 536, 540 to open and/or close. In another embodiment, the control circuit 516 determines switch states 528, 532, 536, 540 after receiving the enable reverse current through coil(s) command 572. In response to receiving the enable forward current through coil(s) command 572, the control circuit 516 first provides a charger disable 576 to the charger 508, which stops the charger 508 from continuing to charge the capacitor 512. In one embodiment, the charger disable 576 results in the charger 508 being decoupled from an input AC or DC power source (not shown), possibly including one or more batteries.

After disabling the capacitor 512 charging, the control circuit 516 directs the thyristor H bridge 504 to close switches S2 and S3 574 (and keep switches S1 528 and S4 540 open). The same switch activations/deactivations are provided to any other thyristor H bridges 504 that may be present in the current pulse driver 500. Closing S2 and S3 causes the capacitor 512 to discharge through both switches S2 532, S3 536, resulting in a reverse current through coil 524 and a change in magnetization of the corresponding electropermanent magnet 140.

Referring now to FIG. 5E, a first block diagram of an electropermanent magnet current pulse driver with multiple coils 580, in accordance with embodiments of the present application is shown. Multiple thyristor H bridges 504 are present, identified herein as thyristor H bridge A 504A through thyristor H bridge N 504N. Each thyristor H bridge 504 includes switches S1 528, S2 532, S3 536, and S4 540. Thyristor H bridge A 504A includes switches S1A 528A, S2A 532A, S3A 536A, and S4A 540A. Thyristor H bridge N 504N includes switches S1N 528N, S2N 532N, S3N 536N, and S4N 540N. Any number of thyristor H bridges 504 may be present in current pulse driver 500, 580, and separate switch controls 548 may be provided to each thyristor H bridge 504. Control circuit 516 provides switch control A 548A to thyristor H bridge A 504A and switch control N 548N to thyristor H bridge N 504N.

Although multiple thyristor H bridges 504 are present for current pulse driver 580, the switch controls 548 may be different, depending on operating mode. For the short range attraction configuration, some coils 524 may use forward current to program the north pole 116 in one direction while other coils 524 may use reverse current to program the north pole 116 in an opposite direction. For the longer range attraction configuration, all coils 524 may use forward current to program the north poles 116 in a same direction.

Referring now to FIG. 5F, a second block diagram of an electropermanent magnet current pulse driver with multiple coils 584, in accordance with embodiments of the present application is shown. FIG. 5F illustrates an H-bridge circuit where a multiple electropermanent magnet coils 524 may have current pulsed directed at coils 524 in either electrical series or electrical parallel configuration, or individually.

FIG. 5F illustrates the preferred embodiment, where multiple thyristor H bridges are present—but only a complete thyristor H bridge 504 is required. Additional ½ thyristor H bridges 586 may be provided for each additional coil 524. Only a last (Nth) ½ thyristor H bridge 586 is shown for clarity, which includes coil 524N and switches 532N and 540N. Any number of ½ thyristor H bridges 586 may be present in current pulse driver 584, and separate switch controls 548 may be provided to each thyristor H bridge 504 or ½ thyristor H bridge 586. Control circuit 516 provides switch control A 548A to thyristor H bridge A 504A and switch control N 548N to ½ thyristor H bridge N 586. The embodiment illustrated in FIG. 5F does not require switches 528 and 536 for the ½ thyristor H bridges 586, which significantly reduces the number of switches required.

An electropermanent magnet array includes an energy storage device, configured to provide current pulses to the plurality of electropermanent magnets to polarize the electropermanent magnets and an H-bridge coil drive circuit, coupled to the energy storage device, configured to selectively route the current pulses in one of a first direction and a second direction opposite the first direction, to the electropermanent magnets. Electropermanent magnet polarity is determined by the first and second directions. In one embodiment, the H-bridge coil drive circuit is configured to polarize each electropermanent magnet to an opposite direction to closest neighbor electropermanent magnets by received current pulses. In another embodiment, the H-bridge coil drive circuit is configured to polarize each electropermanent magnet to a same direction as closest neighbor electropermanent magnets by received current pulses. In yet another embodiment, the H-bridge coil drive circuit is configured to depolarize each electropermanent magnet, and in response, the plurality of electropermanent magnets are configured to provide no attraction force to a ferrous surface.

Referring now to FIG. 6A, a magnetization diagram using repeated current pulses 600, in accordance with embodiments of the present application is shown. Although the present application includes embodiments where only a single current pulse 144 is used to magnetize an electropermanent magnet 140, in practice three or four single polarity current pulses 144 are typically used to fully polarize electropermanent magnets 140 in an array. FIG. 6A illustrates an embodiment where four current pulses 144 are used, in sequence, using a common magnetization direction 606 or 608. Magnetization direction A 606 produces coil current in a positive direction 610, relative to the coil 524. In these cases, all four pulses are applied in magnetization direction A 606 over a period of time 604. Each of these current 602 pulses are charged to a level 612, and then discharged 616 from the capacitor 512 through a switching network and coils 524. There is a capacitor charging period 614 between current pulses 144.

In one embodiment, the charging circuit 508 may be coupled to the control circuit 516 and the energy storage device 512 and configured to repeatedly charge the energy storage device 512 to a same amplitude 612 in response to the control circuit 516 receives one or more commands 520 to magnetize the plurality of electropermanent magnets.

Referring now to FIG. 6B, a demagnetization diagram using alternating single current pulses 620, in accordance with embodiments of the present application is shown. In order to demagnetize electropermanent magnets 140, decreasing alternating polarity current pulses 144 are used to fully depolarize electropermanent magnets 140 in an array. Depolarize means to apply alternating current to an electropermanent magnet to reduce or eliminate its magnetic polarity. The number of pulses to sufficiently depolarize an electropermanent magnet 140 such that attached ferrous masses or ferromagnetic surfaces 204 are released is typically 10 to 40 alternating pulses 144 of decreasing polarity.

In the illustrated example, a first current 602 pulse is applied in demagnetization direction A 624 to electropermanent magnets 140, producing a coil current in a positive direction 610 to one or more coils 524. Next, a second current 602 pulse is applied in demagnetization direction B 628 to electropermanent magnets 140, producing a coil current in a negative direction 630 to one or more coils 524. Typically, this second current pulse 144 is applied using a same (although negative) current 602 value. Next, a third current pulse of lower current 602 value than the first current pulse 144 is applied in demagnetization direction A 625 to electropermanent magnets 140, producing a coil current in the positive direction 610 to one or more coils 524. Next, a fourth current pulse of lower current 602 value than the second current pulse 144 is applied in demagnetization direction B 628 to electropermanent magnets 140, producing a coil current in the negative direction 630 to one or more coils 524. This sequence of alternating pulses continues at decreasing current 602 levels until the coils 524 are demagnetized.

In one embodiment, the charging circuit 508, coupled to the control circuit 516 and the energy storage device 512, may be configured to repeatedly charge the energy storage device 512 to a sequentially decreasing amplitude 620 in response to the control circuit 516 receives one or more commands 520 to demagnetize the plurality of electropermanent magnets.

Referring now to FIG. 6C, a diagram illustrating exemplary magnetization timing 640, in accordance with embodiments of the present application is shown. In the preferred embodiment, each current pulse 144 may have a pulse width 642 of approximately 50 us in duration, with approximately 50 ms between pulses 644. As the current pulses 144 decrease in amplitude (demagnetization, per FIG. 6B), in some embodiments the time between pulses 644, which is used to charge the capacitor 512, may decrease accordingly. It should be understood that the specific pulse 642 and between pulse 644 timing may be very design-dependent and a function of circuit values, and may differ from what is shown in FIG. 6C.

Referring now to FIG. 6D, a magnetization diagram illustrating both a hard magnetic material and a semi-hard magnetic material 650, in accordance with embodiments of the present application is shown. A magnetically hard material like neodymium (NdFeB) is compared with a slightly less hard material, such as AlNiCo (Aluminum/Nickel/Cobalt). In FIG. 6D, the vertical axis is flux density in Teslas and the horizontal axis is magnetic field strength in amperes/meter. Hard magnetic materials are materials such as AlNiCo (Aluminum/Nickel/Cobalt) or Neodymium (NdFeB)—which are used to fabricate magnetic core 104 materials. There should be negligible differences between grip force of AlNiCo and NdFeB for low reluctance applications, such as the short range attraction mode, where the elements are already in close physical contact with a low reluctance circuit. In the case of longer range attraction, the energy density of Neodymium magnets can be an advantage.

In both cases, as the applied magnetic strength supplied by current pulses 144 through electropermanent magnet coils 134, 524 increases in a positive direction, the retained magnetic flux density 654 increases in the positive direction and then does not diminish as the current drops. The forgoing remains until the applied magnetic field from reverse direction current pulses 144 becomes sufficiently negative to reverse the retained magnetic field of the magnetic core negative and remain negative until again the external magnetic field is pulsed sufficiently positive again. As one skilled in the art would understand, in addition to reversing the electropermanent magnet 140 polarization positive or negative with large current pulses 144 to the electropermanent magnet coils 134,524, applying a train of decreasing alternating polarity current pulses 144 will decrease the electropermanent magnet's flux to zero.

Referring now to FIG. 6E, a magnetization diagram for a soft magnetic material 670 in accordance with embodiments of the present application is shown. Soft magnetic materials may include Iron, Cobalt, Nickel, and alloys such as Hiperco, Permalloy, electrical steel, and amorphous metal alloy materials. Soft magnetic materials are used to fabricate the pole pieces 234 as described herein. FIG. 6E illustrates the magnetic flux density 654 of a magnetically soft material as a function of externally applied magnetic field strength 658 that is obtained from current moving through an encircling coil such as shown in FIG. 2B, which features a magnetically soft yoke 208. Magnetically soft material is used for all the pole pieces 234 used in electropermanent magnet arrays because it does not retain magnetization and therefore can conduct the magnetic flux from the electropermanent magnets 140 in an array efficiently to the air gaps 224 and through the ferromagnetic surface 204.

Referring now to FIG. 7A, a diagram illustrating an electropermanent magnet array 700, in accordance with embodiments of the present application is shown. FIG. 7A illustrates an exploded view 700 of a 34-member electropermanent magnet array with windings formed from layered serpentine conductor traces 716 on insulator film layers 720. The serpentine winding arrangement is designed to produce solely the alternating polarity pattern of magnetization in side-by-side electropermanent magnet arrays used for short distance attraction. The winding design serves the purpose of short range attraction with excellence. The serpentine pattern winding produces exceptional magnetic flux strength in the array because the conductor packing density is higher than could be achieved with round wire windings.

Serpentine windings may be manufactured from alternating even 704 and odd 708 patterned conductor paths 716 resting on insulating film layers 720. In example of use, current may flow inwards from terminal 2 732B through the top pad of top layer 736 onto the even layer 704, then travel around the even layer's serpentine path, then out through its bottom terminal which is soldered to the top terminal on the odd layer 708. Pairs of odd 708 and even 704 layers and interconnections 728 continue to stack with their solder pads connected together making a continuous current circuit from one layer to the next. Finally, after proceeding through the stack 724 of layers 704, 708, a bottom layer 740 is reached to which the opposite terminal 1 732A is attached. The bottom layer 740 is routed to terminal 1 732A. Each layer 704, 708 in the stack of layers 724 includes holes 712 for each of the magnet cores 104 to pass through.

The insulating film 720 is provided to prevent shorting between coil layers 724. This may be achieved using flexible printed circuit fabrication, where a copper-plated thin film plastic such as a polyamide has its conductive traces 716 etched to leave behind the copper coil layers in the desired winding pattern, intimately bonded to the polyamide insulating film 720. Other PCB insulating materials and conductors are also possible in other embodiments. Other forms of fabrication mat be used without deviating from the intent of the disclosed embodiments. In one embodiment, the magnet cores 104 may be approximately 3.2 mm wide×6.4 mm long. However, any practical size and shape may be used, based on end requirements.

In one embodiment, each of the plurality of electropermanent magnets may include a magnetically hard material section 104 and an electrical conductor, spirally coiled around the hard material section. In one embodiment, the electrical conductor may include a plurality of stacked layer pairs, wherein each layer pair may include a first layer 704 of planar partial loops of conductive traces 716 around each hard material section 104 and bonded to a first insulator film and a second layer 708 of planar and serpentine partial loops of conductive traces 716 around each hard material section 104 and bonded to a second insulator film, One of the first and second insulator films separates adjacent stacked layer pairs.

Referring now to FIG. 7B, a diagram illustrating an even serpentine coil layer detail 704, in accordance with embodiments of the present application is shown. FIG. 7B illustrates the conductor wiring trace 716 and insulator 720 detail on the even layers 704 of a coil circuit layer. The current trace starts at the top solder pad 750A and winds around each successive magnetic core 104 with one half of a turn on each—until a bottom solder pad 754A is reached. This current goes clockwise and counter clockwise around each alternating magnet core 104 in the array. Thus, when conducting, a current pulse 144 subsequently magnetizes each magnetic core 104 in an alternating polarity sequence. Current moving through the layers of serpentine circuit add successive half turns 758 of magnetizing flux to each magnetic core 104, in turn. For example, a current flowing clockwise a half turn around one of the magnet cores 104 on the even layer 704 will subsequently flow onto the serpentine path of the next odd layer 708 that will channel the same current in a clockwise half turn direction under the half turn in the same direction from the preceding layer.

Referring now to FIG. 7C, a diagram illustrating an odd serpentine coil layer detail 708, in accordance with embodiments of the present application is shown. FIG. 7C illustrates the conductor wiring trace 716 and insulator 720 detail on the odd layers 708 of a coil circuit layer. The features and operation of the odd layer 708 are as discussed with respect to the even coil layer 704 of FIG. 7B, but includes a bottom solder pad 754B and a top solder pad 750B instead.

Referring now to FIG. 7D, a diagram illustrating spiral coil layer interconnection detail 760, in accordance with embodiments of the present application is shown. FIG. 7D illustrates layers of circular coil links electrically connected from one layer to the next such that the circular links and connections together form a spiral current path 768 up and down the magnetic cores 104. In practice, using the same printed circuit techniques that created the spiral coils 764, specific coils can be connected in series or parallel to work at once together. For example, when coils 1, 2, 3, and 4 are connected in series or parallel and pulsed with current 144, they may produce one polarity in magnetic cores 1, 2, 3, and 4. Likewise when coils 5, 6, 7, and 8 are electrically connected in series or parallel and pulsed with current 144, they also can adopt a common polarity into magnetic cores 5, 6, 7 and 8. In one embodiment, an electropermanent magnet array may include a pole piece 234, orthogonal to and coupled to common ends of the plurality of electropermanent magnets.

In practice, when cores 1, 2, 3, and 4 are magnetically polarized oppositely from cores 5, 6, 7, and 8, the resulting electropermanent magnet array is programmed into the short range attraction mode. This mode is illustrated in FIG. 7F. Additionally, when cores 1, 2, 3, and 4 are magnetically polarized the same as cores 5, 6, 7, and 8, the electropermanent magnet array is programmed into the longer range attraction mode. This mode is illustrated in FIG. 7G.

Thus, the spiral winding method 768 allows one electropermanent magnet array to be programmed for either short range attraction, or for long range attraction. Finally, introducing decreasing chains of alternating current pulses 144 to each series or parallel connected coil (FIG. 6B) will demagnetize the array, resulting in no attraction force. This mode is illustrated in FIG. 7H.

Referring now to FIG. 7E, a diagram illustrating spiral coil layer detail 770, in accordance with embodiments of the present application is shown. FIG. 7E illustrates etched conductor layers are interconnected one on top of another to provide an interconnected spiral coil with a terminal 1 732A and a terminal 2 732B.

Referring now to FIG. 7F, a diagram illustrating a top view of an electropermanent magnet array for high force and short range attraction 780, in accordance with embodiments of the present application is shown. FIG. 7F illustrates a top view of an electropermanent magnet array 784. A 2×4 exemplary configuration is illustrated, with two rows of four magnet cores 104 each. The high force/short range attraction configuration utilizes oppositely-polarized electropermanent magnets 140 to facilitate short flux return paths. In the first or top row, the first and third magnet cores 104 have north poles 116 facing the ferrous target surface 204, while the second and fourth magnet cores 104 have south poles 120 facing the ferrous target surface 204. In the second or bottom row, the second and fourth magnet cores 104 have north poles 116 facing the ferrous target surface 204, while the first and third magnet cores 104 have south poles 120 facing the ferrous target surface 204. In one embodiment, configuring the plurality of switching circuits for magnetizing the plurality of electropermanent magnets to produce the first magnetic field may include configuring, by the control circuit 516, each switching circuit 504 to transfer a plurality of current flows from the energy storage device 512 through each switching circuit 504 in an opposite direction from nearest neighbor switching circuits and electropermanent magnets of the plurality of electropermanent magnets.

Referring now to FIG. 7G, a diagram illustrating a top view of an electropermanent magnet array for lower force and longer range attraction 786, in accordance with embodiments of the present application is shown. FIG. 7G illustrates a top view of an electropermanent magnet array 788. A 2×4 exemplary configuration is illustrated, with two rows of four magnet cores 104 each. The lower force/longer range attraction configuration utilizes identically-polarized electropermanent magnets 140 to facilitate long flux return paths. In both rows, all magnet cores 104 have north poles 116 facing the ferrous target surface 204. In one embodiment, configuring the plurality of switching circuits for magnetizing the plurality of electropermanent magnets to produce the second magnetic field may include configuring, by the control circuit 516, each switching circuit 504 to transfer a plurality of current flows from the energy storage device 512 in a common direction to the plurality of electropermanent magnets.

Referring now to FIG. 7H, a diagram illustrating a top view of a demagnetized electropermanent magnet array 790, in accordance with embodiments of the present application is shown. A 2×4 exemplary configuration is illustrated, with two rows of four magnet cores 104 each. Unlike the configurations illustrated in FIGS. 7F and 7G, all magnet cores 104 in FIG. 1C are demagnetized 794 and have no polar orientation (i.e. do not have a north pole 116 or a south pole 120).

Referring now to FIG. 8A, a diagram illustrating a top view of an end-on-end 2-dimensional electropermanent magnet array polarized for short range attraction 800, in accordance with embodiments of the present application is shown.

FIG. 8A is a top view of an eight member end-on-end 2-dimensional electropermanent magnet array. The array shown is polarized in the alternating north-south pattern shown which optimizes this configuration for short range attraction. Short range nominally being equal to the distance between polarity changes of one electropermanent magnet length in this example.

It should be noted that the end-on-end configuration may be implemented in many different ways. It may be implemented as a straight or partially/fully curved array as shown in FIG. 4A/4B, or as a close configuration as shown in FIG. 8A. Closed configurations do not necessarily have a defined start or end point like a linear or curved array, and may be implemented as a geometric shape or non-geometric shape. FIG. 8A shows a "square" embodiment, with a pole piece 234 between a pair of electropermanent magnets 140.

Referring now to FIG. 8B, a diagram illustrating a side view of an end-on-end 2-dimensional electropermanent magnet array and magnetic flux lines 810, in accordance with embodiments of the present application is shown. FIG. 8B represents a side view of the electropermanent magnet array 800 in FIG. 8A. From the side, only three out of nine pole pieces 234 are visible, identified as pole pieces 234A, 234B, and 234C, and two electropermanent magnets 140, identified as electropermanent magnet 140A and electropermanent magnet 140B. Each electropermanent magnet 140 has its own flux direction 112, proceeding from the south pole 120 to the north pole 116.

Referring now to FIG. 8C, a diagram illustrating a top view of an end-on-end 2-dimensional electropermanent magnet array polarized for longer range attraction 820, in accordance with embodiments of the present application is shown. FIG. 8C illustrates an end-on-end electropermanent magnet array 820 where two strings of four electropermanent magnets 140 each are polarized in a same direction from left to right. Accordingly the rightmost pole piece 234 is the array's most north pole 116 and the leftmost pole piece 234 is the array's most south pole 120. FIG. 8C is canted at 45 degrees in order to provide the corresponding edge view in FIG. 8D.

Referring now to FIG. 8D, a diagram illustrating a side view of an end-on-end 2-dimensional electropermanent magnet array programmed for longer range attraction and magnetic flux lines 830, in accordance with embodiments of the present application is shown. FIG. 8D illustrates an edge view of FIG. 8C and illustrates the long flux lines that make this configuration optimized for long range attraction. Long range being nominally defined at the distance between the end-on-end magnet arrays north 116 and south 120 poles.

In practice, half of the electropermanent magnet coils will be electrically connected as one group in series or parallel and the other half will be separately connected together in series or parallel. Accordingly each group can have its own dedicated H-bridge driver, which is an electronic apparatus such as shown and described with respect to FIGS. 5A-5F. H-bridge drivers deliver magnetizing and demagnetizing current pulses, such as those shown and described with reference to FIGS. 6A-6C. In this case, when the two groups of windings are polarized in opposite directions, the array is optimized for short range attraction. When the two groups are polarized in the same direction the array becomes optimized for long range attraction. In the edge view 830, five pole pieces 234 are visible, pole pieces 234A, 234B, and 234C. Four electropermanent magnets 140 are visible, between each pair of pole pieces 234.

Referring now to FIG. 9A, a flowchart illustrating a first coil magnetization process 900, in accordance with embodiments of the present application is shown. The first embodiment magnetizes the electropermanent magnet array with a single charging cycle, and refers to the charge pulse states shown in FIGS. 5A-5F. In one embodiment, an electropermanent magnet array includes a plurality of electropermanent magnets of common length, arranged in a parallel fashion, and a planar pole piece, coupled to the first ends of the plurality of electropermanent magnets. Each electropermanent magnet includes a first and a second end opposite the first end. In a second embodiment, an electropermanent magnet array includes a plurality of pole pieces and a plurality of electropermanent magnets of common length. Each electropermanent magnet includes first and second ends and the electropermanent magnets are linearly arranged in an end-to-end fashion between and coupled to a pair of pole pieces. Flow begins at block 904.

At block 904, all electropermanent magnets 140 are in an existing state. The existing state may include a high force/short attraction state, a lower force/longer attraction state, or a demagnetized state. Flow proceeds to block 908.

At block 908, the control circuit 516 receives a command 520 to produce a (different) desired magnetic state. Flow proceeds to block 912.

At block 912, the control circuit 516 defines required switch states 528, 532, 536, 540 for all coils 524 and electropermanent magnets 140 from the command 520. Flow proceeds to block 916.

At block 916, the control circuit 516 enables the charger 508 to charge the capacitor 512. Flow proceeds to block 920.

At block 920, the charger 508 charges the capacitor 512. Flow proceeds to decision block 924.

At decision block 924, the control circuit 516 determines if the capacitor 512 is fully charged. If the capacitor 512 is fully charged, then flow proceeds to block 928. If the capacitor 512 is not fully charged, then flow instead proceeds to block 920 to continue charging the capacitor 512.

At block 928, the capacitor 512 is charged and the control circuit 516 disables the charger 508. Flow proceeds to block 932.

At block 932, the control circuit 516 sets switch states 528, 532, 536, 540 to the required switch states 528, 532, 536, 540 defined in block 912. Flow proceeds to block 936.

At block 936, the capacitor 512 discharges through closed switches corresponding to the required switch states 528, 532, 536, 540. Flow proceeds to block 940.

At block 940, the electropermanent magnet array produces the desired magnetic state. Flow ends at block 940.

In one embodiment, the process may include configuring, by a control circuit 516, a plurality of switching circuits coupled to a plurality of electropermanent magnets to electrically isolate an energy storage device 512 coupled to the plurality of switching circuits from the plurality of electropermanent magnets, configuring, by the control circuit 516, a charging circuit 508 coupled to the energy storage device 512 to charge the energy storage device 512 configuring, by the control circuit 516, the plurality of switching circuits for one of demagnetizing the plurality of electropermanent magnets, magnetizing the plurality of electropermanent magnets to produce a first magnetic field with a strength and an attraction distance, and magnetizing the plurality of electropermanent magnets to produce a second magnetic field with a lower strength and greater attraction distance than the first magnetic field.

In one embodiment, the process may include receiving, by the control circuit 516, one or more first commands 520 for demagnetizing the plurality of electropermanent magnets, receiving, by the control circuit 516, one or more second commands 520 for magnetizing the plurality of electropermanent magnets to produce the first magnetic field or receiving, by the control circuit 516, one or more third commands 520 for magnetizing the plurality of electropermanent magnets to produce the second magnetic field.

Referring now to FIG. 9B, a flowchart illustrating a second coil magnetization process 950, in accordance with embodiments of the present application is shown. The second embodiment magnetizes the electropermanent magnet array with a sequence of charging cycles. FIG. 9B illustrates a process for optimizing the magnetization of an electropermanent magnet array through repeated discharges of the storage capacitor 512 into magnetizing current pulses 144 occurs until the required magnetic state is produced. This state might be when a certain number of magnetizing pulses are used such as the four current pulses 144 shown in FIG. 6A. Otherwise the current pulses 144 may be continued until a required field strength is achieved, as measured by using flux sensor outputs from units such as those shown in FIGS. 11A and 11C. Flow begins at block 954.

At block 954, all electropermanent magnets 140 are in an existing state. The existing state may include a high force/ short range attraction state, a lower force/longer range attraction state, or a demagnetized state. Flow proceeds to block 958.

At block 958, the control circuit 516 receives a command 520 to produce a (different) desired magnetic state. Flow proceeds to block 962.

At block 962, the control circuit 516 defines required switch states 528, 532, 536, 540 for all coils 524 from the command 520. Flow proceeds to block 966.

At block 966, the control circuit 516 enables the charger 508 to charge the capacitor 512. Flow proceeds to block 970.

At block 970, the charger 508 charges the capacitor 512. Each successive charging cycle per FIGS. 5B-5C or 5B-5D, charges the capacitor 512 to a successively higher level. The charging sequences are repeated until the electropermanent magnets 140 are fully magnetized. In one embodiment, the electropermanent magnets 140 may be fully magnetized when the electropermanent magnets 140 have greater than a predetermined level of attraction force. Flow proceeds to decision block 974.

At decision block 974, the control circuit 516 determines if the capacitor 512 is fully charged. If the capacitor 512 is fully charged, then flow proceeds to block 978. If the capacitor 512 is not fully charged, then flow instead proceeds to block 970 to continue charging the capacitor 512.

At block 978, the capacitor 512 is charged and the control circuit 516 disables the charger 508. Flow proceeds to block 982.

At block 982, the control circuit 516 sets switch states 528, 532, 536, 540 to the required switch states 528, 532, 536, 540 defined in block 962. Flow proceeds to block 986.

At block 986, the capacitor 512 discharges through closed switches corresponding to the required switch states 528, 532, 536, 540. Flow proceeds to decision block 990.

At decision block 990, the control circuit 516 determines if more capacitor 512 discharge cycles are required. More discharge cycles are required if the electropermanent magnets 140 are not yet fully magnetized, or if a predetermined number of magnetization cycles (blocks 966-986) have not yet been completed. If more discharge cycles are required, then flow proceeds to block 966 to charge the capacitor 512 again. If more discharge cycles are not required, then flow instead proceeds to block 994.

At block 994, the electropermanent magnet array produces the desired magnetic state. Flow ends at block 994.

Referring now to FIG. 10, a flowchart illustrating a coil demagnetization process 1000, in accordance with embodiments of the present application is shown. The demagnetization process deactivates the electropermanent magnet array with a sequence of successively decreasing charging cycles. FIG. 10 shows the process for demagnetizing an electropermanent magnet array, where the number of discharge cycles required can be a number such as 10 or 20, or may be based on how many current pulses 144 are needed for the magnetometer readouts from FIG. 11A or 11C to reduce to a low enough value. Flow begins at block 1004.

At block 1004, all electropermanent magnet coils 524 are in an existing state. The existing state may include a high force/short range attraction state or a lower force/longer range attraction state. Flow proceeds to block 1008.

At block 1008, the control circuit 516 receives a command 520 to demagnetize the electropermanent magnets 140. Flow proceeds to block 1012.

At block 1012, the control circuit 516 obtains required capacitor 512 voltages and switch states 528, 532, 536, 540 for all coils 524 from the command 520. Flow proceeds to block 1016.

At block 1016, the control circuit 516 enables the charger 508 to charge the capacitor 512. Flow proceeds to block 1020.

At block 1020, the charger 508 charges the capacitor 512. The charger 508, per FIG. 6B, charges the capacitor 512 to a successively lower voltage. The charging sequences are repeated until the electropermanent magnets 140 are demagnetized. In one embodiment, the electropermanent magnet array may be demagnetized when the electropermanent magnet array has a net zero attraction force. In another embodiment, the electropermanent magnet array may be demagnetized when the electropermanent magnet array has lower than a predetermined level of attraction force. Flow proceeds to decision block 1024.

At decision block 1024, the control circuit 516 determines if the capacitor 512 has reached a desired voltage. For demagnetization operations, the capacitor 512 is not fully charged in each step, but is successively charged to a lower voltage with each charging operation or every other charging operation. If the capacitor 512 has reached the desired voltage, then flow proceeds to block 1028. If the capacitor 512 has not reached the desired voltage, then flow instead proceeds to block 1020 to continue charging the capacitor 512.

At block 1028, the capacitor 512 is charged to the desired voltage, and the control circuit 516 disables the charger 508. Flow proceeds to block 1032.

At block 1032, the control circuit 516 sets switch states 528, 532, 536, 540 to the required switch states 528, 532, 536, 540 defined in block 1012. Flow proceeds to block 1036.

At block 1036, the capacitor 512 discharges through closed switches corresponding to the required switch states 528, 532, 536, 540. Flow proceeds to decision block 1040.

At decision block 1040, the control circuit 516 determines if more discharge cycles are required. More discharge cycles are required if the electropermanent magnets 140 are not yet demagnetized, or if a predetermined number of demagnetization cycles (blocks 1016-1036) have not yet been completed. If more discharge cycles are required, then flow proceeds to block 1016 to charge the capacitor 512 again. If more discharge cycles are not required, then flow instead proceeds to block 1044.

At block 1044, the electropermanent magnet array is demagnetized and the demagnetization process is complete. Flow ends at block 1044.

In one embodiment, configuring the plurality of switching circuits for demagnetizing the plurality of electropermanent magnets may include configuring, by the control circuit 516, each switching circuit 504 to transfer a plurality of alternating direction current flows with a sequentially decreasing amplitude 620 from the energy storage device 512 to a coupled electropermanent magnet.

Referring now to FIG. 11A, a diagram illustrating a side view of magnetometer installation 1100, in accordance with embodiments of the present application is shown. A magnetometer is often based on a hall effect sensor, which measures the magnetic flux which flows through a sensor (magnetometer or magnetic flux sensor) 1104. It is installed on the back side of the planar pole piece 234, aligned with one or more electropermanent magnets 140 of an electropermanent magnet array.

FIG. 11A illustrates a magnetometer installation for a side-by-side electropermanent array. In this configuration, a portion of the magnetic flux exiting or entering an individual electropermanent magnet 140 of the array is diverted by a machined circular groove or flux diversion slot 1112 in the pole piece 234 such as to conduct part of the magnetic flux from an individual electropermanent magnet 140 through the magnetometer yoke 1104 and back to the pole piece 234. By knowing the amount of magnetic flux passing through one of the electropermanent magnets 140, the flux passing through the whole array can be estimated when the whole array is roughly the same distance from a ferromagnetic surface 204.

By measuring the magnetic flux that flows through the sensor 1104, a processor or control circuit 516 may optimize different functions:

1. Energization and Discharge—by knowing the state of the electropermanent magnet and by measuring the magnetic flux, the control circuit 516 may select an appropriate charge voltage for the capacitor 512 to accomplish a state change command 520. This may help prevent overshooting or undershooting the desired state when going through a demagnetization cycle. The signal from the sensor 1104 may be an analog voltage output, wireless signal, optical signal etc. that is fed to the control circuit 516.

2. Target sensing—an activated electropermanent magnet 140 in strong intimate contact with a ferrous target surface 204 may have a high total flux because the reluctance of the circuit is low. If the ferrous target 204 is not in good contact, or absent entirely, the flux must fight through a high reluctance air or vacuum gap to complete the magnetic circuit, greatly lowering the total flux. Therefore, if an electropermanent magnet 140 is activated and the measured flux is far lower than expected, that may be an indicator that there is not good contact with the ferromagnetic surface 204. This is especially useful for automated processes where there may not be a human operator to visually verify there may not be good contact.

In one embodiment, an electropermanent magnet array may include a groove in a rear surface of the pole piece opposite to the plurality of electropermanent magnets, a magnetic flux sensor, affixed to the rear surface within an enclosed area, and a ferrous cap, affixed to the magnetic flux sensor opposite the pole piece and to the pole piece outside the groove. the groove encloses the area that corresponds to one or more electropermanent magnets wherein a portion of a magnetic flux that flows through the one or more electropermanent magnets flows through the magnetic flux sensor, and in response the magnetic flux sensor is configured to provide a proximity indication that reflects a distance between the electropermanent magnet array and a ferrous surface.

In another embodiment, an electropermanent magnet array may include a magnetic flux sensor, affixed between an end of an electropermanent magnet and a pole piece. The magnetic flux sensor is configured to provide a proximity indication that reflects a distance between the electropermanent magnet array and a ferrous surface.

Referring now to FIG. 11B, a diagram illustrating a bottom view of magnetometer installation 1120, in accordance with embodiments of the present application is shown. FIG. 11B illustrates the positional relationship between the magnet 112, the magnetometer 1104, and the flux diversion slot or groove 1112.

FIG. 11B illustrates the bottom view of the magnetometer 1104 mounting illustrating the coaxial positioning of the electropermanent core, the magnetometer 1104, and the flux diversion slot 1112. The return path yoke is not shown in this view but overlays the diameter of the diversion slot 1112. In one embodiment, an electropermanent magnet array may include a groove 1112 in a rear surface of the pole piece 234 opposite to the plurality of electropermanent magnets, wherein the groove 1112 may enclose an area that corresponds to one or more electropermanent magnets, a magnetic flux sensor, affixed to the rear surface within the enclosed area; and a ferrous cap, affixed to the magnetic flux sensor opposite the pole piece 234 and to the pole piece 234 outside the groove 1112. A portion of a magnetic flux that flows through the one or more electropermanent magnets 140 flows through the magnetic flux sensor 1104 and in response the magnetic flux sensor 1104 is configured to provide a proximity indication that reflects a distance between the electropermanent magnet array and a ferrous surface.

Referring now to FIG. 11C, a diagram illustrating a side view of a thickness mode flux sensor for an end-on-end array 1130, in accordance with embodiments of the present application is shown. FIG. 11C illustrates how a thickness mode magnetic flux sensor 1104 can be mounted to measure the magnetic flux flowing through one arm of an end-on-end magnetic array. A magnetic flux sensor 1104 is an electronic device based on (for example) the hall effect or flux gate effect to output a voltage signal proportional to magnetic flux moving through the sensor. A thickness mode flux sensor is a magnetic flux sensor that measures magnetic flux passing through its thickness. When the electropermanent magnet array is substantially parallel to a ferrous surface 204, then the output of one magnetic flux sensor 1104 may be indicative of the magnet flux strength and attraction forces of the entire array. The magnetic flux travels through the electropermanent magnet array, pole pieces 234, air gap 224, ferromagnetic surface 204, and the thickness mode flux sensor 1104, forming a magnetic circuit.

In practice, the use of magnetic flux sensors 1104 with electropermanent magnet arrays permits the user to determine if the array is magnetically attached to a surface (high flux through the sensor 1104) or attracting but not connected with the ferrous surface 204 (medium magnetic flux) or far away from a ferrous surface 204 (low magnetic flux).

Finally, those skilled in the art should appreciate that they can readily use the disclosed conception and specific embodiments as a basis for designing or modifying other structures for carrying out the same purposes of the present application without departing from the spirit and scope of the application as defined by the appended claims.

It will be readily understood that the components of the application, as generally described and illustrated in the Figures herein, may be arranged and designed in a wide variety of different configurations. Thus, the detailed description of the embodiments is not intended to limit the scope of the application as claimed, but is merely representative of selected and exemplary embodiments of the application.

One having ordinary skill in the art will readily understand that the application as discussed above may be practiced with steps in a different order, and/or with hardware elements in configurations that are different than those which are specifically disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the present claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:

1. An electropermanent magnet array, comprising:
    a plurality of electropermanent magnets, arranged in a parallel fashion;
    a plurality of switching circuits, each switching circuit coupled to a different electropermanent magnet of the plurality of electropermanent magnets; and
    a control circuit, coupled to the plurality of switching circuits, configured to receive commands to control the plurality of switching circuits to:
        demagnetize the plurality of electropermanent magnets;
        magnetize the plurality of electropermanent magnets to produce a first magnetic field with a strength and an attraction distance; and
        magnetize the plurality of electropermanent magnets to produce a second magnetic field with a lower strength and greater attraction distance than the first magnetic field.

2. The electropermanent magnet array of claim 1, wherein the control circuit is configured to control the plurality of switching circuits to demagnetize the plurality of electropermanent magnets comprises the control circuit configures each switching circuit to allow a plurality of alternating direction current flows with a sequentially decreasing amplitude through a coupled electropermanent magnet.

3. The electropermanent magnet array of claim 1, wherein the control circuit is configured to control the plurality of switching circuits to magnetize the plurality of electropermanent magnets to produce the first magnetic field comprises the control circuit configures a current flow through each switching circuit that corresponds to each electropermanent magnet in an opposite direction as nearest neighbor switching circuits and electropermanent magnets of the plurality of electropermanent magnets.

4. The electropermanent magnet array of claim 1, wherein the control circuit is configured to control the plurality of switching circuits to magnetize the plurality of electropermanent magnets to produce the second magnetic field comprises the control circuit configures a current flow in a common direction through the plurality of switching circuits.

5. The electropermanent magnet array of claim 1, wherein each of the plurality of electropermanent magnets comprises:
    a magnetically hard material section; and
    an electrical conductor, spirally coiled around the hard material section and coupled to one of the plurality of switching circuits.

6. The electropermanent magnet array of claim 1, wherein each of the plurality of electropermanent magnets comprises:
    a magnetically hard material section; and
    an electrical conductor, spirally coiled around the hard material section, comprising one of:
        a wire; or
        a plurality of stacked layer pairs, wherein each layer pair comprises:
            a first layer of planar partial loops of conductive traces around each hard material section and bonded to a first insulator film; and
            a second layer of planar and serpentine partial loops of conductive traces around each hard material section and bonded to a second insulator film, wherein one of the first and second insulator films separates adjacent stacked layer pairs.

7. The electropermanent magnet array of claim 1, wherein the control circuit is configured to receive one of one or more first commands to demagnetize the plurality of electropermanent magnets, one or more second commands to magnetize the plurality of electropermanent magnets to produce the first magnetic field, or one or more third commands to magnetize the plurality of electropermanent magnets to produce the second magnetic field.

8. The electropermanent magnet array of claim 1, further comprising:
an energy storage device, coupled to the plurality of switching circuits, configured to provide current pulses through the plurality of switching circuits to one of magnetize or demagnetize the plurality of electropermanent magnets.

9. The electropermanent magnet array of claim 8, further comprising:
a charging circuit, coupled to the control circuit and the energy storage device, configured to:
repeatedly charge the energy storage device to a same amplitude in response to the control circuit receives one or more commands to magnetize the plurality of electropermanent magnets; or
repeatedly charge the energy storage device to a sequentially decreasing amplitude in response to the control circuit receives one or more commands to demagnetize the plurality of electropermanent magnets.

10. The electropermanent magnet array of claim 9, wherein the control circuit is configured to enable the charging circuit to charge the energy storage device in response to the control circuit configures the plurality of switching circuits to electrically isolate the energy storage device from the plurality of electropermanent magnets.

11. The electropermanent magnet array of claim 9, wherein the control circuit configures the plurality of switching circuits to allow the energy storage device to provide current pulses to the plurality of electropermanent magnets in response to the charging circuit charges the energy storage device.

12. The electropermanent magnet array of claim 1, further comprising:
a pole piece, orthogonal to and coupled to common ends of the plurality of electropermanent magnets.

13. The electropermanent magnet array of claim 12, further comprising:
a groove in a rear surface of the pole piece opposite to the plurality of electropermanent magnets, wherein the groove encloses an area that corresponds to one or more electropermanent magnets;
a magnetic flux sensor, affixed to the rear surface within the enclosed area; and
a ferrous cap, affixed to the magnetic flux sensor opposite the pole piece and to the pole piece outside the groove, wherein a portion of a magnetic flux that flows through the one or more electropermanent magnets flows through the magnetic flux sensor and in response the magnetic flux sensor is configured to provide a proximity indication that reflects a distance between the electropermanent magnet array and a ferrous surface.

14. A method, comprising:
configuring, by a control circuit, a plurality of switching circuits coupled to a plurality of electropermanent magnets to electrically isolate an energy storage device coupled to the plurality of switching circuits from the plurality of electropermanent magnets;
configuring, by the control circuit, a charging circuit coupled to the energy storage device to charge the energy storage device;
configuring, by the control circuit, the plurality of switching circuits to perform:
demagnetizing the plurality of electropermanent magnets;
magnetizing the plurality of electropermanent magnets to produce a first magnetic field with a strength and an attraction distance; and
magnetizing the plurality of electropermanent magnets to produce a second magnetic field with a lower strength and greater attraction distance than the first magnetic field.

15. The method of claim 14, further comprising one of:
receiving, by the control circuit, one or more first commands for demagnetizing the plurality of electropermanent magnets;
receiving, by the control circuit, one or more second commands for magnetizing the plurality of electropermanent magnets to produce the first magnetic field; or
receiving, by the control circuit, one or more third commands for magnetizing the plurality of electropermanent magnets to produce the second magnetic field.

16. The method of claim 14, wherein configuring the plurality of switching circuits for demagnetizing the plurality of electropermanent magnets comprising:
configuring, by the control circuit, each switching circuit to transfer a plurality of alternating direction current flows with a sequentially decreasing amplitude from the energy storage device to a coupled electropermanent magnet.

17. The method of claim 14, wherein configuring the plurality of switching circuits for magnetizing the plurality of electropermanent magnets to produce the first magnetic field comprising:
configuring, by the control circuit, each switching circuit to transfer a plurality of current flows from the energy storage device through each switching circuit in an opposite direction from nearest neighbor switching circuits and electropermanent magnets of the plurality of electropermanent magnets.

18. The method of claim 14, wherein configuring the plurality of switching circuits for magnetizing the plurality of electropermanent magnets to produce the second magnetic field comprising:
configuring, by the control circuit, each switching circuit to transfer a plurality of current flows from the energy storage device in a common direction to the plurality of electropermanent magnets.

19. The method of claim 14, further comprising one of:
repeatedly charging the energy storage device, by a charging circuit, to a same amplitude in response to the control circuit receives one or more commands to magnetize the plurality of electropermanent magnets; or
repeatedly charging the energy storage device, by the charging circuit, to a sequentially decreasing amplitude in response to the control circuit receives one or more commands to demagnetize the plurality of electropermanent magnets.

20. The method of claim 14, further comprising:
configuring, by the control circuit, the plurality of switching circuits to electrically isolate the energy storage device from the plurality of electropermanent magnets, and in response:
  enabling, by the control circuit, the charging circuit to charge the energy storage device.

21. The method of claim 14, further comprising repeating performing:
configuring the plurality of switching circuits to electrically isolate the energy storage device from the plurality of electropermanent magnets;
configuring the charging circuit to charge the energy storage device; and
configuring the plurality of switching circuits to provide current pulses to the plurality of electropermanent magnets a number of times until one of a desired level of demagnetization or magnetic field strength is achieved.

* * * * *